United States Patent
Airaud et al.

(10) Patent No.: US 7,152,186 B2
(45) Date of Patent: Dec. 19, 2006

(54) CROSS-TRIGGERING OF PROCESSING DEVICES

(75) Inventors: Cédric Airaud, Antibes (FR); Nicholas Esca Smith, Cambridger (GB); Paul Kimelman, Alamo, CA (US); Ian Field, Walnut Creek, CA (US); Man Cheung Joseph Yiu, Maidenhead (GB); David Francis McHale, Harrow (GB); Andrew Brookfield Swaine, Cambridge (GB)

(73) Assignee: ARM Limited, Cambridge (GB)

( * ) Notice: Subject to any disclaimer, the term of this patent is extended or adjusted under 35 U.S.C. 154(b) by 520 days.

(21) Appl. No.: 10/633,363

(22) Filed: Aug. 4, 2003

(65) Prior Publication Data

US 2005/0034017 A1 Feb. 10, 2005

(51) Int. Cl.
*G06F 11/00* (2006.01)

(52) U.S. Cl. .......................... 714/30; 714/25; 714/31; 714/733; 714/734

(58) Field of Classification Search .............. 714/25, 714/30, 31, 34, 35, 39, 48, 57, 733, 734
See application file for complete search history.

(56) References Cited

U.S. PATENT DOCUMENTS 3,876,987 A * 4/1975 Dalton et al. ............... 714/10
4,503,535 A   3/1985 Budde et al.
5,469,542 A   11/1995 Foster et al.
5,537,535 A   7/1996 Maruyama et al.
5,636,341 A * 6/1997 Matsushita et al. ........... 714/13
6,009,539 A * 12/1999 Ranson ........................ 714/30
6,496,940 B1 * 12/2002 Horst et al. .................... 714/4

* cited by examiner

*Primary Examiner*—Robert W. Beausoliel
*Assistant Examiner*—Emerson Puente
(74) *Attorney, Agent, or Firm*—Nixon & Vanderhye P.C.

(57) ABSTRACT

A data processing apparatus controls cross-triggering of diagnostic processes on a plurality of processing devices. The data processing apparatus comprises a routing module having a plurality of broadcast channels, one or more of the broadcast channels being operable to indicate the occurrence of a diagnostic event on one or more of the plurality of processing devices. The data processing apparatus also comprises an mapping module associated with a corresponding processing device. The interface module programmably asserts diagnostic event signals from the associated processing device to one or more of the plurality of broadcast channels and programmably retrieves diagnostic events signals from processing devices other than the associated processing device from one or more of the plurality of broadcast channels. The retrieved diagnostic event data is used to facilitate triggering of a diagnostic process on the associated processing device in dependence upon said retrieved diagnostic event data.

44 Claims, 50 Drawing Sheets

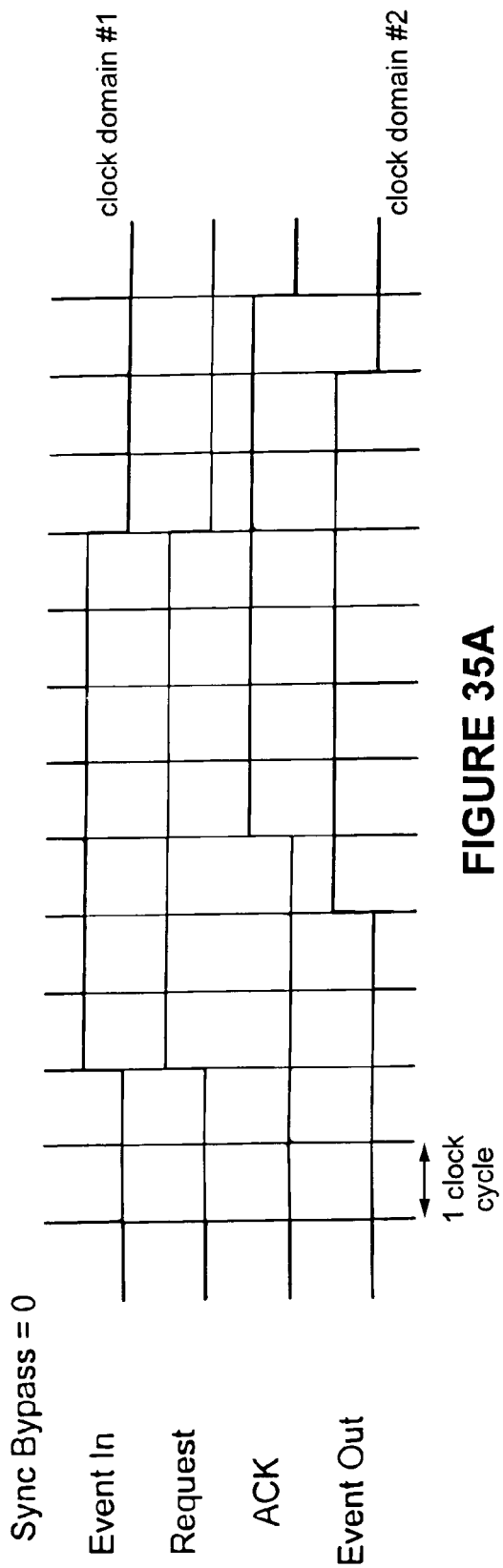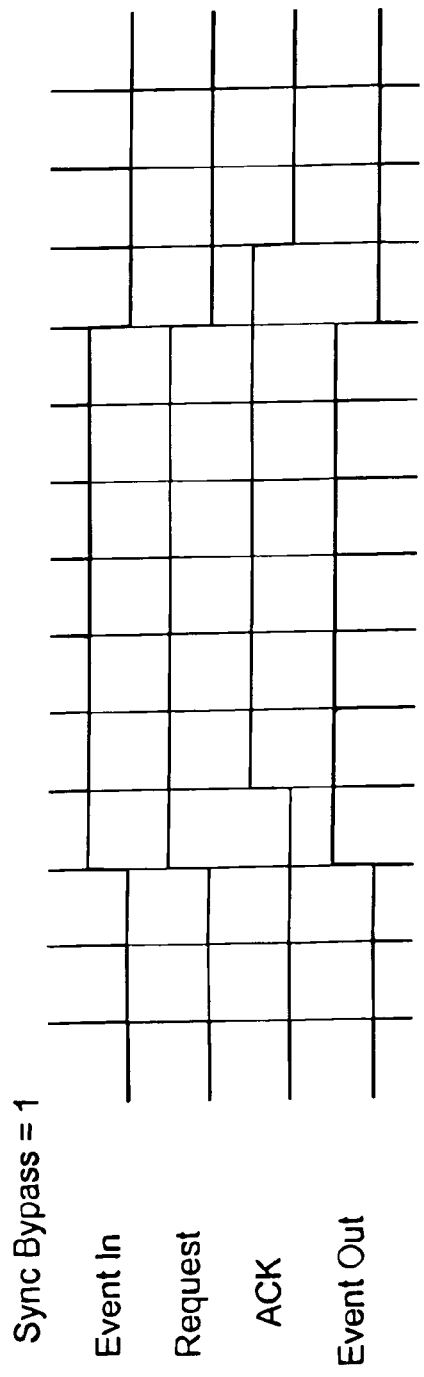

CTGENCTL (0x000) R - R/W

| 31 | 5 | 4 | 3 | 2 | 1 | 0 |
|---|---|---|---|---|---|---|
| SBZ | Sync Bypass | Locked | IntEn | DbgEn | GibEn |

FIGURE 46

CTLOCK (0x004) R/W

| 31 | 0 |
|---|---|
| Access Code |

FIGURE 47

CTINTRAWSTATUS (0x008) R

| 31 | 4 | 3 | 0 |
|---|---|---|---|
| | | Interrupts |

FIGURE 48

CTINTSTATUS (0x00C) R

| 31 | 4 | 3 | 0 |
|---|---|---|---|
| | | Interrupts |

FIGURE 49

CTINTCLEAR (0x010) W

| 31 | 4 3 | 0 |
|---|---|---|
| | | Interrupts |

FIGURE 50

CTAPPTRIG (0x080) R/W

| 31 | 1 | 0 |
|---|---|---|
| SBZ | | AppTrig |

FIGURE 51

CTPERIPHID (0x0E0) R

| 31 24 | 23 20 | 19 12 | 11 0 |
|---|---|---|---|
| Configuration | Revision | DesignerID | PartNumber |

FIGURE 52

CTCHANNELSDEF (0x0E4) R

| 31 15 | 8 7 | 0 |
|---|---|---|
| SBZ | ChannelsIn | ChannelsOut |

FIGURE 53

CTINPUTSDEF (0xE8) R

| 31 | 10 | 9 | 8 | 5 | 4 | 1 | 0 |
|---|---|---|---|---|---|---|---|
| SBZ | | AppTrig | EtmExtOut | | Int | | DbgAck |

FIGURE 54

CTOUTPUTSDEF (0xEC) R

| 31 | 9 | 8 | 5 | 4 | 1 | 0 |
|---|---|---|---|---|---|---|
| SBZ | | EtmExtIn | | Int | | DbgRq |

FIGURE 55

CTPCELLID (0xOF0) R

| 31 | 0 |
|---|---|
| Cell ID | |

FIGURE 56

| | | |
|---|---|---|
| 31 | 8 7 | 0 |
| | | Channels |

FIGURE 59

CTDBGACKEN (0x100) R/W

| | | | | |
|---|---|---|---|---|
| 31 24 23 | 16 15 | 8 7 | 0 |
| Channels (Bit 3) | Channels (Bit 2) | Channels (Bit 1) | Channels (Bit 0) |

FIGURE 60

CTINTINEN (0x104) R/W

| | | | |
|---|---|---|---|
| 31 24 23 | 16 15 | 8 7 | 0 |
| Channels (Bit 3) | Channels (Bit 2) | Channels (Bit 1) | Channels (Bit 0) |

FIGURE 61

CTETMEXTOUTEN (0x108) R/W

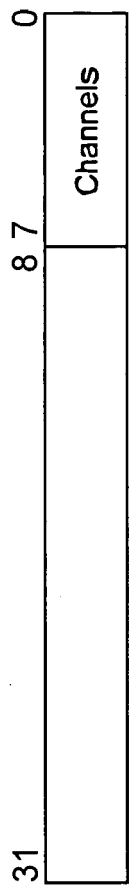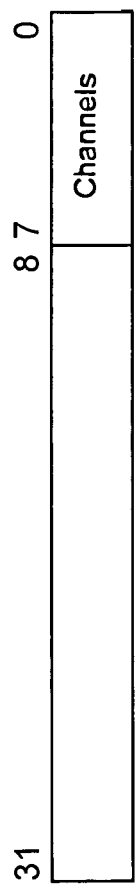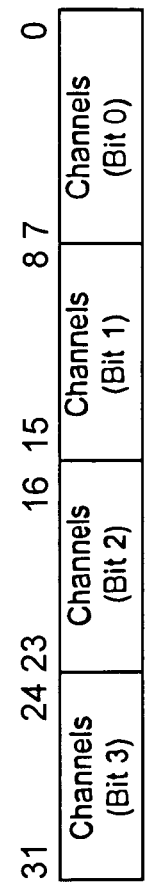

CTETMEXTINEN (0x188) R/W

| 31 | 24 23 | 16 15 | 8 7 | 0 |
|---|---|---|---|---|
| Channels (Bit 3) | Channels (Bit 2) | Channels (Bit 1) | Channels (Bit 0) | |

FIGURE 65

CTITCR (0x200) R/W

| 31 | 1 | 0 |
|---|---|---|
| SBZ | | ITEN |

FIGURE 66

CTITIP1 (0x204) R/W

| 31 | 9 8 | 5 4 | 1 | 0 |
|---|---|---|---|---|
| SBZ | EtmExtOut | Int | | DBGACK |

FIGURE 67

CTITIP2 (0x208) R/W

| 31 | SBZ | 16 15 | ChnlTrig | 8 7 | TrigAck | 0 |

FIGURE 68

CTITOP1 (0x20C) R/W

| 31 | SBZ | 9 8 | EtmExtIn | 5 4 | Int | 1 0 | DBGRQ |

FIGURE 69

CTITOP2 (0x210) R/W

| 31 | SBZ | 16 15 | ChnlAck | 8 7 | TrigReq | 0 |

FIGURE 70

CROSS-TRIGGERING OF PROCESSING DEVICES

BACKGROUND OF THE INVENTION

1. Field of the Invention

The invention relates generally to data processing. More particularly, the invention relates to the control of cross-triggering of diagnostic processes on a plurality of processing devices.

Multiprocessor systems are increasingly being used in such fields as mobile telecommunications, data networking, data storage and imaging. For example, a mobile phone handset may comprise multiple processor cores, a digital signal processing core (DSP) and one or more control processors. Accordingly, there is a requirement to provide an interconnection system for such multiprocessor systems to facilitate diagnostic cross-triggering of events between different processors during the product development stage. In particular, the ability to achieve synchronised stop/start and step of multiple cores in a single integrated circuit is an important requirement. For example, in a system comprising three distinct cores A, B and C, if core A reaches a breakpoint on a given instruction then cores B and C should also be stopped as soon as possible. Furthermore, it may be desirable to allow one or more processor cores to generate either a trigger or an interrupt in dependence upon occurrence of a diagnostic event in another part of the integrated circuit. The requirement for control mechanism for cross-triggering of processing devices is applicable not only to processor cores but also to devices such as co-processors, Field Programmable Gate Arrays (FPGAs), Programmable Logic Devices (PLDs), Digital Signal Processors (DSP) and intelligent peripherals.

2. Description of the Prior Art

One known system for synchronised debugging is the "Aspex" system developed by Allant Software of California, USA. In this system stop/start/step operations are closely co-ordinated between the processors and Aspex independently sets up each processor to perform the desired action, then a final execute sequence is sent to all of the processors. Cross-triggering of breakpoints is achieved using hardware signalling. FIG. 71 of the accompanying drawings schematically illustrates how four processor cores are connected to effect cross-triggering in the Allant system. In this system the cross-triggering matrix is implemented via a Complex Programmable Logic Device (CPLD) 5100 comprising two groups of enable latches with memory mapped enable switches. The registers allow the user to specify which processor can interrupt another. FIG. 72 of the accompanying drawings illustrates the structure of the CPLD 5100. It can be seen that the output of each processor is routed to each of the three other processors and the three possible inputs to each processor are supplied to an OR gate associated with that processor. For example output of a first enable gate 5200 for processor 2 is fed to a second set of enable gates 5300 corresponding to processors 1, 3 and 4, the outputs of which are fed to OR gates 5400, 5700 and 5600 corresponding to cores 1, 3 and 4 respectively. The Aspex system provides a direct core to core mapping via a series of latches. As such, the Aspex matrix mapping increases in complexity as the number of cores increases and has the disadvantage that it is not readily scalable.

Another known cross-triggering system is an emulation bus proprietary to Texas Instruments. According to this system a bus line is used as a communication channel for a plurality of possible signals. However, access to a communication channel on the bus is dependent upon the current signalling state of the system.

SUMMARY OF THE INVENTION

According to a first aspect, the invention provides a data processing apparatus for controlling cross-triggering of diagnostic processes on a plurality of processing devices, said data processing apparatus comprising:

a routing module comprising a plurality of broadcast channels, one or more of said broadcast channels being operable to indicate the occurrence of a diagnostic event on one or more of said plurality of processing devices and having at least one router input port for receiving channel-mapped data indicating the occurrence of diagnostic events and at least one router output port for broadcasting channelised information indicating the occurrence of diagnostic events;

a mapping module having:

an event mapping input port operable to receive a diagnostic event signal indicating the occurrence of a diagnostic event on an associated processing device, said associated processing device being one of said plurality of processing devices;

a first mapping unit operable to programmably assert said diagnostic event signal to one or more of said plurality of broadcast channels of said routing module and to supply said first mapped diagnostic event signal to said at least one router input port;

a channel mapping input port operable to receive from said router output port said channelised information comprising data from one or more of said plurality of broadcast channels indicating occurrences of diagnostic events on processing devices of said plurality of processing devices; and a second mapping module operable to receive said channelised information and to programmably retrieve from said channelised information, diagnostic event data from selected ones of said plurality of broadcast channels and to supply said retrieved diagnostic event data to said associated processing device to facilitate triggering of a diagnostic process on said associated processing device in dependence upon said retrieved diagnostic event data.

The invention recognises that a cross-triggering control mechanism that provides a plurality of broadcast channels to which any processing device can progammably assert signals, indicative of the occurrence of a diagnostic event on that device, and from which any processing device can programmably retrieve information, indicative of occurrences of diagnostic events on other processing devices of a multiple-device system, offers improved scalability over known systems in which more rigid communication routes are provided between pairs of devices. The invention also recognises that programmable assertion and retrieval of information regarding diagnostic events to the bus affords improved management of broadcast channel resources by allowing the channels to be pre-configured according to the characteristics of and relationships between the component devices of the interconnected system. This effectively reduces the likelihood of inefficient communication which may arise in known systems employing a bus line for communication of diagnostic events and according to which more than one device must contend for access to the same broadcast channel, the access being dependent upon a current signalling state.

Although the broadcast channels of the routing module may be managed such that a single channel is associated with a single diagnostic event input from a processing device, preferred embodiments comprise combining logic in the routing module so that a plurality of incoming diagnostic event signals may be combined to produce a single output signal for broadcast to processing devices of the system. This has the advantage that each broadcast channel can be configured to signal the occurrence of a given diagnostic event on any of several processing devices. It is preferred that the combining logic comprises an OR gate since this allows each broadcast channel to be associated with the occurrence of a given type of diagnostic event (e.g. breakpoint or watchpoint reached) on any one of a number of processing devices whose inputs are supplied to the OR gate.

It will be appreciated that the components of the data processing apparatus for controlling cross-triggering of diagnostic processes and the plurality of processing devices could be components belonging to a single integrated circuit i.e. components of a single chip or alternatively they could be components provided on different chips. For example the routing module could be fabricated on a different chip from that on which a processor core and associated cross-trigger interface are fabricated.

In one preferred embodiment, in which all of the processing devices, routing modules and interface modules are provided on the same chip a handshake module is provided in the router module to effect handshake signalling of diagnostic events between the router module and each processing device via the respective interface module. Handshake signalling has the advantage that it is particularly robust for use with asynchronous systems since it automatically adapts to changes in clock frequency of processing devices connected to the router module.

In another preferred embodiment the processing devices, routing modules and interface modules are not all provided on the same chip. In this embodiment the routing module is provided with a synchroniser interface operable to monitor both a first handshake signal sequence comprising receipt and acknowledgement of said channelised information and a second handshake signal sequence comprising receipt and acknowledgement of said diagnostic event signal. The routing module synchroniser interface is further operable to output a single off-chip signal representing said first handshake signal sequence and a single off-chip signal representing said second handshake signal sequence. This has the advantage of reducing the off-chip signalling overhead by replacing a two-wire handshake by a single wire signal. Off-chip signalling is expensive in terms of pin availability and cost. Accordingly, reducing the signalling overhead means that a more cost-effective circuit is produced.

Although the diagnostic event signals received from a processing device could be supplied directly to the first mapping module of the interface module, in a preferred embodiment the interface module is provided with a generic interface circuit, which includes synchronisation logic operable to remove glitches. Alternatively, an additional wrapper circuit may be used for glitch removal. The generic interface circuit allows different data processing apparatus to connect to the interface module, in some cases, via a simple wrapper circuit. Unless the processing device is a processing core in which the diagnostic event signal is output by a flip-flop, synchronisation logic is already internally provided or if all processing devices connected to the routing module are synchronous then it cannot be expected that the diagnostic event signal received from the processing device will be glitch-free. Accordingly, provision of glitch removal logic in the interface module has the advantage that it significantly reduces the likelihood of a false diagnostic event being registered by the routing module. False diagnostic events could disadvantageously trigger a diagnostic process on other processing devices of the system.

In preferred embodiments the interface module comprises synchronisation logic operable to synchronise a signal received from the router output port to a clock domain of the associated processing device prior to supplying the retrieved diagnostic event data to the associated processing device. This has the advantage that the processing device receives the information about the occurrence of a diagnostic event on another processing device on a time scale that is appropriate to its own processing cycle. This facilitates performance of cross-triggering across the plurality of processing devices, even where the processing devices run according to different clock signals from the routing module.

The programmable assertion of diagnostic event data to and retrieval of diagnostic event data from the broadcast channels could be effected in a number of alternative ways. For example, it is possible to provide a simple configuration register for each trigger signal to specify the connectivity of communication channels to diagnostic events. However, in preferred embodiments at least one of the first mapping module and the second mapping module comprises a plurality of configuration registers operable to effect the progammable assertion of said diagnostic event signal to the plurality of broadcast channels and/or to effect the progammable retrieval of the diagnostic event data from selected ones of the plurality of broadcast channels. This has the advantage that it is a simple system to implement since a single configuration register may be provided for each channel to specify the connectivity of communication channels between processing devices.

According to one preferred embodiment the configuration registers are programmable using memory mapped access. This has the advantage that the configuration registers can be treated as a memory mapped slave device that can be simply programmed by the processor to which the configuration registers relate.

According to an alternative preferred embodiment the configuration registers are programmable using JTAG scan access. This embodiment has the advantage that register configuration through a scan channel is inherently secure against post-production tampering since a connection must be made via the scan interface. Furthermore, scan access allows for non-intrusive configuration and observation of the router module set-up. This is particularly useful when the router module is being used to drive an Embedded Trace Macrocell (ETM) or where an intrusive configuration of the routing module might actually alter the behaviour of the system in the run-up to a diagnostic event of interest. Debug tools typically use scan access to the processor core so it is advantageous to use the same access mechanism for configuration of the router module. One of the advantages of using scan access is that registers can be accessed while the processor is executing program code (normal operation).

According to another preferred embodiment a first subset of the configuration registers are programmable using JTAG scan access as well as memory mapped acces and a second subset of the configuration registers are programmable using memory mapped access.

The plurality of processing devices with which the cross-trigger control apparatus according to the present technique is used could be any one of a number of different devices such as processors, co-processors, debug subsytems, Digital Signal Processors (DSP) and intelligent peripherals. However, in preferred embodiments, at least one of the processing devices is a processor core, a coprocessor or a digital signal processor.

Although the routing module could be configured such that is connectable only to other processing devices through an interface module. In a preferred embodiment, the routing module is operable to be connected to a further routing module by connecting the router output port of the routing module to the router input port of the further routing module and vice versa. This has the advantage that it makes the system more scalable since routing modules can be connected together to accommodate connection of further processing devices without the requirement to change the number of ports of an individual routing module. Furthermore, the internal circuitry of this preferred embodiment is designed such that the cross-connection of two or more routing modules is unlikely to generate a combinatorial loop.

Viewed from a further aspect the invention provides a data processing method for controlling cross-triggering of diagnostic processes on a plurality of processing devices, said method comprising the steps of:

receiving via an event mapping input port of an mapping module a diagnostic event signal indicating the occurrence of a diagnostic event on an associated processing device, said associated processing device being one of said plurality of processing devices;

performing a first mapping operation involving programmably asserting said diagnostic event signal to one or more of said plurality of broadcast channels using said router input port;

broadcasting data indicating the occurrence of diagnostic events via a router output port;

indicating the occurrence of a diagnostic event on one or more of said plurality of processing devices on one or more of a plurality of broadcast channels;

receiving channel-mapped data indicating the occurrence of diagnostic events via a router input port;

receiving from said router output port a channelised information comprising data from one or more of said plurality of broadcast channels indicating occurrences of diagnostic events on processing devices of said plurality of processing devices; and performing a second mapping operation by programmably retrieving from said channelised information, diagnostic event data from selected ones of said plurality of broadcast channels; and supplying said retrieved diagnostic event data to said associated processing device to facilitate triggering of a diagnostic process on said associated processing device in dependence upon said retrieved diagnostic event data.

The above and other objects, features and advantages of this invention will be apparent from the following detailed description of illustrative embodiments which is to be read in connection with the accompanying drawings.

BRIEF DESCRIPTION OF THE DRAWINGS

FIGS. 35A to D schematically illustrate signal sequences corresponding to the handshaking circuit of FIG. 34;

FIGS. 46 to 56 schematically illustrate a preferred format for each of a number of general control registers;

FIG. 59 to FIG. 65 schematically illustrate a preferred format for each of a number of enable registers;

FIGS. 66 to 70 schematically schematically illustrate a preferred format for each of a number of integration registers;

DETAILED DESCRIPTION OF EMBODIMENTS

Figure 1:
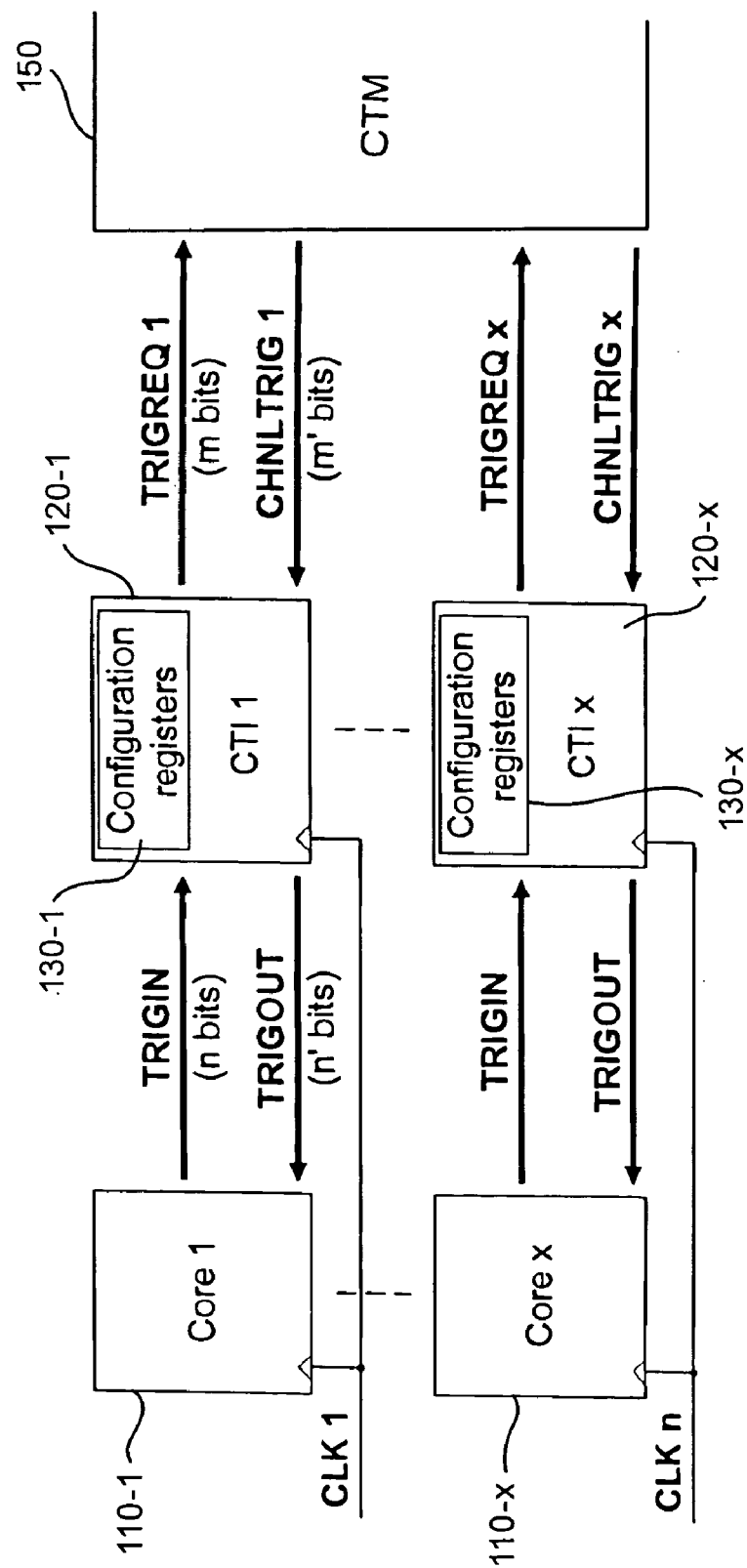
FIG. 1 schematically illustrates a cross-trigger system according to the present technique.

FIG. 1 schematically illustrates a cross-trigger system according to the present technique. The system comprises a plurality of processor cores 110-1 to 110-X, each of which has a corresponding cross-trigger interface (CTI) 120-1 to 120-X. Each cross-trigger interface has a set of configuration registers 130-1 to 130-X. Each of the cross-trigger interfaces communicates with a common cross-trigger matrix 150 (or routing module). The core 110-1 and corresponding cross-trigger interface 120-1 are driven by the same clock signal CLK1.

The core 110-1 outputs a trigger event signal TRIGIN, which is fed to the cross-trigger interface 120-1. The trigger event signal indicates the occurrence of a diagnostic event on the core, for example a breakpoint signal, a watchpoint signal, a hardware interrupt or a software interrupt. The cross-trigger interface 120-1 recognises the TRIGIN signal received from the core 110-1 and uses it to generate trigger request TRIGREQ signals for a plurality of data channels supported by the cross-trigger matrix 150. Each channel supported by the cross-trigger matrix 150 represents a given occurrence or condition associated with a diagnostic process within the multi-processor system. A channel may either have a dedicated meaning in the system, for example "system error", processor start/stop, trace start/stopor the processing event represented by a channel can be programmably configured by a debugger. In this embodiment a given channel provides a single-bit output that is the logical OR of all inputs to that channel. In response to receipt of each trigger request signal TRIGREQ, the cross-trigger-matrix 150 broadcasts a channel trigger signal CHNLTRIG on an appropriate data channel. The channel trigger signal CHNLTRIG is received by the cross-trigger interface 120 via an output port of the cross-trigger matrix and communicated to the attached core 110 via a trigger output TRIGOUT signal. A trigger request signal TRIGREQ1 corresponding to a trigger event TRIGIN on core 110-1 can be communicated to all or a subset of the cores 110-2 to 110-X by the cross-trigger matrix 150 via channel trigger signals CHNLTRIG 2 to CHNLTRIG X. Accordingly, occurrence of a diagnostic event on one core, can be readily communicated to one or more other cores of the multi-processor system. This facilitates cross-triggering of a diagnostic process across the multi-device system. The configuration registers 130-1 to 130-X are operable to control which source (i.e. TRIGIN emitting core) drives into which channel of the cross-trigger matrix 150 and which sinks (i.e. TRIGOUT receiving cores) monitor a particular channel.

Figure 2:
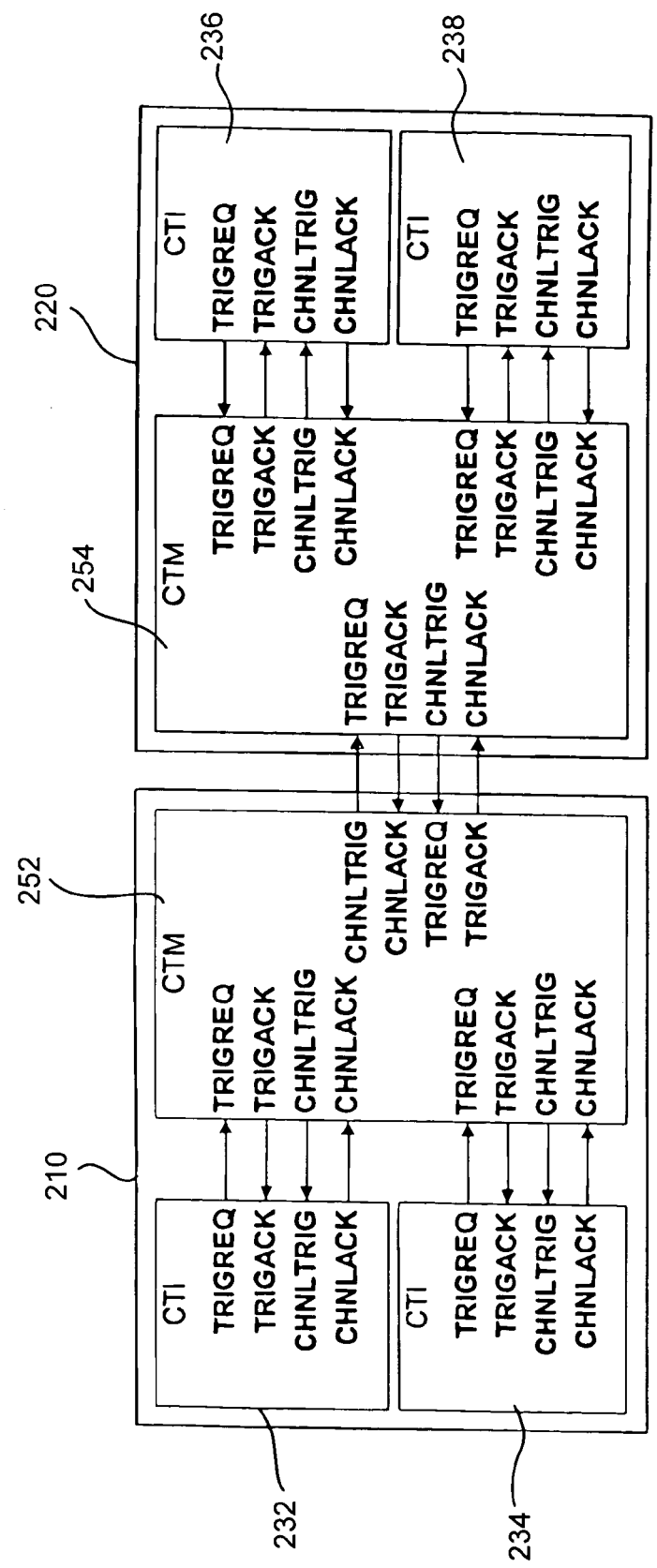
FIG. 2 schematically illustrates an arrangement in which two cross-trigger systems are connected together according to the present technique.

FIG. 2 schematically illustrates an arrangement in which two cross-trigger systems are connected together according to the present technique. The arrangement comprises a first system 210 having a first cross-trigger matrix 252 that is connected to a set of two cross-trigger interface modules 232, 234 and a second system 220 having a second cross-trigger matrix (CTM) 254 that is connected to a further set of two cross-trigger interface modules 236, 238. The first cross-trigger matrix 252 is connected to the second cross-trigger matrix 254. However, the port connections between the first CTM 252 and the second CTM 254 are inverted relative to the connections between e.g. the CTI 232 and the CTM 252. Accordingly the first CTM 252 outputs a CHNLTRIG signal, which broadcasts the occurrence of a diagnostic event on one of the cores attached to one of the first set of CTIs 232, 234, to the TRIQREQ port of the second CTM 254 whereas the TRIGREQ port of the first CTM 252 is connected such that it receives a CHNLTRIG signal. The CHNLTRIG signal indicates the occurrence of a diagnostic event on one of the cores attached to one of the second set of CTIs 236 and 238, from the second CTM 254. So, for example if a trigger event TRIGREQ is sent by CTI 232, it is propagated to the associated CTM 252, which propagates the trigger event to the other CTI 234 of the first system 210 via a CHNLTRIG signal. Furthermore, the TRIGREQ signal sent by CTI 232 is propagated to the second CTM 254 via a CHNLTRIG signal, which is fed to the TRIGREQ port of the second CTM 254. The second CTM 254 then broadcasts the occurrence of the diagnostic event on the core associated with CTI 252 to the CTIs 236 and 238 and associated processor cores of the second system 220. This arrangement has the advantage of allowing two cross-trigger systems 210, 220 to be connected together thereby expanding the number of nodes on the multi-device system without modifying the size of the cross-trigger matrix, that is, without modifying the number of ports on each individual CTM.

Figure 3:
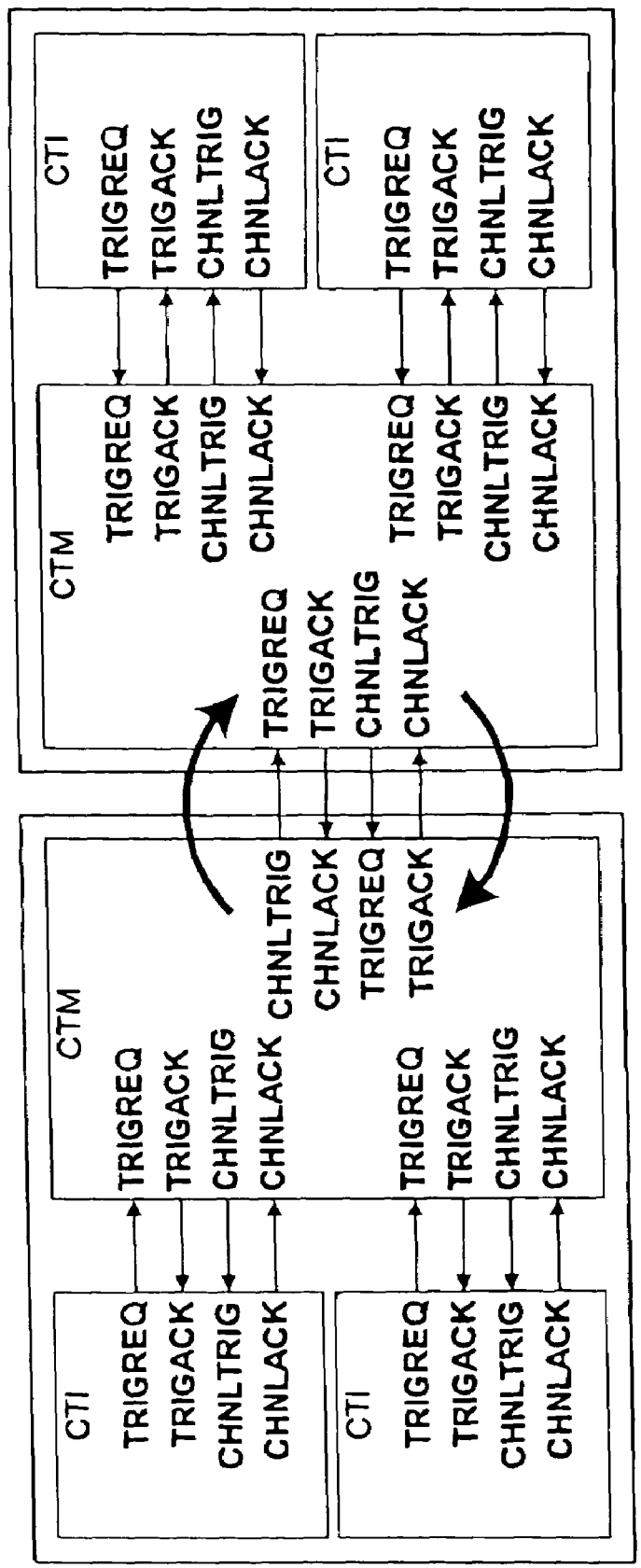
FIG. 3 schematically illustrates an undesirable combinatorial loop that could potentially occur when two cross-triggered matrices are connected to each other.

FIG. 3 schematically illustrates an undesirable combinatorial loop that could potentially occur when two cross-triggered matrices 252, 254 are connected to each other. A combinatorial loop of the type illustrated in FIG. 3 is avoided in arrangements according to the present technique by ensuring that a trigger request signal TRIGREQ is not forwarded on the CHNLTRIG signal bus of the same CTM port.

Figure 4:
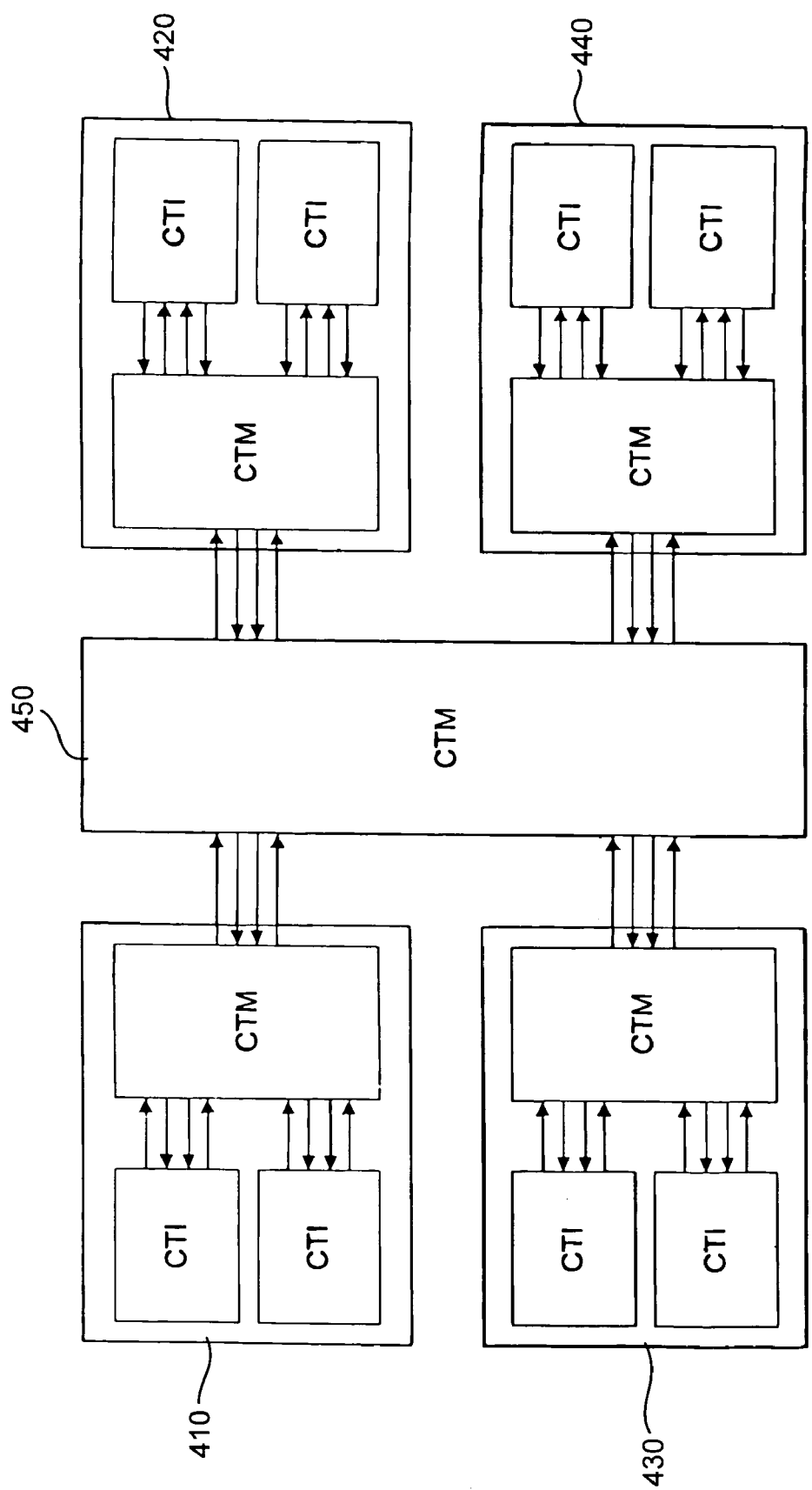
FIG. 4 schematically illustrates how four cross-trigger systems according to the present technique can be interconnected.

FIG. 4 schematically illustrates how four cross-trigger systems 410, 420, 430, 440, each of which comprises a cross-trigger matrix and a set of two cross-trigger interface modules, is connected. As shown in FIG. 4, the connection of the four systems is effected by connecting the CTM of each of the four cross-trigger systems to a further CTM 450 which is operable to provide logical connections between all four systems thus forming an integrated unit.

Figure 5:
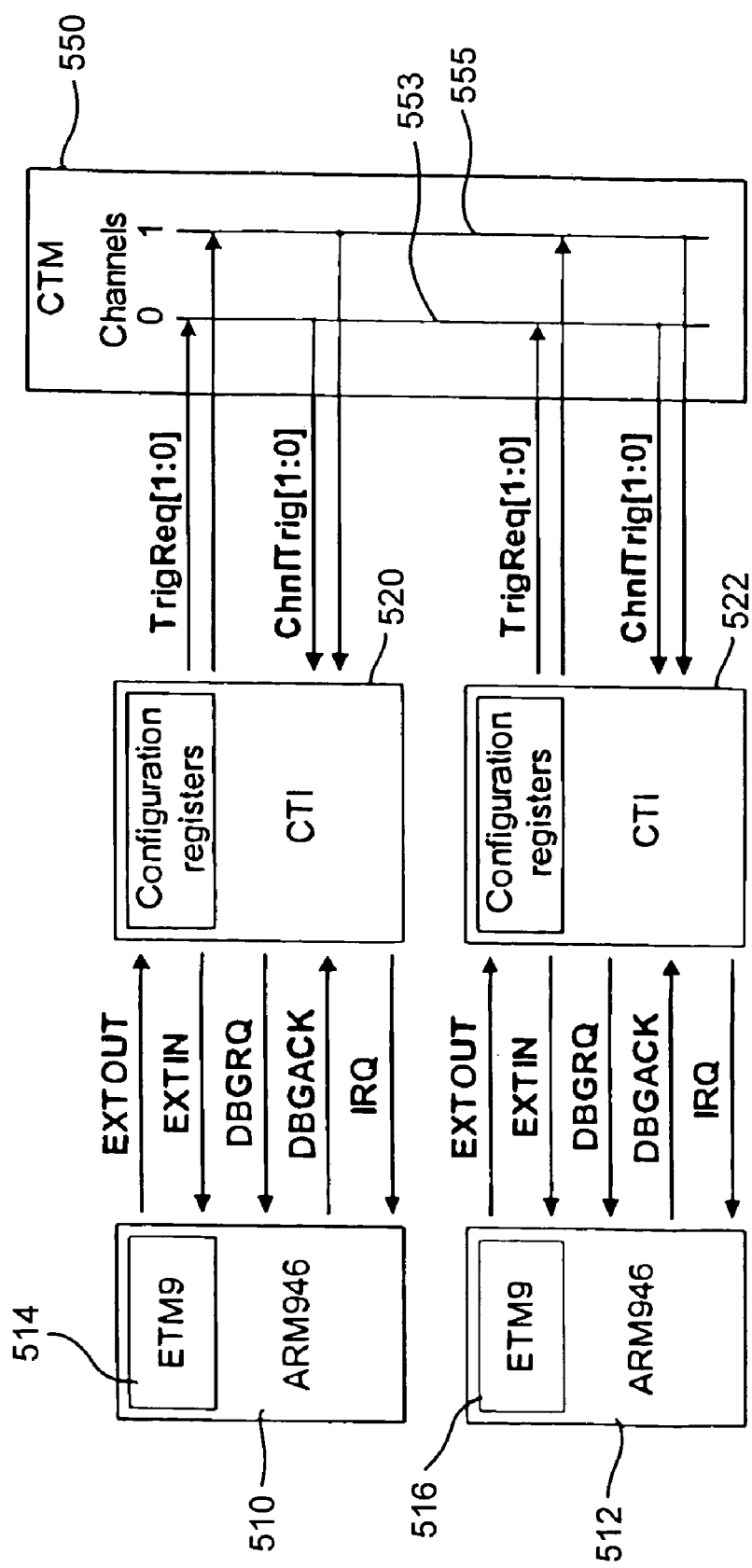
FIG. 5 schematically illustrates a specific implementation of a cross-trigger system according to the present technique.

FIG. 5 schematically illustrates a specific implementation of a cross-trigger system according to the present technique. The apparatus comprises two ARM946 Reduced Instruction Set Computing (RISC) processor cores 510, 512, each of which is connected to diagnostic circuitry consisting of an embedded trace macro (ETM). The two embedded trace managers 514, 516 are used for trace operations of the processor code execution. Each processor core 510, 512 is connected to a respective cross-trigger interface module 520, 522. The two cross-trigger interface modules are connected to a single cross-trigger matrix 550 which supports a first communication channel 553 and a second communication channel 555. Each of the cross-trigger interfaces 520, 522 is connected to two channels 553, 555 of the cross-trigger matrix 550. The inputs to and outputs from the channels of the CTM 550 are programmably configurable. Depending on the configuration, either an embedded trace macro event signal EXTOUT or a debug acknowledge signal DBGACK may be output by a core, say core 510, received by the corresponding cross-trigger interface module 520 and propagated into the cross-trigger matrix 550 through one of the TRIGREQ signals. The cross-trigger matrix 550 responds to the TRIGREQ signal by outputting a corresponding CHNLTRIG signal, which is received by one or more of the cross-trigger interface modules 520, 522. The event is then forwarded to the second processor core 516 as one of: a debug event DBGRQ, an embedded trace manager event EXTIN or an interrupt signal IRQ.

Figure 6:
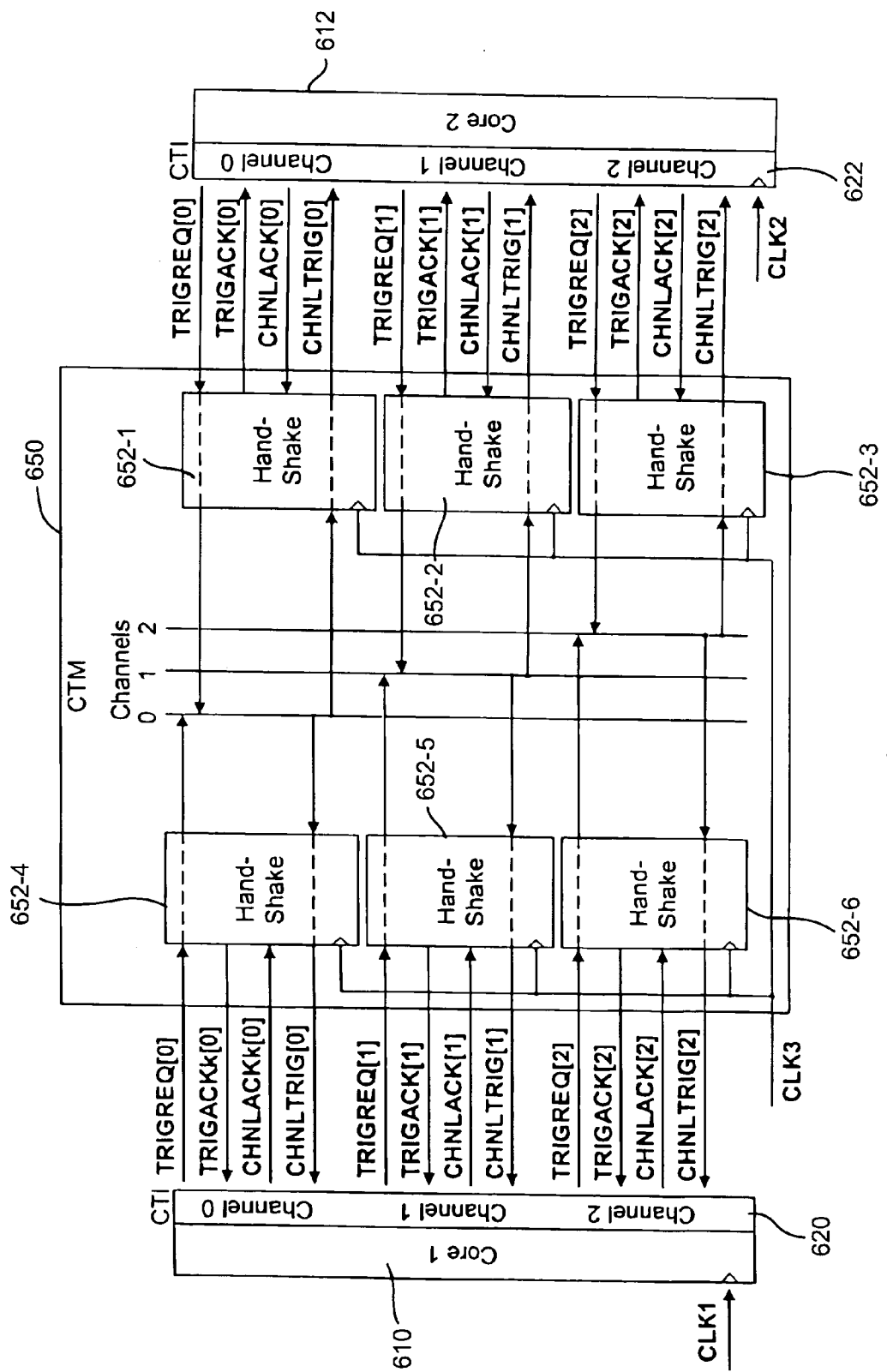
FIG. 6 schematically illustrates an on-chip signalling scheme according to the present technique.
Figure 9:
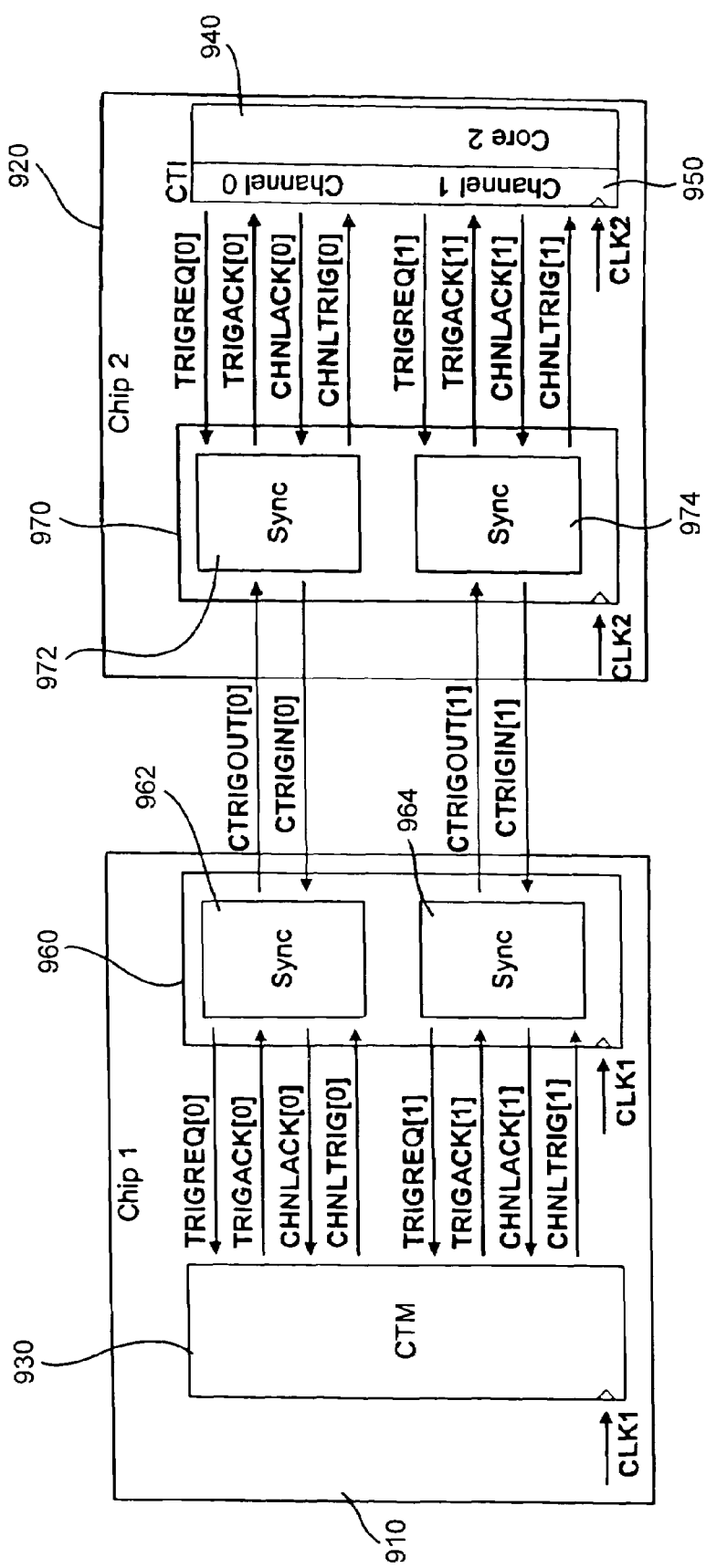
FIG. 9 schematically illustrates an off-chip signalling system according to the present technique.

FIG. 6 schematically illustrates an on-chip signalling scheme according to the present technique. An alternative off-chip signalling scheme is schematically illustrated in FIG. 9 and described below. The apparatus of FIG. 6 comprises: a cross-trigger matrix 650 having three channels; two processor cores 610, 612 and respective cross-trigger interface modules 620, 622. Since each of the two cores 612 is connected to the three channels of the cross-trigger matrix 650, a total of six handshake modules 652-1 to 652-6 are provided within the cross-trigger matrix. Each of the two cores 610, 612 is driven by its own independent clock signal CLK1 and CLK2 respectively. The six handshake modules 652-1 to 652-6 are driven by a common clock signal CLK3.

Diagnostic events are signalled on the three channels of the cross-trigger matrix using pulses. The rising edge of a pulse of a channel output is used to indicate a diagnostic event. Since each of the two cores 610, 612 has its own clock signal the processor cores in the system can be asynchronous and at different frequencies. For this reason a "handshake" signalling scheme is used for timing co-ordination. Handshake signalling is particularly suitable for asynchronous systems, as it automatically adapts to changes in clock frequency of components connected to the cross-trigger matrix 650. According to the handshake-signalling scheme, a CHNLTRIG event output by the CTM 650 in response to receipt of a TRIGREQ signal from one of the cores 610 or 612 must be held once asserted to a channel of the CTM 650 until an acknowledgement signal CHNLACK is received from a processor core. In alternative arrangements the CHNLTRIG event could be held until the acknowledgement CHNLACK is received from each of the devices subscribed to the channel to which the TRIGREQ signal was asserted. However this could disadvantageously introduce protocol deadlock in the event that one of the processor cores was powered off or if the processor's clock was disabled.

In the arrangement of FIG. 6, the handshake modules 652-1 to 652-6 each have sequential elements operable to acknowledge signals between each CTI channel port and the cross-triggered matrix. Accordingly, a handshake is dependent on only two clock domains: the cross-trigger module 650 clock domain CLK3 and the clock domain of the appropriate cross-trigger interface CLK1 or CLK2.

Since the rising edge of a pulse of a channel output is used to indicate a diagnostic event, the cross-trigger interfaces 620, 622 and the cross-trigger matrix 650 must be capable of performing edge detection. An event is propagated when a rising edge is detected. The following protocol applies to the handshake signalling performed by the apparatus of FIG. 6:

TRIGREQ (CTI 620, 622 output) and CHNLTRIG (CTM 650 output), is interpreted as an event only on the rising edge of the trigger signals.

Due to the handshake, TRIGREQ (CTI output) must stay active untii TRIGACK (corresponding handshake signal) has been received from the CTM 650, even if the signal from the core is deactivated.

In the cross-trigger matrix module, the channels are kept active (state '1') for a time as short as possible, and should return to state '0' even if TRIGREQ (CTM input) is still active.

To respect the handshake, the cross-trigger matrix 650 keeps CHNLTRIG activated until CHNLACK is received when a rising edge has been detected on the channel by a processor core.

Since diagnostic events broadcast on the cross-trigger matrix 650 could potentially emanate from asynchronous clock domains, two rules must be observed. Rule 1 is that any signal that is an input of the cross-trigger matrix 650 must be "glitch free". Otherwise any glitch in an output of a processor core could be propagated in the cross-trigger matrix 650 and erroneously interpreted as a diagnostic event. For this reason the cross-trigger interface modules 620, 622 are provided with circuitry operable to perform glitch removal when required. Rule 2 is that the outputs of the cross-trigger matrix 650 (CHNLTRIG and TRIGACK) must be synchronised to the local clock domain CLK1 or CLK2 before use by the processor core, if such synchronisation is not already present in the core. Synchronisation will also be performed in the CTI modules 620, 622 when necessary.

With regard to Rule 1, the synthesis tools used to perform debugging generally do not provide the necessary mechanism to constrain signals so that they are "glitch free". In the arrangement of FIG. 6 the processor cores 610, 612 are ARM9E-S (e.g. ARM946E-S) digital signal processing enhanced 32-bit RISC processor cores. The ARM9E-S includes embedded in-circuit emulator real-time logic capable of performing debugging. The ARM9E-S cores produce a debug acknowledge signal DBGACK which is the output of a combinatorial circuit (i.e. a 3-input OR gate). In this case there is no way to ensure, for all the inputs, that a simple change of state would not result in a glitch on the DBGACK signal. Such a glitch could be picked up as a pseudo-event by an asynchronous circuit.

In the arrangement of FIG. 6, each of the cross-trigger interfaces 620, 622 has an event register (not shown) for registering events from the respective processor core 610, 612. The events must be registered before being sent to the cross-trigger matrix 650 as TRIGREQ signals. However the event register can be bypassed if the TRIGREQ signal derives from the output of a register inside the core.

Figure 7:
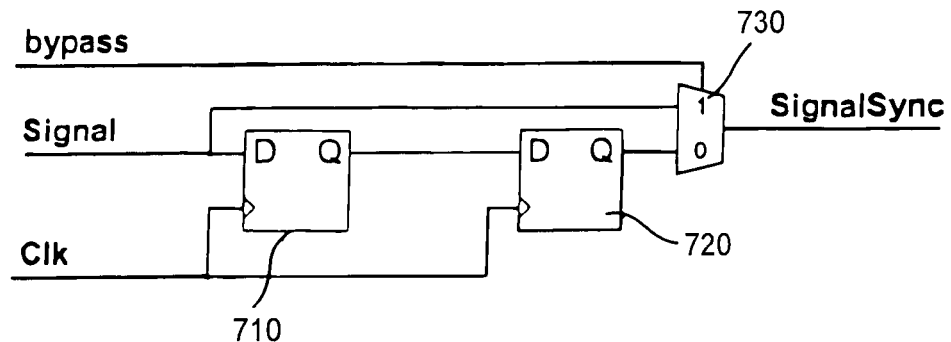
FIG. 7 schematically illustrates a standard two-register synchronisation that is used to achieve synchronisation of the cross-trigger matrix with the local clock domain of the processor in the arrangement of FIG. 6.

With regard to Rule 2, a standard two-register synchronisation is used to achieve synchronisation of the cross-trigger matrix with the local clock domain of the processor core 610 or 612. FIG. 7 schematically illustrates a synchronisation circuit suitable for this purpose. The circuit of FIG. 7 comprises two edge-triggered latches (registers) 710, 720 and a multiplexer 730. The edge-triggered latches 710, 720 are supplied with a common clock signal CLK. An input signal is supplied to the first edge-triggered latch 710, the output of which is supplied as input to the second edge-triggered latch 720. The input signal is also supplied as an input to the multiplexer 730 along with a bypass signal. The synchronised signal SIGNALSYNC is derived from the output of the multiplexer 730.

It will be appreciated that the synchronisation circuit of FIG. 7 may need to be adapted according to the target process on the processor core 610, 612. For example, the library rules of the processor core may require the use of specially designed synchronisation registers or that registers forming a synchronisation chain should be placed in close proximity to each other.

Figure 8:
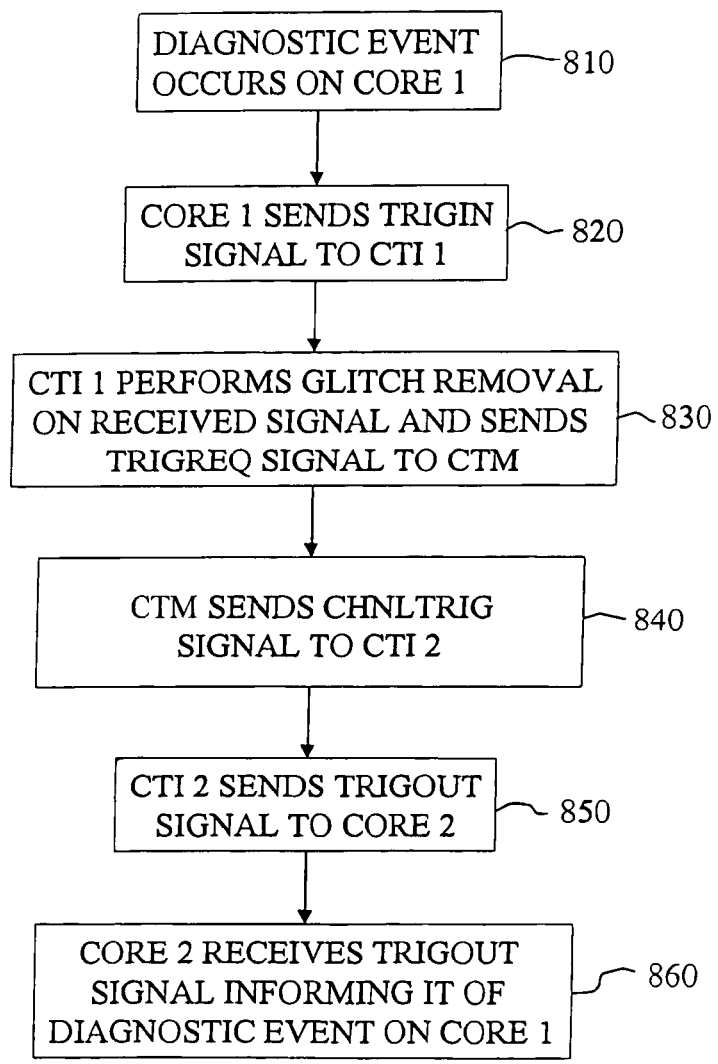
FIG. 8 is a flow diagram that schematically illustrates a sequence of communication starting with the occurrence of a diagnostic event on a first processor core and finishing with a second processor core being informed of the occurrence of the diagnostic event on the first processor core.

FIG. 8 is a flow diagram that schematically illustrates a sequence of communication starting with the occurrence of a diagnostic event on a first processor core and finishing with a second processor core being informed of the occurrence of the diagnostic event on the first processor core. This process may be considered in the context of the apparatus of FIG. 1. The process begins at stage 810 with the occurrence of the diagnostic event on the first processor core 110-1. The diagnostic event results in a TRIGIN signal being sent from the first processor core 110-1 to the corresponding cross-trigger interface 130-1. Then at stage 830, circuitry within the cross-trigger interface 130-1 performs glitch removal on the received TRIGIN signal and outputs a glitch-free TRIGREQ signal to the cross-trigger matrix 150. The cross-trigger matrix 150 forwards TRIGREQ signals from the first processor core to the second processor core 110-2 (via one of the CTM channels). The process then proceeds to stage 840 where the cross-trigger matrix sends a CHNLTRIG signal the cross-trigger interface 130-2 of the second processor core 110-2. At stage 860 the second processor core 110-2 receives a TRIGOUT signal sent to it by the cross-trigger interface 130-2 in response to the CHNLTRIG signal. Thus the second processor core 110-2 is informed of the occurrence of a diagnostic event on the first processor core 110-1 which allows a co-ordinated debugging operation to be performed.

It is apparent from the flow chart of FIG. 8 that a degree of latency is involved in communication of an event on one core to another core of a multi-core system according to the present technique. The latency corresponds to the number of clock cycles that elapse between the time a TRIGIN signal enters a cross-trigger interface until it is propagated as a TRIGOUT signal to another processor core.

Since the signal path in each cross-trigger interface 620, 622 and in the cross-trigger matrix 650 is combinatorial, the latency is attributable only to the synchronisation circuits. It follows that that in the worst-case the latency will be the sum of the following contributions:

i. One clock cycle of the CTI 620 or 622 sending a TRIGREQ event to the cross-trigger matrix 650 (due to removal of the glitch performed by CTI),
ii. The combinatorial delay due to the propagation of a TRIGIN event in one core to a TRIGOUT output to another core,
iii. Two clock cycles of the CTI 620 or 622, or both, receiving the CHNLTRIG event from the cross-trigger matrix 650 (due to synchronisation of the CTM 650 to the clock of the receiving core before output of the CHNLTRIG signal).

In certain cases, it may be possible to reduce this worst-case latency. In particular, if the TRIGIN signal sent by the processor is the output of a flip-flop, then there is not need to register the signal in the corresponding cross-trigger interface since it will be glitch-free on receipt from the core. The worst-case latency may also be reduced if the core being interfaced by the cross-trigger matrix 650 has internal synchronisation logic, e.g. if the processor has been specified to receive an asynchronous signal. Furthermore, if all the processors in the multi-core system are synchronous a SYNCBYPASS signal can be activated. However, this path should respect the layout and synthesis timing constraints.

The cross-trigger system of FIG. 6 has been designed such that it has a degree of flexibility with regard to connectivity to devices (e.g. processor cores) having different characteristics. This is achieved by configuring the system such that certain parameters that can be changed depending on the processor characteristics. Accordingly, the user can specify which signals are glitch-free and which signal inputs can be asynchronous. The system also comprises a SYNCBYPASS input that can be activated when the processors are synchronous and the layout and timing constraints permit the synchronisation circuitry to be bypassed.

Even when a processor clock is stopped, for example when waiting for an interrupt, the corresponding cross-trigger interface 620, 622 can receive an event from the cross-trigger matrix.

In the case where the cross-trigger interface clock CLK1, CLK2 is the same as the core clock CLK3, the CHNLTRIG signal output by the cross-trigger matrix 650 is kept active until a CHNLACK is received from a cross-trigger interface 620, 622. The cross-trigger matrix 650 will only receive the CHNLACK once the processor clock has started again. In this case, out-of-date events may happen on the core. This does not avoid the channel being used by other processors.

If the clock is not stopped for the cross-trigger interface 620, 622 as for the core 610, 612, then the cross-trigger interface will try to raise an event to the core using the TRIGOUT signals. The behaviour is dependent on the processor. To avoid raising an event on the core using TRIGOUT signals, the processor can be configured to disable its cross-trigger interface before stopping the clock.

The on-chip handshake signalling scheme of FIG. 6 is unsuitable for use with off-chip processors. This is because it is too expensive, in terms of pin-availability and cost, to return a handshake signal off-chip. FIG. 9 schematically illustrates an off-chip signalling system according to the present technique. The circuit of FIG. 9 comprises a first chip 910 having a cross-trigger matrix 930 and a second chip 920 having a processor core 950 and an associated cross-trigger interface 950. Each of the two chips is provided with an on-chip signalling interface module 960 or 970. The first signalling module 960 is connected to the cross-trigger matrix 930 on the first chip whereas the second signalling module 970 is connected to the cross-trigger interface 950 of the processor core 940 on the second chip. The two signalling modules 960, 970 mediate communication between the cross-trigger interface 950 and the cross-trigger matrix 930 by converting the two-wire handshake to a single signal. Accordingly, rather than the four signals TRIGREQ, TRIGACK, CHNLTRIG, CHNLACK passing directly between CTM 930 and CTI 950 off-chip, only two signals CTRIGIN and CTRIGOUT are passed off-chip. The protocol implemented between two signalling modules is frequency-independent pulse triggering. Each of the signalling modules 960, 970 has two synchronisation units 962, 964, 972, 974 i.e. one for each channel supported by the cross-trigger matrix 930.

Figure 10:
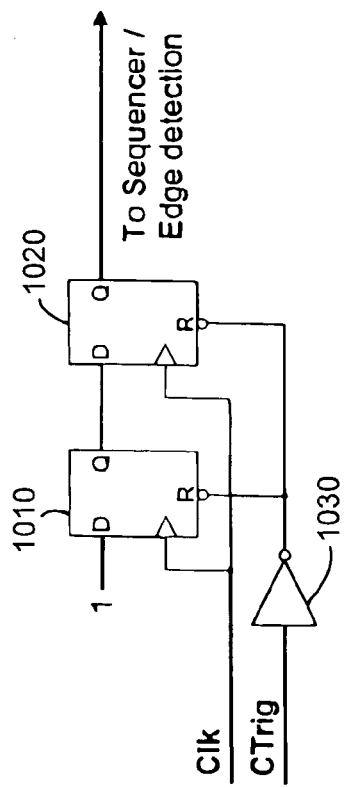
FIG. 10 schematically illustrates an edge-capturing circuit of the type used in the synchronisation modules of the arrangement of FIG. 9.

FIG. 10 schematically illustrates an edge-capturing circuit of the type used in the synchronisation units 962, 964, 972, 974 of FIG. 9. The circuit of FIG. 10 comprises a first register (edge-triggered latch) 1010 in series connection with a second register (edge-triggered latch) 1020 and an inverter 1030 which receives input from a cross-trigger signal Ctrig. The output of the inverter 1030 is supplied as reset signals to each of the edge triggered latches 1010, 1020. The output of the second register 1020 is supplied to a sequencer circuit for edge detection.

The principle of operation of the circuit of FIG. 10 will now be described. The outputs of the two registers 1010, 1020 are initialised to '1'. The rising edge of the CTrig signal causes both registers to become reset ('0'). The two registers are clocked by de-assertion of Ctrig in the same clock cycle. A minimum of 1 cycle with the output '0' is guaranteed by the use of the two registers 1010, 1020. The sequencing logic can therefore detect the low transition on the output from this circuit and associate this with an event to the cross-trigger matrix 930 or cross-trigger interface 950, while respecting the handshake signalling.

To respect the handshake protocol as described above in relation to the operation of FIG. 6, the output of the edge-capturing circuit of FIG. 10 should be connected to an edge-detection and handshake component.

All of the chip components in the circuit of FIG. 9 are designed to cope with asynchronous events. Nevertheless, the first signalling module 960 uses the same clock CLK1 as the cross-trigger matrix 930 to which it is connected. Likewise, the second signalling module 970 uses the same clock CLK2 as the cross-trigger interface to which it is connected. This gives improved latency due to the fact that means that no synchronisation is required between these modules.

If one of the chips 910 or 920 of FIG. 9 can be turned off, then the cross-trigger (Ctrig) output will stop being driven and the other chip may interpret this input as a logical '1' (depending on the technology). This is likely to propagate a false event into the cross-trigger matrix 930 or cross-trigger interface 950. However, there is no deadlock possibility, since due to the edge detection only one event can be detected. The propagation of false events is avoided by adding a pull-down register on the CTrig input in FIG. 10.

Figure 11B:
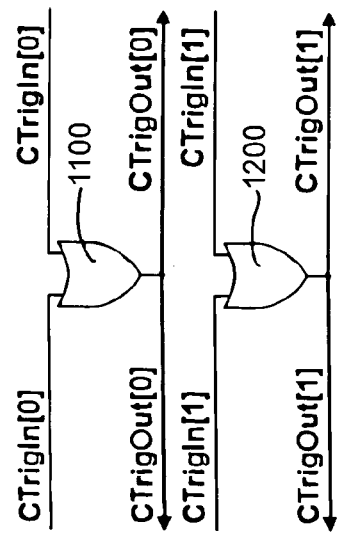
FIGS. 11A and 11B schematically illustrate how the two channels of the cross-trigger matrix of FIG. 9 operate.
Figure 11A:
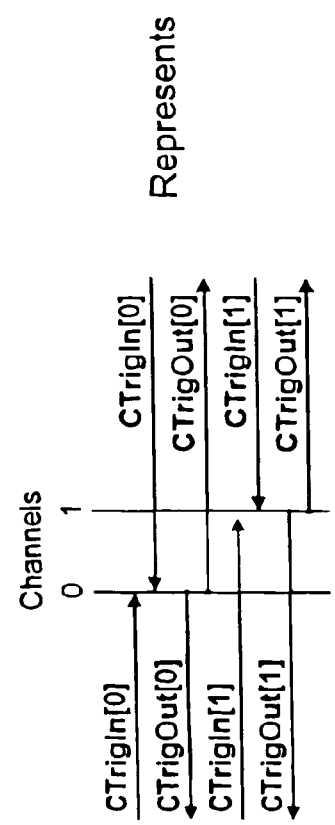

FIGS. 11A and 11B schematically illustrate how the two channels of the cross-trigger matrix 930 of FIG. 9 operate. As illustrated in FIG. 11A, the cross-trigger matrix 930 is a simple crossbar consisting of a number of channels (in this case two). Each channel is represented as a vertical line in FIG. 11A and inputs and outputs to a channel are represented by horizontal arrows. In this case each channel has two inputs CTrigIn[0], CTrigIn[1] and two outputs CTrigOut[0], CTrigOut[1]. FIG. 11B illustrates the logical processing performed on the input signals to each channel to produce the single bit output signals CTrigOut[0] and CTrigOut[1]. On channel 0, the two input signals labelled CTrigIn[0] are supplied to an OR gate 1100 whose single bit output is CTrigOut[0]. Similarly the output of channel 1 CTrigOut[1] is the logical OR of the inputs to that channel. A channel can be used to represent some diagnostic occurrence or condition such as a breakpoint or a watchpoint having been reached.

There are a number of system dependent parameters that define the cross-trigger matrix 930. In particular the following ratios define the cross-trigger matrix (i.e. routing module) characteristics:
number of channels:number of OR gates
number of channel sources:number of inputs for these OR gates
number of channel sinks:number of signals connected to the output of these OR gates.

The cross-trigger matrix 650 also contains some sequential elements to complete the handshake signalling with the cross-trigger interface as illustrated in FIG. 6.

Figure 12:
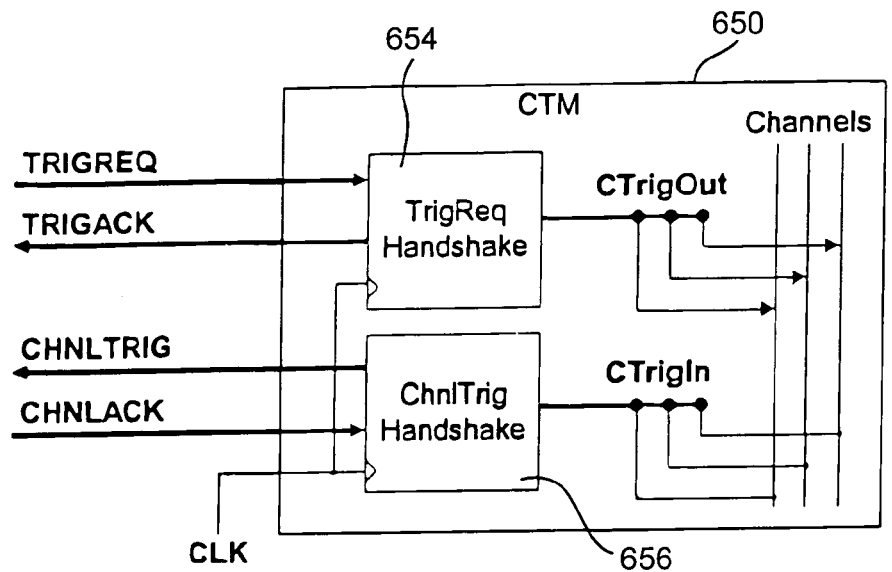
FIG. 12 schematically illustrates how the sequential elements of the cross-trigger matrix of FIG. 6 are connected.

FIG. 12 schematically illustrates how the sequential elements of the cross-trigger matrix of FIG. 6 are connected. To simplify the circuitry, FIG. 12 shows the interface with only one processor. Note that TRIGREQ, TRIGACK, CHNLTRIG and CHNLACK signals are busses having one bit per channel, and that an independent handshake is implemented for each bit. The circuit of FIG. 12 shows a trigger-request handshake module 654 that mediates communication of TRIGREQ and TRIGACK signals between the cross-trigger matrix 650 and the cross-trigger interface 620 and outputs a CTRIGOUT signal to each of the three channels within the cross-trigger matrix 650. A channel trigger handshake module 656 mediates communication of CHNLTRIG and CHNLACK signals between the cross-trigger matrix 650 and the cross-trigger interface 620 and picks off a CTRIGIN signal from each of the three channels within the cross-trigger matrix 650. The CTRIGIN signal broadcasts the occurrence of a event on a given processor to the other processor cores of the multi-core system whereas the CTRIGOUT signal indicates the occurrence of a diagnostic events on the other processor cores to the given processor.

Note that there is a requirement that some or all ports of the cross-trigger matrix should be connectable to another cross-trigger matrix port, to allow multiple cross-trigger systems to be connected together, as schematically illustrated in FIGS. 2 and 3.

Figure 13:
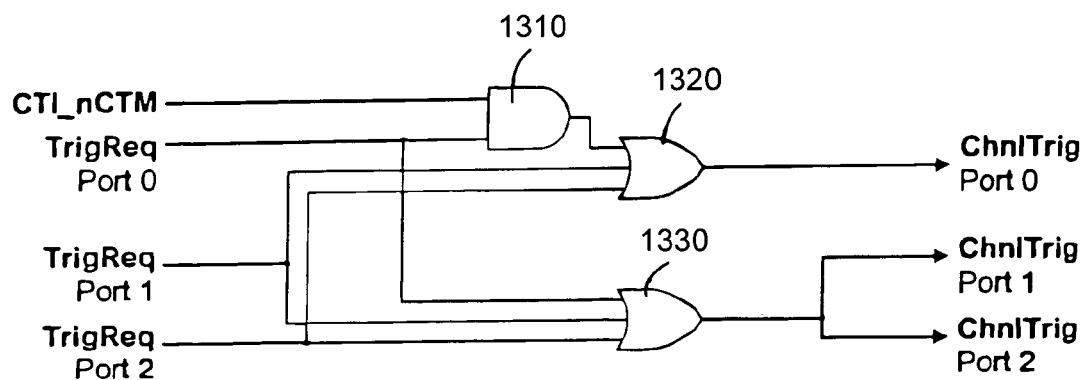
FIG. 13 schematically illustrates a circuit used in the cross-trigger matrix to avoid a combinatorial loop.

FIG. 13 schematically illustrates a circuit used in the cross-trigger matrix to avoid a combinatorial loop. The combinatorial loop involves the occurrence of the signal sequence TRIGREQ→CHNLTRIG→TRIGREQ, when one cross-trigger matrix port is connected to another cross-trigger matrix port as in FIG. 3. Note that there is not a strict requirement that all ports should incorporate the circuit of FIG. 13.

The circuit of FIG. 13 comprises an AND gate 1310, a first OR gate 1320 and a second OR gate 1330. The first OR gate receives as input, a TRIGREQ signal from port 1 and a TRIGREQ signal from port 2. However a TRIGREQ signal from port 0 is supplied as an input to the first OR gate via the AND gate 1310. The AND gate 1310 receives a second input in the form of a masking signal CTI_nCTM. The second OR gate 1330 receives three inputs corresponding to TRIGREQ signals from each of the three ports. The output of the second OR gate 1330 is supplied both as a CHNLTRIG signal for port 1 and a CHNLTRIG signal for port 2. The output of the first OR gate 1320 corresponds to a CHNLTRIG signal for port 0. The masking signal CTI_nCTM is used to enable/disable masking of the TRIGREQ signal from port 0. In particular, when CTI_nCTM has value '0', the AND gate has a low output and thus masks the TRIGREQ signal from port 0 such the corresponding CHNLTRIG signal for port 0 is suppressed. Note however that even when CTI_nCTM is '0' the TRIGREQ signal from port 0 is still propagated as input to the second OR gate 1330.

Figure 14:
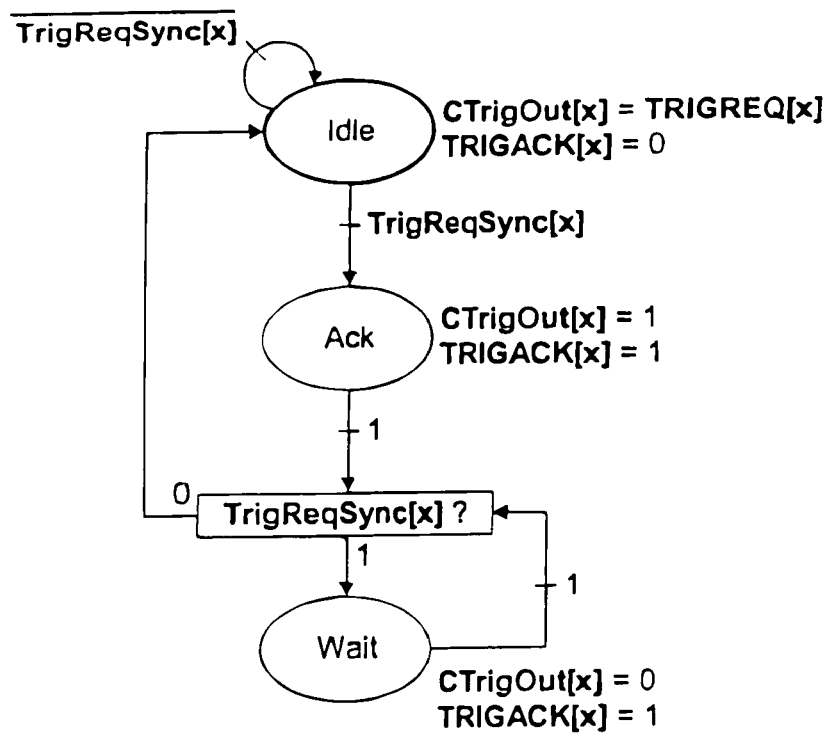
FIG. 14 shows a state machine used for the TRIGREQ Handshake signalling.

FIG. 14 shows the state machine used for the TRIGREQ Handshake. This state machine is clocked by a signal CLK, and is instantiated for each bit in the bus. As shown in FIG. 14, during the Idle state, the CtrigOut signal (Input of the channel OR-gate) is driven by the combinatorial TRIGREQ signal. As soon as the signal becomes active ('1'), the channel becomes active too, without any synchronisation.

The state machine of FIG. 14 uses the TrigReqSync signal, which is a synchronised version of the TRIGREQ signal. The synchronisation is performed by the circuit of FIG. 7. The TrigReqSync signal is used to change the state from Idle to Ack. During the Ack state, the acknowledgement signal TRIGACK is activated. The channel signal CtrigOut is kept activated for one more clock cycle.

In order to detect the transition from '0' to '1' only for TRIGREQ, the state machine will stay in the Wait state until the TrigReqSync is deactivated. It also ensures that the acknowledgement has been received from the cross-trigger matrix by the cross-trigger interface. At this time, the input of the cross-trigger matrix is deactivated. When all of the processor cores in the multi-core system use the same clock, it is possible to tie the SYNCBYPASS signal to '1' so that the synchronisation is not used.

Figure 15:
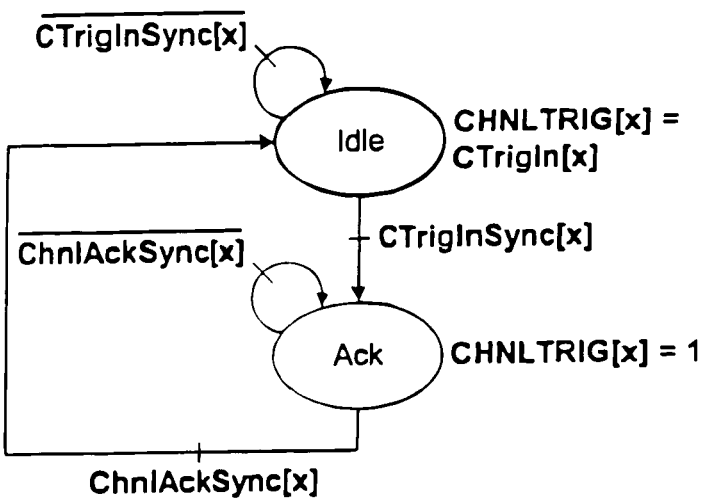
FIG. 15 shows a state machine used for the CHNLTRIG handshake signalling.

FIG. 15 shows the state machine used for the CHNLTRIG handshake. This state machine is clocked by the CLK signal, and is implemented once for each bit of the CHNLTRIG signal. The CTrigInSync and ChnlAckSync signals are the synchronised version of the CTrigIn and CHNLACK signals, and should use the same circuit as for TrigReqSync, i.e. the synchronisation circuit of FIG. 7. From FIG. 15 it can be seen that during the Idle state, the channel output CHNLTRIG is connected to CTrigIn (input of the channel OR gate) so that the latency is not increased by any clock cycle. During the Ack state, CHNLTRIG is kept alive until the acknowledgement signal (CHNLACK) is received. The synchronised version of this circuit is used.

Figure 16:
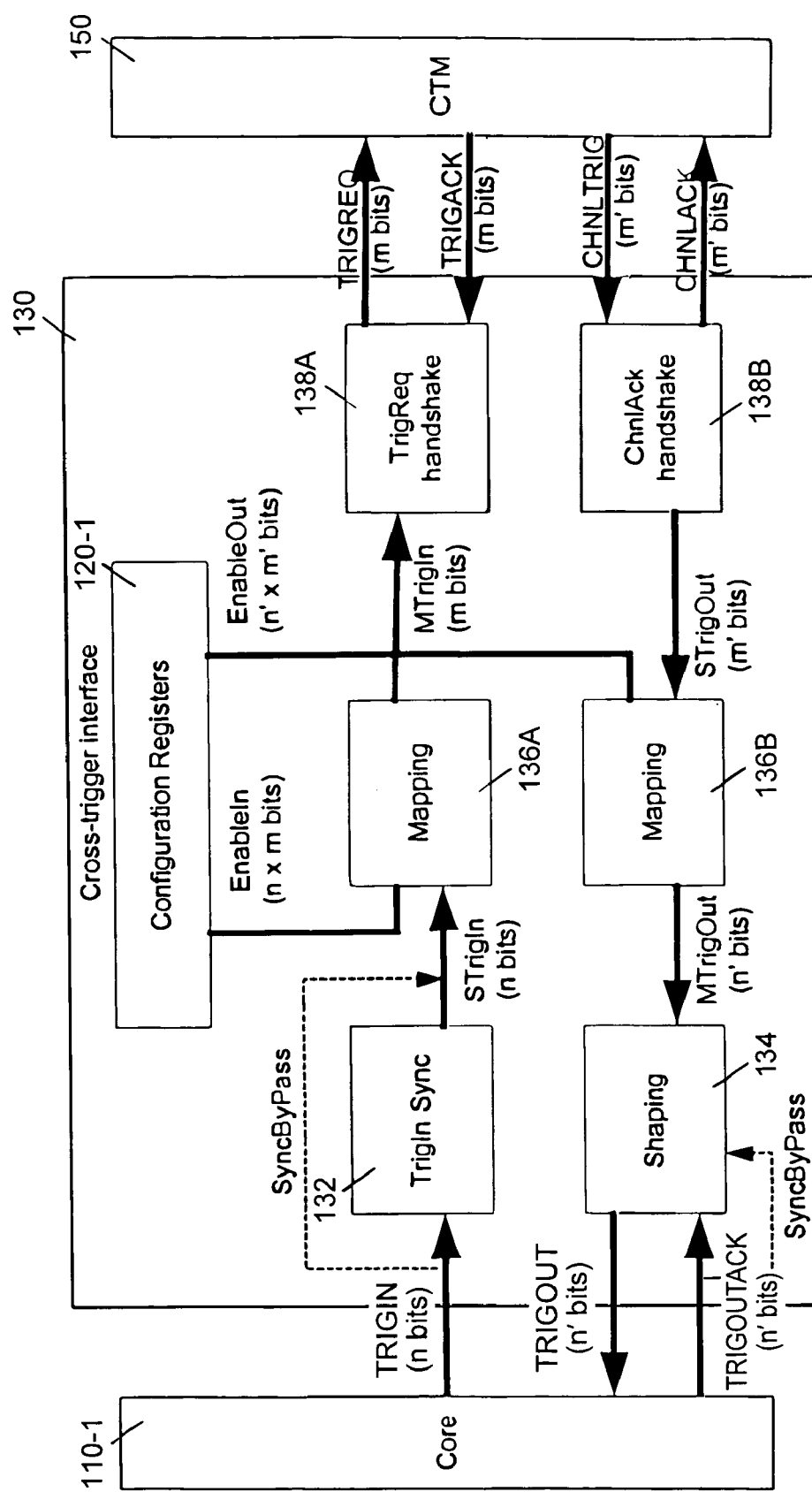
FIG. 16 schematically illustrates the detailed internal structure of the cross-trigger interface of FIG. 1.

FIG. 16 schematically illustrates the detailed internal structure of the cross-trigger interface 130 of FIG. 1. Note that each signal represented on FIG. 16 is a data bus, the width of each bus being dependent on the implementation. The circuit comprises a TrigIn synchroniser 132, which receives a TRIGIN signal from the processor core 110 and outputs a synchronised signal STRIGIN. The TrigIn Synchroniser 132 is a simple flip-flop that registers the TRIGIN signal to avoid any glitch problem. This block 132 can be bypassed when the synchronisation is not needed, depending on the processor. The STRIGIN signal is supplied as input to a first mapping module 136A, which controls the driving of source signals onto channels of the cross-trigger matrix 150. The output from the first mapping module 136A is supplied as input to a TrigReq handshake module 138A (which performs the same function as the corresponding module illustrated in FIG. 12). The TrigReq handshake module 138A outputs a TRIGREQ signal to the cross-trigger matrix 150 and is operable to receive an acknowledgement signal TRIGACK from the cross-trigger matrix 150.

The cross-trigger interface 130 also comprises circuitry for processing incoming CHNLTRIG signals generated by the cross-trigger matrix 150. In particular a CHNLACK handshake module 138B is provided for receiving a CHNLTRIG signal, from the cross-trigger matrix 150 and for returning an acknowledgement signal CHNLACK to the CTM. The CHNLACK handshake module 138B outputs a signal STRIGOUT and feeds it to a second mapping module 136B, which is operable to control the driving of sink signals out of the cross-trigger matrix 150. The second mapping module 136B outputs a signal MTRIGOUT to a shaping module 134. The shaping module 134 performs output waveform shaping on the MTRIGOUT signal, the nature of which depends on the signal that is interfaced to the core. When the receiving processor core expects that an incoming signal be fully synchronised, the 2-stage synchronisation block of FIG. 7 should be used. This synchronisation can be bypassed if all the processors are synchronous. The shaping module, outputs a TRIGOUT signal, which is fed to the processor core 110. Both the first and second mapping modules 136A, 136B are connected to the configuration registers 120. The synchronisation performed in the TRIGIN synchroniser 132 and the shaping module 134 may be bypassed where appropriate.

The cross-trigger interface circuit of FIG. 16 allows the core to broadcast and respond to (enabled) diagnostic events on the cross-trigger matrix. Typical functions performed by the cross-trigger interface include: edge capture of core events; shaping of signals broadcast to the core and the cross-trigger matrix; performing handshake with the cross-trigger matrix; selection of particular outputs of the core for assertion to each channel (using configuration registers 120); and selection of channels from which to pick-off asserted signals to generate events to the local core.

The TRIGIN bus may carry information on any event from the core, and is synchronised by registers. However, the synchronisation block can be bypassed if not required. Depending on the configuration registers 120, the TRIGIN signal can be asserted to one or more of the broadcast channels. The cross-trigger interface 130 will detect the edge and control the handshake with the cross-trigger matrix 150.

When a CHNLTRIG event is received from the cross-trigger matrix 150, the cross-trigger interface 130 manages the handshake with the cross-trigger matrix 150. Depending on the configuration specified by the configuration registers 120, this event can be forwarded to the core 110. The "shaping" block 134 ensures that the core 110 can understand this CHNLTRIG event. An acknowledgement signal may be needed for this task (for example DBGACK for DBGRQ).

A lockout situation may occur if DBGACK is used as an input trigger at the same time that DBGRQ is used as an output trigger (precipitating a chain reaction). To avoid this occurring, the DBGRQ output should not be activated when the processor is already in debug mode (i.e. when DBGACK is already activated).

Figure 17:
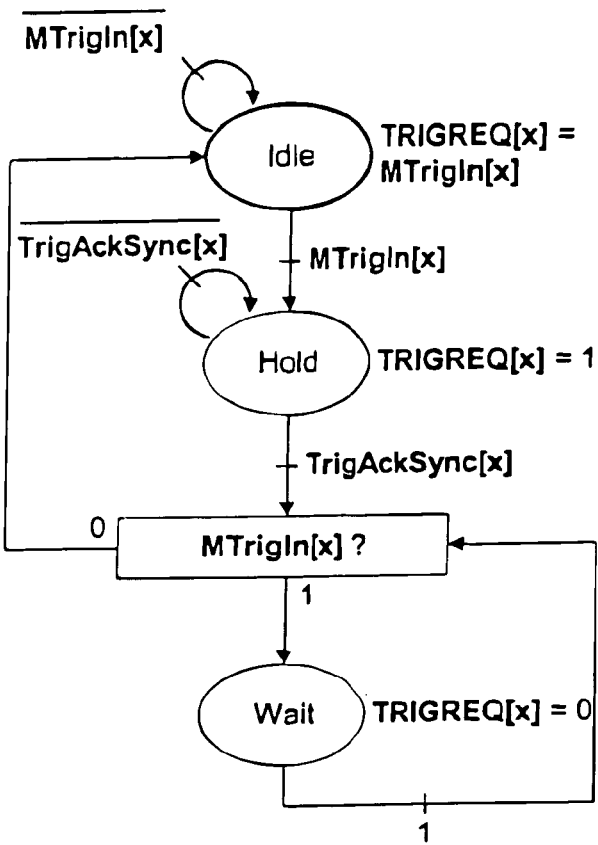
FIG. 17 shows a state machine, which is represents the handshake performed on the TRIGREQ signal of FIG. 16.

FIG. 17 shows a state machine, which represents the handshake performed on the TRIGREQ signal of FIG. 16. This state machine is instantiated once for each bit of TRIGREQ bus. As illustrated in FIG. 17, when an event is detected on one bit of the MTRIGIN bus, it is propagated directly to the corresponding bit of TRIGREQ, and the state is set to Hold. During the Hold state, TRIGREQ is kept activated until the acknowledgement signal TRIGACK is received. The synchronised version of this signal (TRIGACKSYNC) is used. The Wait state is entered when MTRIGIN is '1' while the acknowledgement signal has already been received.

Figure 18:
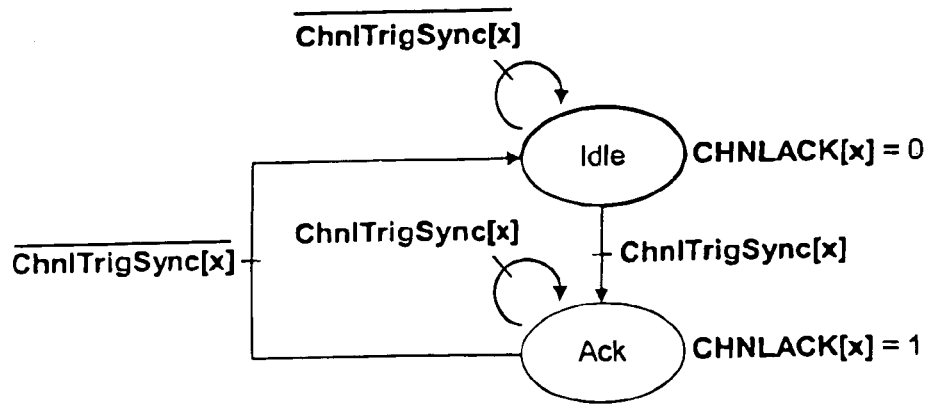
FIG. 18 shows a state machine representing the handshake performed on each bit of the CHNLTRIG bus of FIG. 16.

FIG. 18 shows a state machine representing the handshake performed on each bit of the CHNLTRIG bus of FIG.

16. This state machine uses the CHNLTRIGSYNC signal, which is the synchronised version of the CHNLTRIG signal. This synchronisation can be bypassed when all the processors are synchronous, by fixing SYNCBYPASS to '1'.

We shall now consider in detail the circuitry of the configuration registers 120 of the cross-trigger interface 130. The configuration registers 120 are used to control the driving of source signals onto and the driving of sink signals out of channels in the cross-trigger matrix 150. The exact format, distribution and access mechanism of the configuration registers is not fixed. This means that the system according to the present technique is readily adaptable for use with many different processor cores from different manufacturers. However a recommended register specification for ARM processors, and other processors (where possible) will be specified below.

Figure 19:
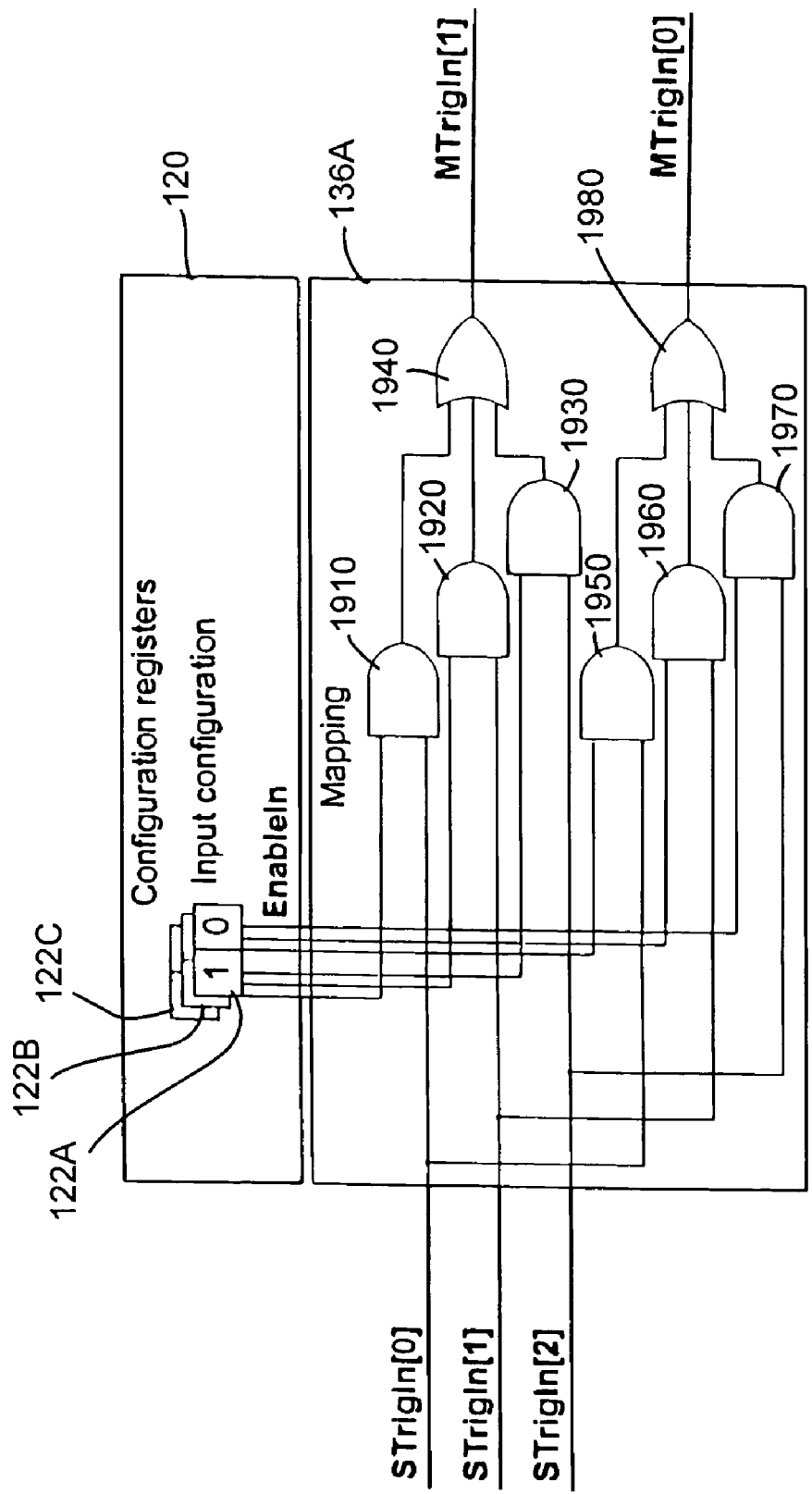
FIG. 19 schematically illustrates the configuration registers that control the events being generated by the core of the arrangement of FIG. 1.

FIG. 19 schematically illustrates the configuration registers that control the events being generated by the core 110. As illustrated in FIG. 19, STRIGIN (input to the first mapping module 136A) is a 3-bit bus, and the cross-trigger interface 130 is connected to 2 channels. The circuit of FIG. 19 comprises three 2-bit registers 122A, 122B and 122C (one bit per channel) which drive signals onto a 6-bit EnableIn bus. Each of the three STRIGIN signals is fed as input to an AND gate associated with the first channel and an AND gate associated with the second channel. Accordingly, the circuit has three AND gates 1910, 1920, 1930 associated with the first channel, whose outputs are supplied to a first OR gate 1940 and three AND gates 1950, 1960, 1970 associated with the second channel, whose outputs are supplied to a second OR gate 1980. The second input to each AND gate is supplied from a respective configuration register via the EnableIn bus. If the register entry is '0' the STRIGIN signal of the channel is masked by the corresponding AND gate. The output of the first OR gate 1940 corresponds to MTRIGIN[1] whereas the output of the second OR gate 1980 corresponds to MTRIGIN[0].

Note that the user might want to ensure that only one input signal is mapped to a channel, and that only one channel drives an output trigger. Such a situation would be fully supported by the cross-trigger interface, however there is no mechanism for identifying which signal raised the event if more than one was enabled.

Figure 20:
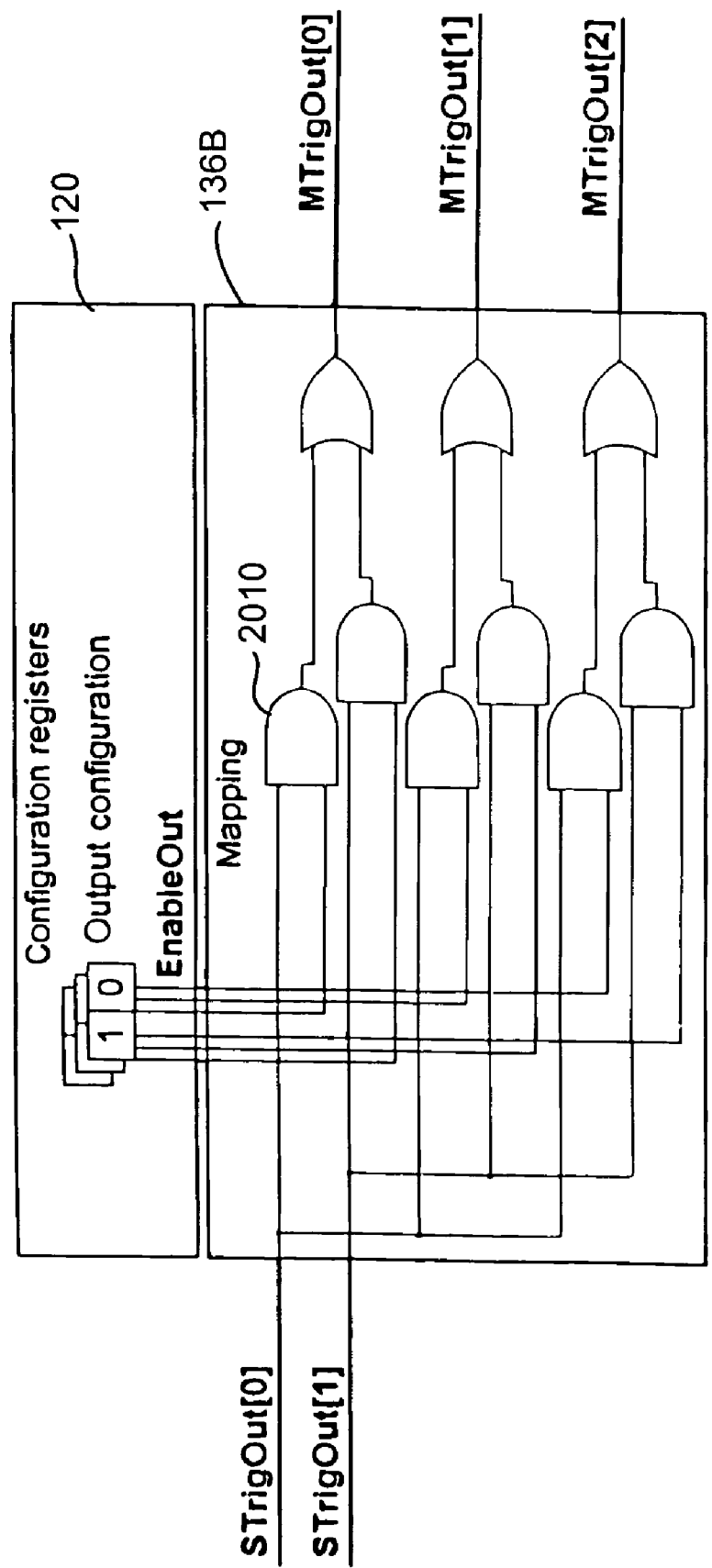
FIG. 20 schematically illustrates configuration registers that control the events (occurring on remote cores) being notified to the core.

FIG. 20 schematically illustrates configuration registers that control the events occurring on other cores being notified to the core associated with the particular cross-trigger interface to which the configuration registers belong. In this case MTRIGOUT is a 3-bit bus and the cross-trigger interface implements 2 broadcast channels. The circuit functions in a similar manner to that of FIG. 19 and comprises three sets of LOGIC gates, each set having two AND gates which supply inputs to an OR gate. However in this case signals STRIGOUT[0] and STRIGOUT[1] (which are inputs to the second mapping module 136B) are supplied as inputs to the AND gates along with the EnableOut signal from the configuration registers. The outputs from the three OR gates MTRIGOUT[0], MTRIGOUT[1] and MTRIGOUT[2] are subsequently supplied as input to the shaping module 134.

Figure 21:
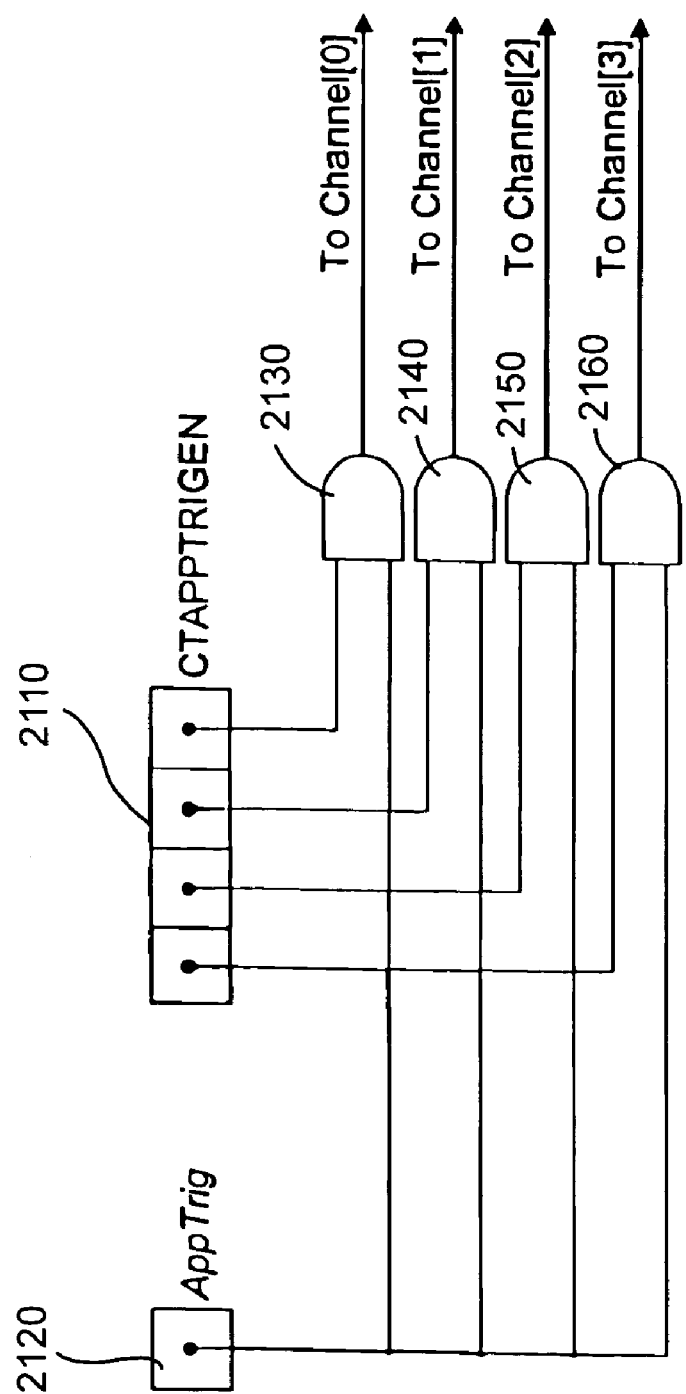
FIG. 21 schematically illustrates an application driven trigger that can be used by an application or debugger of a given processor core to generate TRIGIN events for broadcast to other processor cores of the multi-core system.

FIG. 21 schematically illustrates an application driven trigger that can be used by an application or debugger of a given processor core to generate TRIGIN events for broadcast to other processor cores of the multi-core system. The circuit comprises a register (CTAPPTRIGEN) 2110 having one bit for each channel supported by the cross-trigger matrix and an associated register bit 2120, the AppTrig bit. Each of the bits of the CTAPPTRIGEN register 2110 (in this case 4 bits) is supplied as an input to a respective AND gate 2130, 2140, 2150, 2160. The AppTrig bit 2120 supplies the other input to each of the four AND logic gates. The CTAPPTRIGEN register serves to enable the application driven trigger on the desired channel(s). A transition from '0' to '1' on the AppTrig register bit 2120 will raise an event on all channels that are enabled. Accordingly, when an application wants to raise a TRIGIN event, it will have to enable the correct bits in the CTAPPTRIGEN register 2110, then write the AppTrig bit 2120. The event will thus be raised although the AppTrig bit 2120 will have to be cleared before raising another event.

According to the present technique, the exact mechanism for programming the configuration register is not fixed. Rather, the mechanism of programming the configuration register is optimised for the particular core/debugger configuration of the multi-device system that is being targeted. However access channels to the configuration registers could be provided via either (a) memory mapped access or (b) scan access. The scan access is provided using a Joint Test Action Group (JTAG) serial interface. A combination of access mechanism may be provided if required (e.g. both memory mapped and scan). According to the present technique each processor core is made responsible for the configuration of the cross-trigger signals relevant to it. This has the advantage that the software running on that core or a debugger attached to that core can directly control the cross-triggering events pertinent to it.

With regard to memory mapped access, for simplicity, the configuration registers are presented as a memory mapped slave device that can be programmed by the processor core to which the registers relate. For ARM processors, the configuration registers are accessed as a standard Advanvced Microcontroller Bus Architecture (AMBA) slave. The AMBA specification includes an Advanced System Bus (ASB) which is used to connect high-performance system modules; an Advanced Peripheral Bus (APB) which offers a simpler interface for low-performance peripherals; and an Advanced H. Bus (AHB). However the use of memory-mapped registers to configure the cross-trigger matrix 150 introduces some system security/stability issues that should be addressed. The number and complexity of security mechanisms introduced will depend on the target system.

With regard to scan access to the configuration registers, this provides configuration through a scan channel such as the ARM Multi-In-Circuit Emulator.

The advantages of scan access are: it is inherently "secure" in that a connection must be made via the scan interface, although it does not prevent device probing unless tied off internally for production; this is the same access mechanism as used by ARM debug tools for core access; and it allows for non-intrusive configuration and observation of the cross-trigger matrix set-up.

The non-intrusive configuration is a useful feature when the cross-trigger matrix 150 is being used to drive the Embedded Trace Macrocell (ETM) or in situations where an intrusive configuration of the cross-trigger matrix 150 would alter the behaviour of the system in the run-up to an interesting event.

A disadvantage of scan type access to the configuration registers is that software running on core cannot participate with cross-trigger configuration or triggering. This disadvantage is overcome by using a combination of access mechanisms e.g. enable signals controlled by scan access but application driven signals located in memory mapped registers. A further disadvantage of the scan technique is that the debugging environment may not be using scan, e.g.

debug monitor systems with serial Universal Asynchronous Receiver/Transmitter (UART) connection.

Because the cross trigger matrix can be used to generate intrusive debug events, it is important to ensure that the cross trigger matrix 150 is only used during product development, and that its use (either inadvertently or maliciously) in a production system is prevented. According to the present technique, the following access mechanisms are proposed for protecting the cross-trigger matrix 150 from unwanted configuration. One or more of these access mechanisms may be implemented in a given system.

Debug enable: all debug capable ARM processors feature an external input, DBGEN that can be used to disable the debug features of the core. In development systems, DBGEN is tied high and the debug facilities are available. In production systems, DBGEN can be tied low. It is recommended that DBGEN is used to disable the cross-trigger interface.

Access key: This mechanism requires a suitable key to be presented to the cross-trigger system before it is enabled or configured. The system designer could customise the key for appropriate levels of protection, or extend it so that a sequence of keys is needed to access the control registers.

Privileged access: this mechanism restricts access to the configuration registers so that only privileged (supervisor mode) code can access them. It can be performed either by software by protecting the memory region where the configuration registers are located using a Memory Protection Unit (MPU) or Memory Management Unit (MMU); or at the bus level, where the slave rejects unprivileged accesses.

Note that the Advanced Peripheral Bus (APB) of the AMBA specification, which offers a simple interface for low-performance peripherals, does not include privilege signals (HPROT). Consequently the bus level protection cannot be used with an APB slave.

Furthermore, there may be cases where it might be desirable to allow user-mode accesses to some registers (e.g. application driven triggers) but not others (cross-trigger enables). The bus level protection might not be suitable in this case, as it requires a finer granularity than is desirable in the AHB slave of the AMBA specification.

Figure 22:
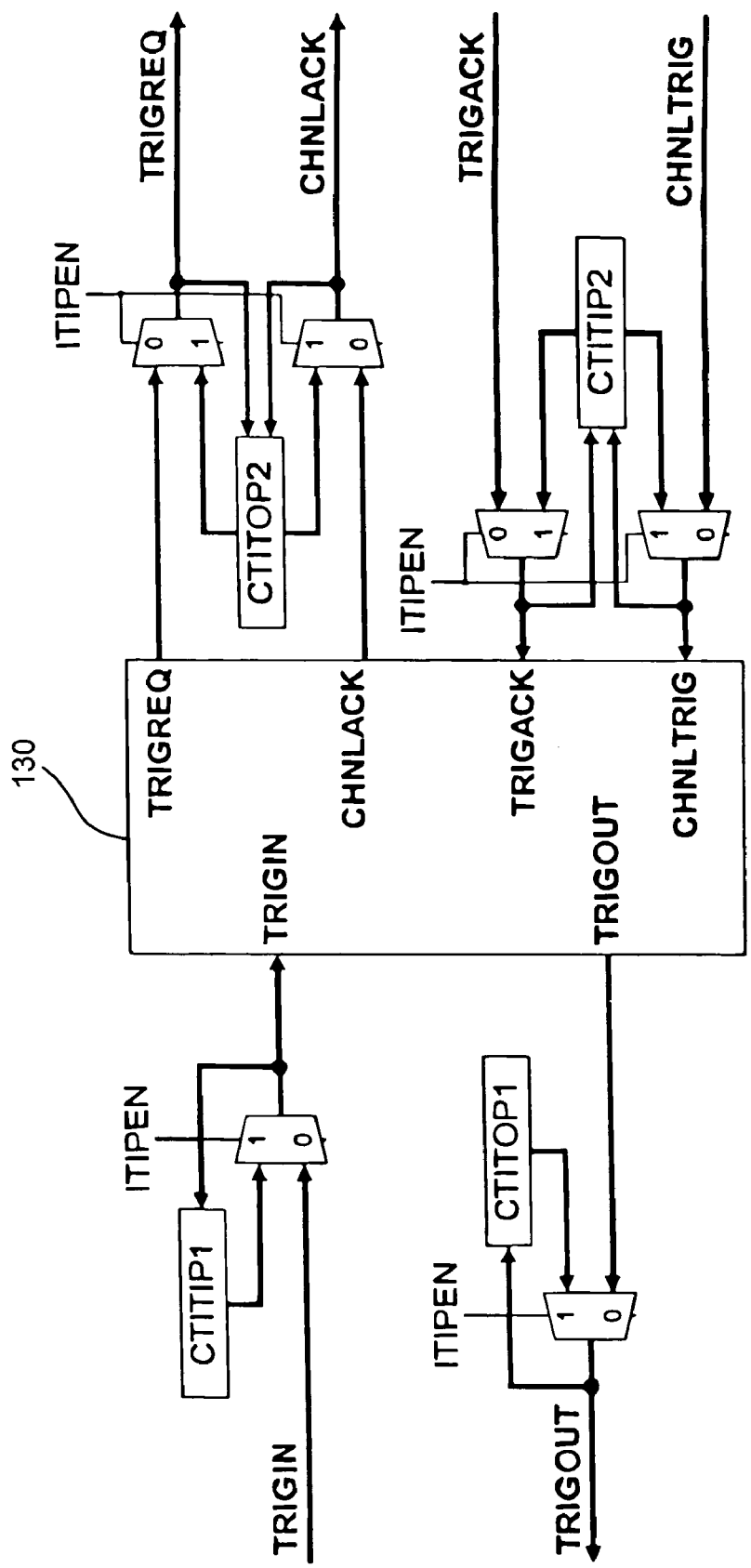
FIG. 22 schematically illustrates integration logic for use in the cross-trigger interfaces and operable to enable integration tests to be performed in all conditions.

FIG. 22 schematically illustrates integration logic for use in the cross-trigger interfaces 130 and operable to enable integration tests to be performed in all conditions. The circuit comprises six multiplexers and four registers CTITIP1, CTITIP2, CTITOP1 and CTITOP2, which have a special behaviour. In particular, when the corresponding enable bit it active, a write to the register specifies the value to be driven for the corresponding signal. Reading the register returns the value after the multiplexer. When the enable bit is active, returns the value that was written into the register. These registers can be used to perform integration tests as defined for the PrimeCell components. Note that a global bit call ITEN must be activated before any integration tests can be performed.

Figure 23:
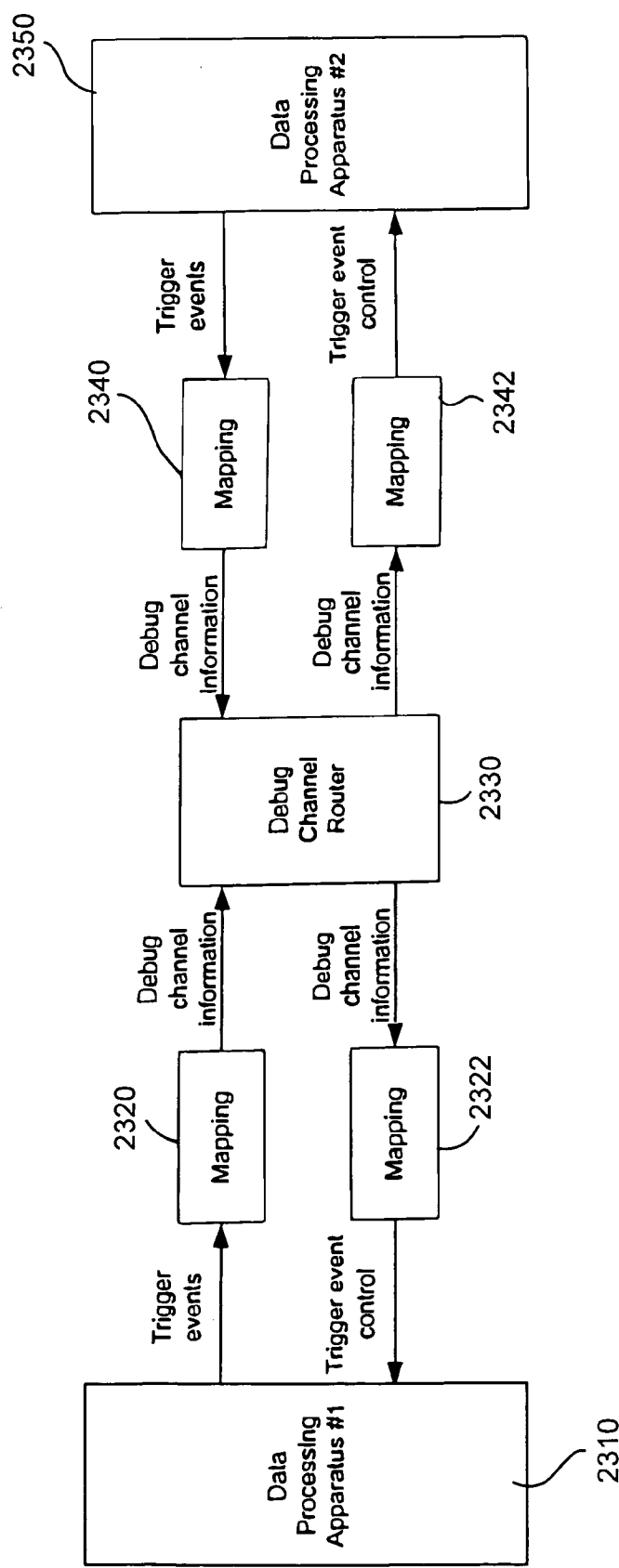
FIG. 23 schematically illustrates the concept of cross-triggering according to the present technique.

FIG. 23 schematically illustrates the concept of cross-triggering according to the present technique. The arrangement comprises: a first data processing module 2310; mapping modules 2320, 2322, 2340, 2342; a debug channel router 2330; and a second data processing apparatus 2350. Both the first and the second data processing apparatus are operable to generate trigger events, for example, break points, watch points and interrupts. The trigger events are fed to the mapping modules 2320, 2340 where they are mapped into debug channel information. The CTIs 130-1 to 130-X of FIG. 1 perform this mapping function. The debug channels are associated with for example processor start/stop, trace start/stop or system error. The debug channel router 2330 (which corresponds to the CTM 150 of FIG. 1) receives the debug channel information from both data processing modules 2310, 2350 and distributes that information to all devices in the system (in this case two devices). On output from the debug channel router 2330, the debug channel information is supplied to a mapping module 2322, 2342 associated with the destination processor where it is remapped from debug channel information to an appropriate trigger event control signal such as processor start/stop control, trace start/stop control or interrupts.

Figure 24:
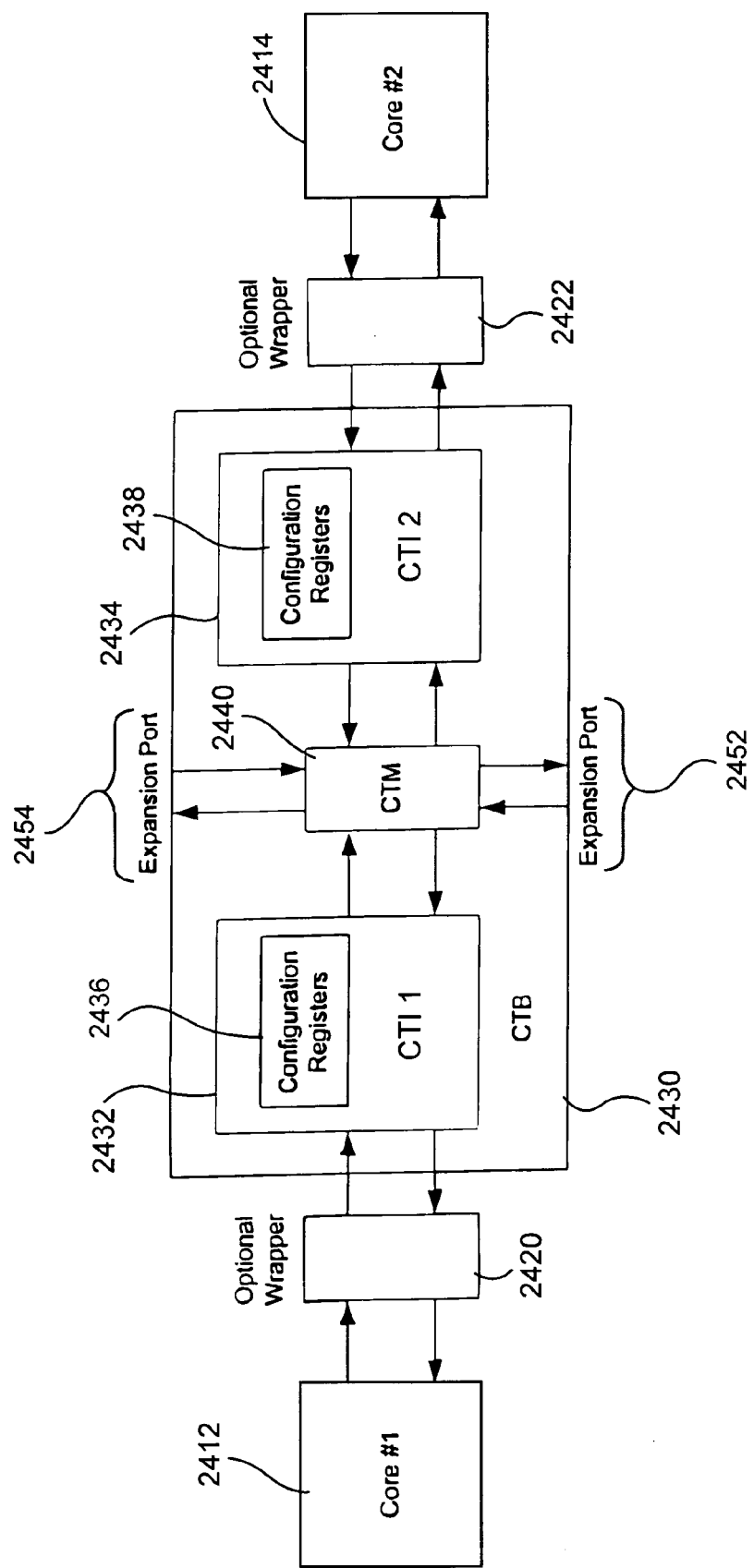
FIG. 24 schematically illustrates an alternative arrangement according to the present technique in which the cross-trigger matrix has four ports and a cross-trigger block is formed.

In the arrangement of FIG. 1, the CTM 150 is configured to support a plurality, x, of CTI modules 130-1 to 130-X. FIG. 24 schematically illustrates an alternative arrangement according to the present technique, in which the CTM has a fixed number of ports, in this case 4. The arrangement comprises: first and second processor cores 2412, 2414 and respective wrapper units 2420, 2422; a cross-trigger block (CTB) 2430 comprising two CTIs 2432, 2434 having associated configuration registers 2436, 2438; a CTM 2440; and two expansion ports 2452, 2454. The CTB 2430 is an integral unit, designed such that it can be connected to a further CTB (not shown) if more processor cores are to be added to the system. The wrapper circuits 2420, 2422, which are optional, connect the CTI 2432, 2434 to a respective processor core 2412, 2414 and are operable to perform glitch removal and waveform shaping on signals. In the CTB 2430, the two CTIs 2432, 2434 are connected to two of the four ports of the CTM 2440. This leaves two remaining CTM ports, which are used as expansion ports 2452, 2454 for connection to further CTBs.

Figure 25:
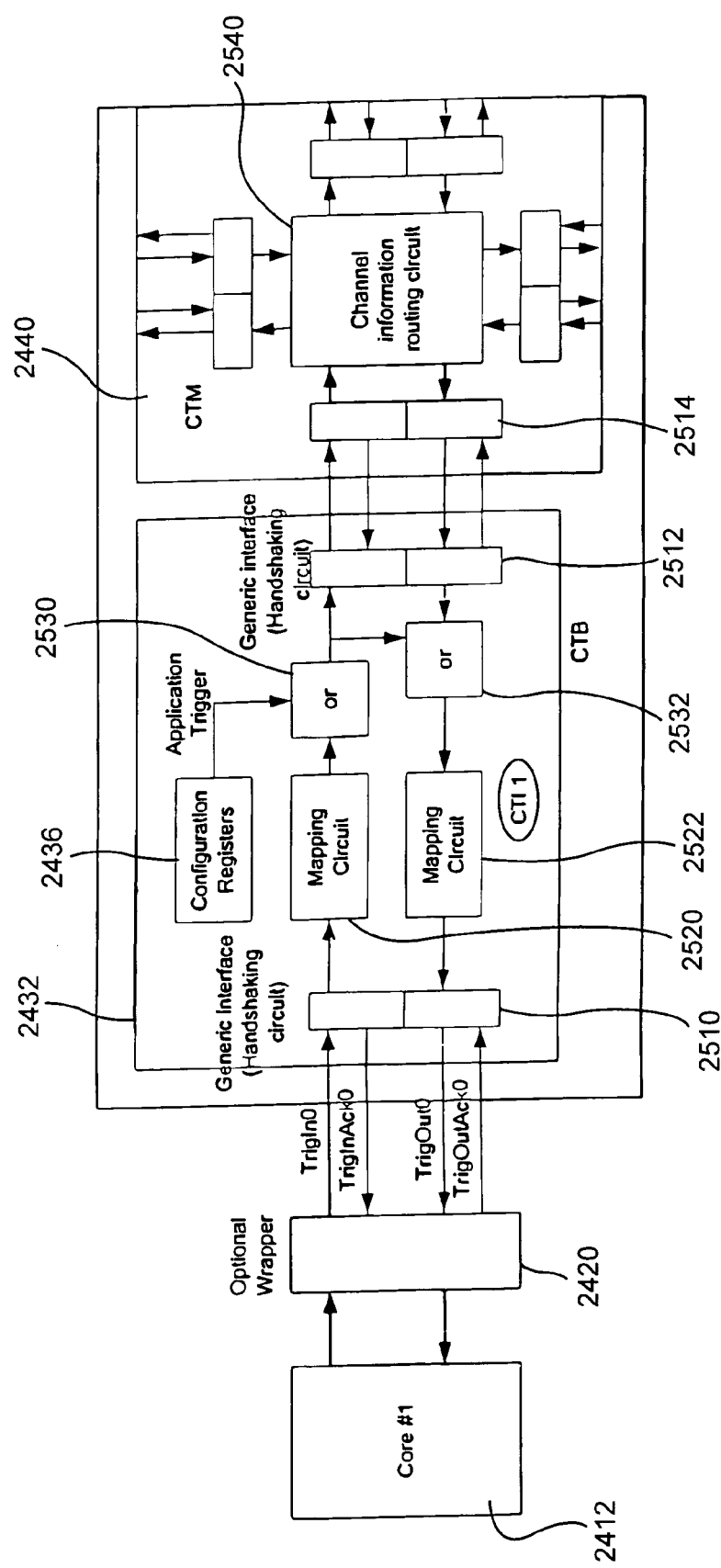
FIG. 25 schematically illustrates a detailed view of a portion of the circuitry of a cross-trigger block.

FIG. 25 schematically illustrates a more detailed view of a portion of the CTB 2430. The CTI 2432 comprises: a first handshaking circuit 2510 that interfaces between the processor core 2412 and the CTI 2432; first and second mapping circuits 2520, 2522; first and second OR logic gates 2530, 2532; and a second handshaking circuit 2512 that interfaces between the CTI 2432 and the CTM 2440. The first mapping circuit 2520 receives input in the form of trigger events from the first handshaking circuit 2510 and maps these trigger events to debug channel information. The output of the first mapping circuit is supplied as input to the first OR gate 2530 along with an application trigger signal generated by the configuration registers 2436. Note that the application trigger is a simulated trigger event and does not correspond to a trigger event (TRIGIN) generated by one of the processor cores of the cross-triggered system. The configuration registers 2436 may be provided with a system bus interface and a JTAG interface (not shown). The output from the first OR gate 2530 is fed to the second handshaking circuit 2512 of the CTI 2432 and to the second OR gate 2532. The second OR gate 2532 receives input from both the output of the first OR gate 2530 (which allows a trigger in event from a given processor core to be asserted as trigger output to that same processor core without sending the signal via the CTM 2440) and an incoming signal from the second handshaking circuit 2512. The output of the second OR gate 2532 is fed as input to the mapping circuit 2522 which maps debug channel data to trigger control signals for controlling operations on the receiving processor core 2412. The CTM 2440 comprises a handshaking circuit for each of the four ports. One of these CTM handshaking circuits 2514 interfaces with the second handshaking circuit 2512 of the CTI 2432. The CTM also has a channel routing information circuit 2540 for collecting all debug channel information and distributing it to all processing cores of the system. The debug channel information is combined by circuits such as those of FIGS. 11A and 11B.

The handshaking circuits 2510, 2512, 2514 use request/acknowledge handshaking and this allows a robust connection to be made between different types of processor core that compensates for a range of different clock conditions such as differences in clock frequencies and clock skews. The arrangement of FIG. 25 differs from the arrangement of FIG. 16 in certain respects. In particular, in the arrangement of FIG. 25 the application trigger can generate channel information directly, i.e., the channel mapping information is incorporated in the application trigger signal itself. By way of contrast, the arrangement of FIG. 16 uses mapping logic to map application trigger events to channel events. FIG. 21 shows the application trigger registers and associated application trigger mapping logic of the arrangement of FIG. 16. Furthermore, in the arrangement of FIG. 25 the loop back of events from TRIGIN to TRIGOUT takes T in the CTI 2432 whereas this loop back took place in the CTM 150 in the arrangement of FIG. 16. Performing the loop back of events in the CTI 2432 has the advantage of providing faster response times.

Figure 26:
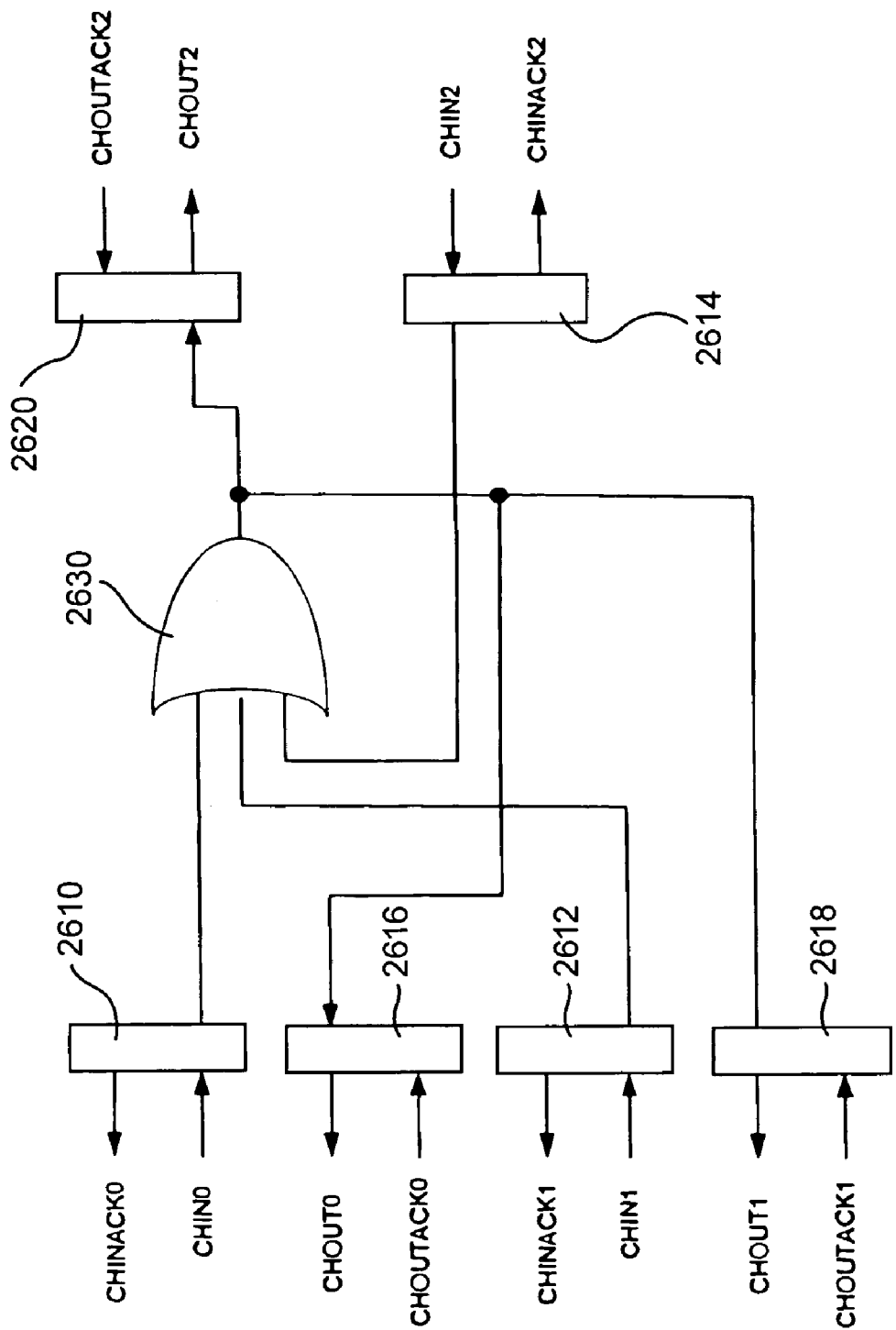
FIG. 26 schematically illustrates the port connection of the cross-trigger matrix of FIG. 1.

FIG. 26 schematically illustrates the port connections of the CTM 150 of FIG. 1. As shown in FIG. 3, this CTM arrangement may result in the occurrence of a combinatorial loop. As shown in FIG. 3, the CTM 150 has three ports, two of which are connected to respective interface modules and one of which is used as an expansion port via which a further CTM can be connected. The port connection circuitry of FIG. 26 shows three input channels CHIN0, CHIN1 and CHIN2 and three output channels CHOUT0, CHOUT1 and CHOUT2. Each of the channels has an associated acknowledgement (ACK) signal route. Each of the three input channels are fed to an OR gate 2630 and the OR gate 2630 output is fed to the three output channels CHOUT0, CHOUT1 and CHOUT2. The input channel CHIN2 and the output channel CHOUT2 to the right hand side of the OR gate correspond to the expansion port.

Figure 27:
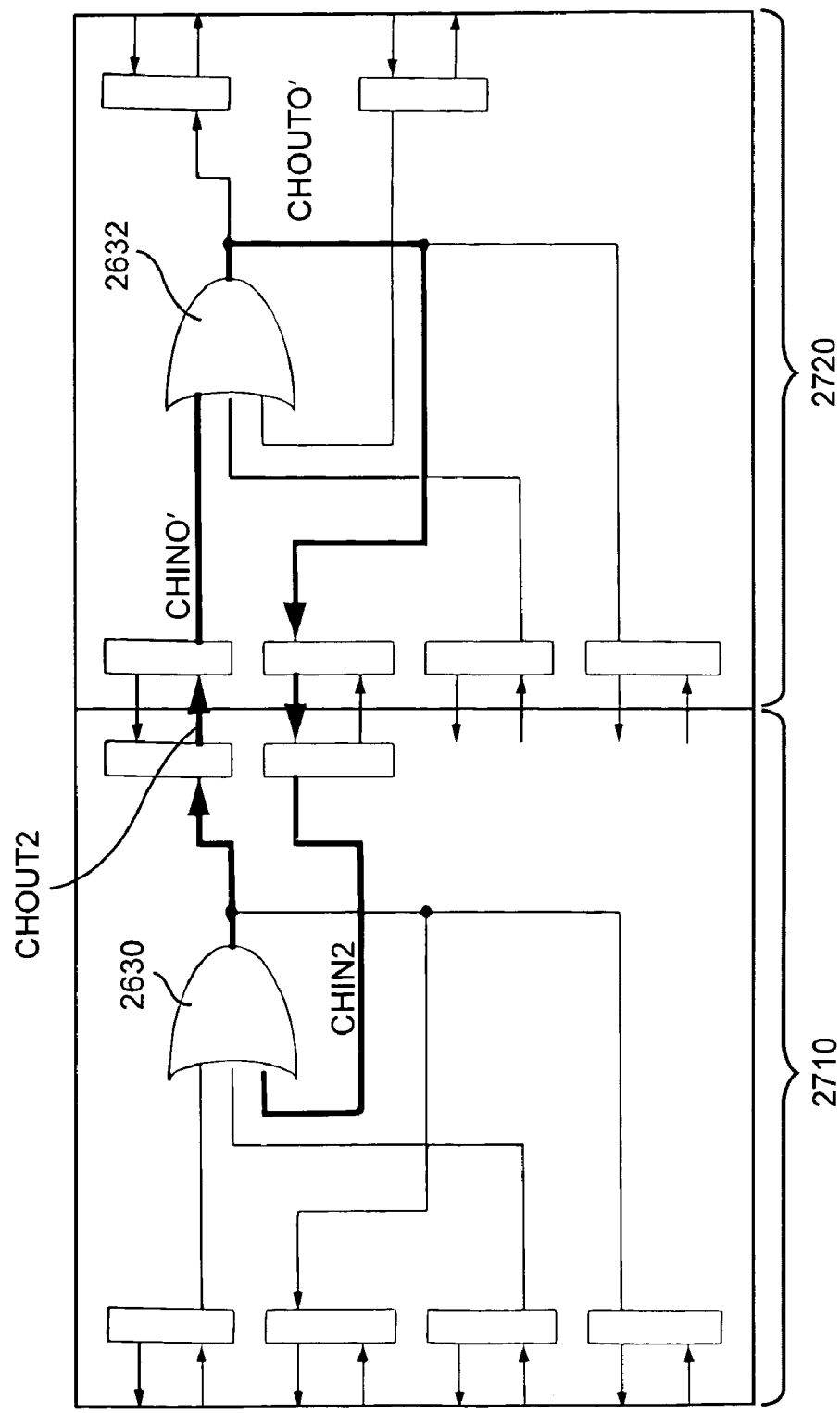
FIG. 27 schematically illustrates how a combinatorial loop might occur when two of the cross-trigger matrices of FIG. 26 are connected to each other.

FIG. 27 schematically illustrates how a combinatorial loop might occur when two of the CTMs 150 of FIG. 26 are connected to each other. In the following discussion dashes will be used to distinguish the channel labels of a second CTM 2720 (on the right of the Figure) from those of a first CTM 2710. It is apparent that the output channel CHOUT2 of the expansion slot of the first CTM 2710 is supplied as input to input channel CIN0' of the second CTM 2720. Accordingly, when CHOUT2 is high the output of an OR gate 2632 of the second CTM 2720 will also be high. The output of the OR gate 2632 is fed to the output channel CHOUT0' which is subsequently received on input channel CHIN2 of the first CTM 2710. Thus a combinatorial loop is formed around the signal path CHOUT2, CHIN0, CHOUT0', CHIN2.

Figure 28:
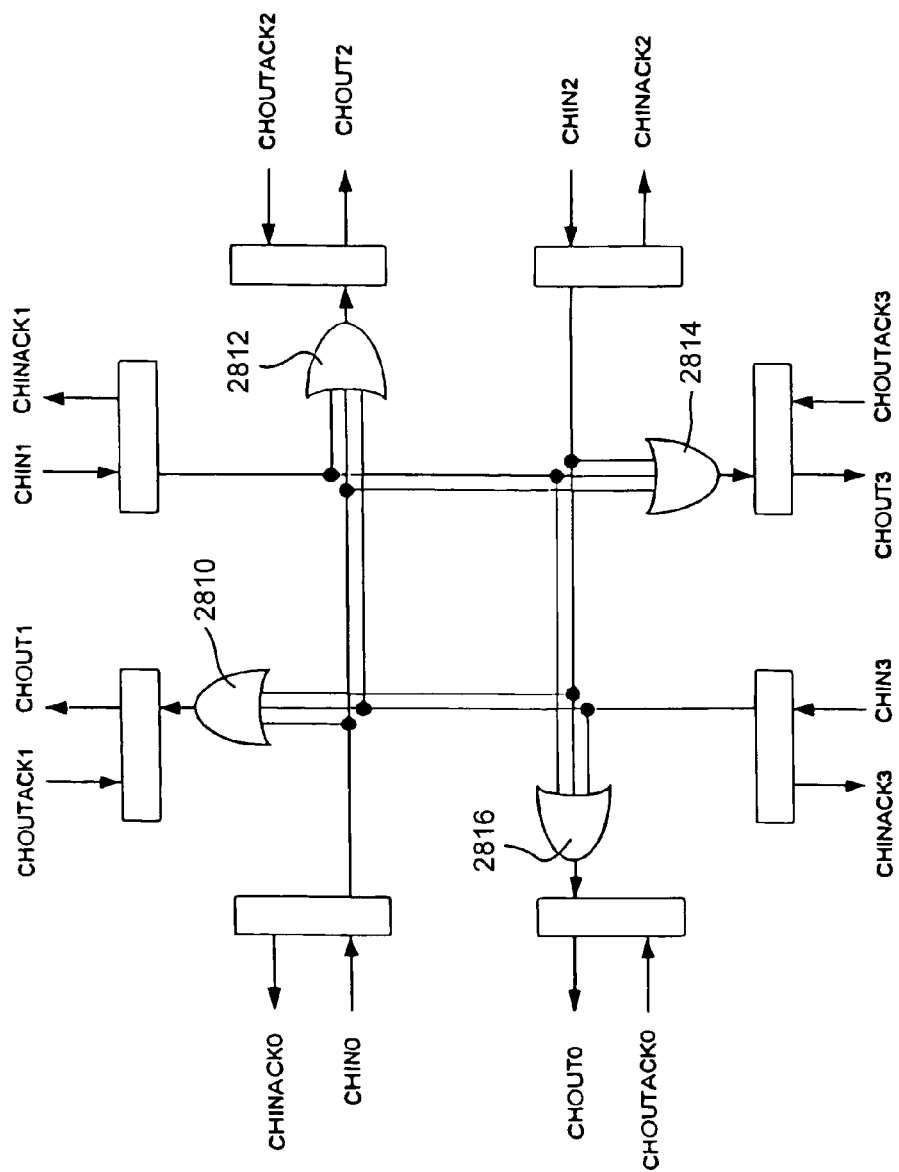
FIG. 28 schematically illustrates an alternative cross-trigger matrix configuration according to the present technique.
Figure 29:
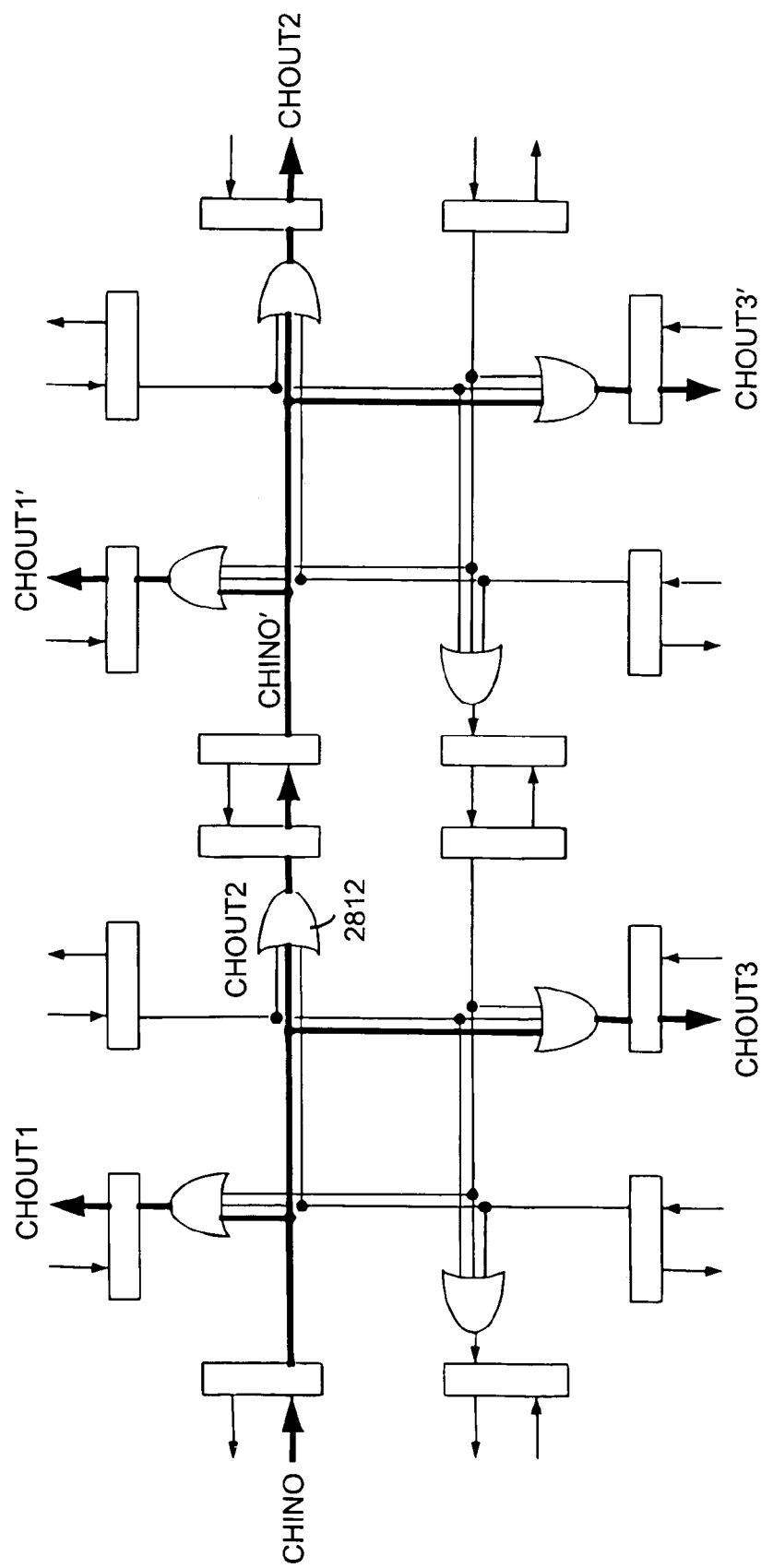
FIG. 29 schematically illustrates a signal path that occurs when two of the cross-trigger matrix xircuits of FIG. 28 are connected together.

FIG. 28 schematically illustrates an alternative CTM configuration according to the present technique. In this case each CTM has four ports, each of which has a handshaking circuit via which it may interface with a connected CTM or CTI. The arrangement comprises four OR gates 2810, 2812, 2814 and 2816. The first OR gate 2810 receives signals from input channels CHIN0, CHIN3 and CHIN2 and feeds its output to output channel CHOUT1. The second OR gate 2812 receives signals from input channels CHIN0, CHIN1 and CHIN3 and feeds its output to output channel CHOUT2. The third OR gate 2814 receives signals from input channels CHIN0, CHIN1 and CHIN2 and feeds its output to output channel CHOUT3. The fourth OR gate 2816 receives signals from input channels CHIN1, CHIN2 and CHIN3 and feeds its output to output channel CHOUT0. The event logic is routed in such a way that the combinatorial loop of FIG. 27 is avoided. FIG. 29 schematically illustrates a signal path that occurs when two of the CTM circuits of FIG. 28 are connected together. Once again, dashes will be used to distinguish channels of the right-most CTM from channels of the right-most CTM in FIG. 29. It can be seen from the signal path indicated in bold in FIG. 29 that a logical '1' supplied to CHIN0 is asserted to only three of the four output channels, in particular CHOUT1, CHOUT2 and CHOUT3. The output channel CHOUT2 is connected to the input channel CHIN0'. A logical '1' on channel CHIN0' is fed as input to only three of the four OR gates of the right-most CTM and thereby results in a logical '1' being asserted on each of channels CHOUT1', CHOUT2' and CHOUT3'. Since there is no complete path from CHIN0' back to the OR gate 2812 associated with CHOUT2, a combinatorial loop is avoided.

Figure 30:
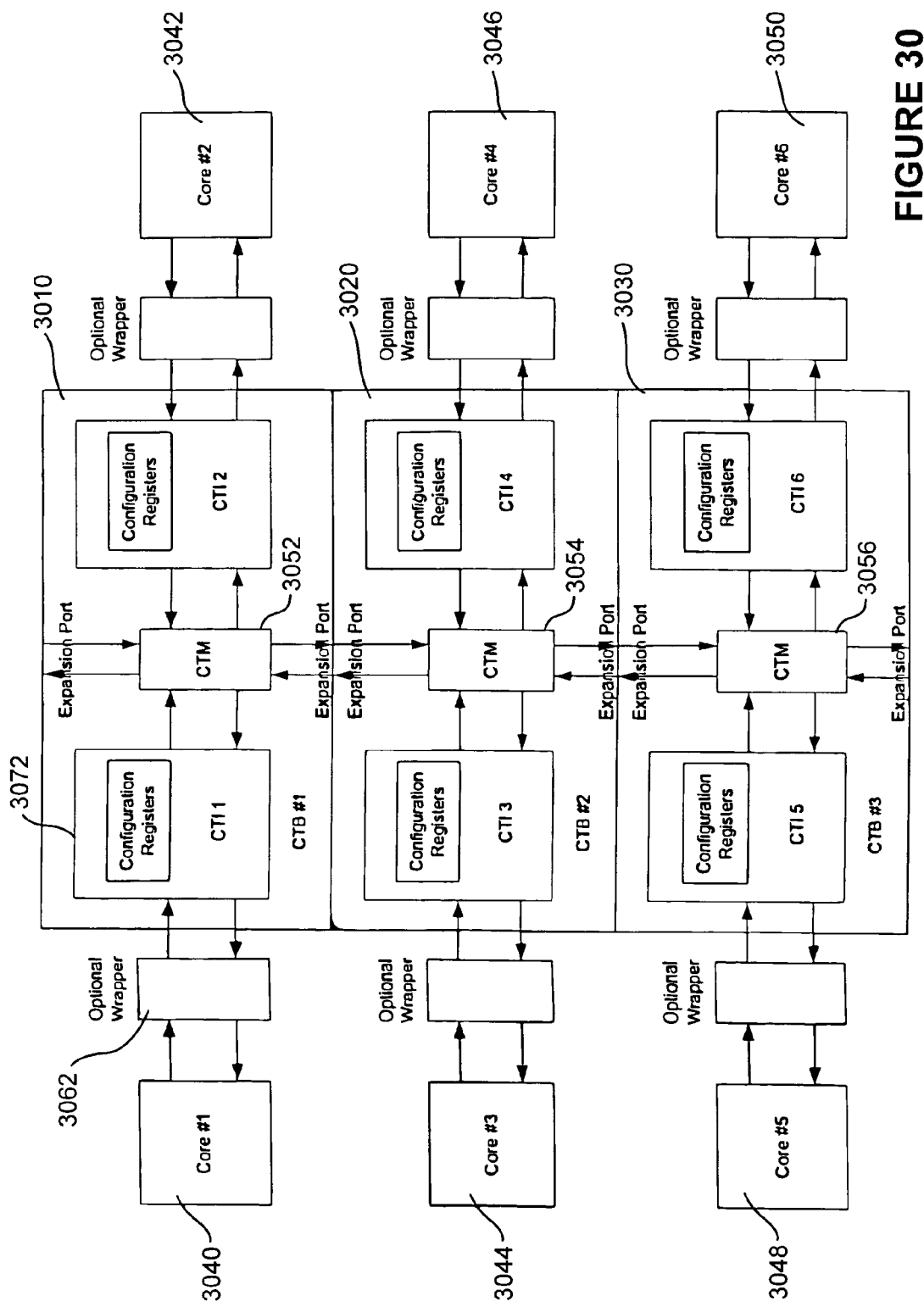
FIG. 30 schematically illustrates an arrangement comprising three of the cross-trigger blocks of FIG. 24.

FIG. 30 schematically illustrates a system comprising three CTBs 2430 of the type illustrated in FIG. 24. The system comprises a first CTB block 3010, which is connected to a second CTB block 3020 via one of its two expansion ports and the second CTB block is in turn connected to a third CTB block 3030. Each of the CTB blocks 3010, 3020, 3030 is connected to two processor cores via respective CTI modules and wrapper circuits so that the system enables cross-triggering for a total of six processor cores 3040, 3042, 3044, 3046, 3048 and 3050. The CTM 3052 is connected to the CTM 3054 and the CTM 3054 is connected to the CTM 3054 with event routing logic as illustrated in FIG. 32.

Figure 31:
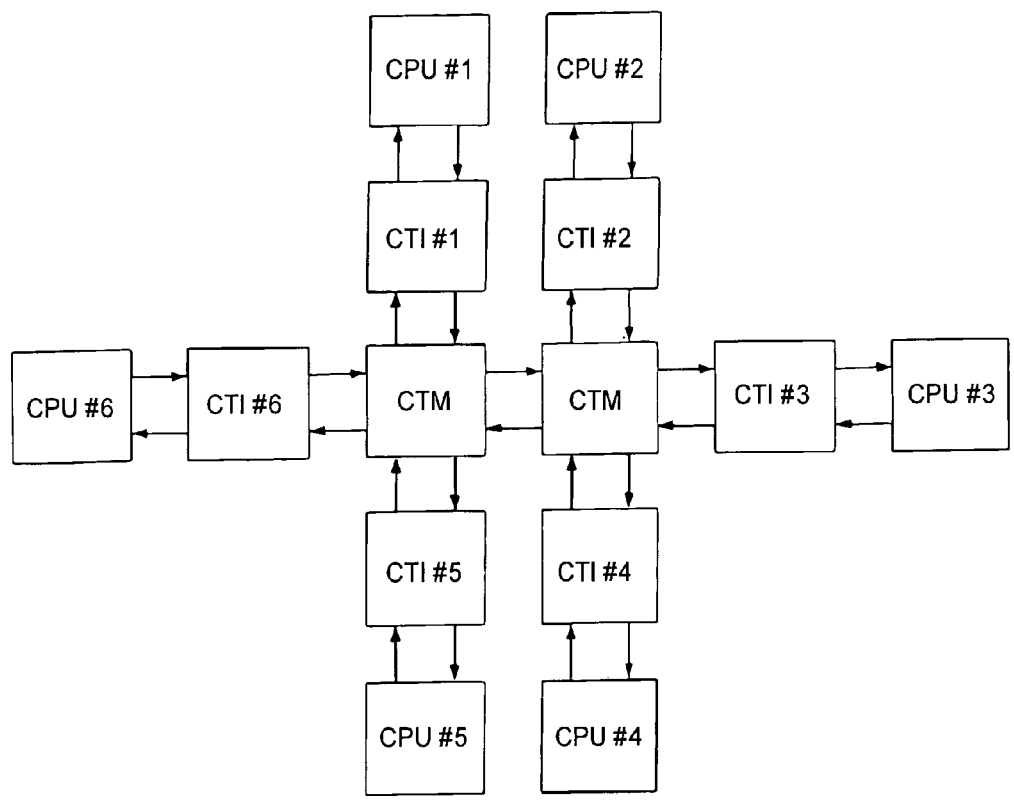
FIG. 31 schematically illustrates an alternative arrangement of a cross-trigger system connecting six processor cores.

FIG. 31 schematically illustrates an alternative six processor-core connection arrangement to that of FIG. 30. In this case the CTB arrangement cof FIG. 24 comprising a CTM 2440 sandwiched between two CTIs 2432, 2434 is not used. Rather, three of the four ports of each of two CTMs are connected to a respective CTI and respective processor core, the one remaining port being connected to the other CTM. Again the event routing logic of the CTMs is as illustrated in FIG. 29.

Figure 32:
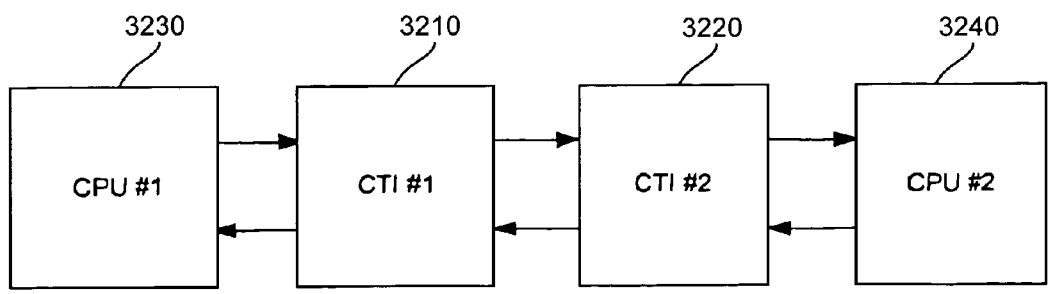
FIG. 32 schematically illustrates an arrangement comprising two processor cores and no cross-trigger matrix.

FIG. 32 schematically illustrates a two-processor arrangement in which first and second CTIs 3210 and 3220 are connected directly to each other with no CTM between them to perform routing operations. A first processor core is connected to the first CTI 3210 and a second processor core is connected to the second CTI 3220. The arrangement does not require a CTM because the routing between two processors is relatively simple.

Figure 33:
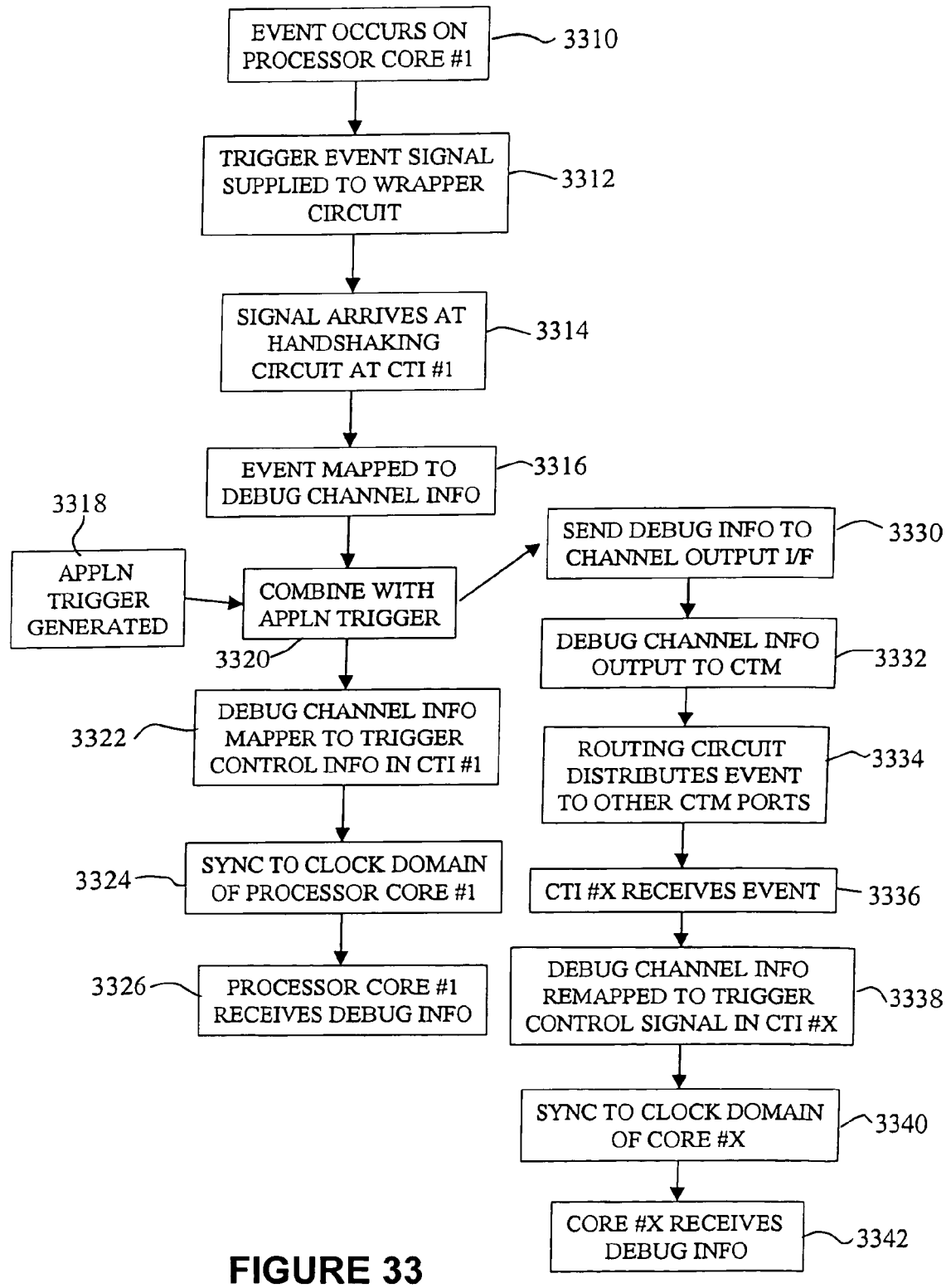
FIG. 33 is a flow diagram that schematically illustrates a typical event transfer sequence according to the present technique with reference to the arrangements of FIGS. 25 and 30.

FIG. 33 is a flow diagram that schematically illustrates a typical event transfer sequence according to the present technique with reference to the arrangements of FIGS. 28S and 30. At stage 3310 a trigger event such as a breakpoint takes place on the first processor core 3040 and at subsequent stage 3312 the trigger event signal is supplied to a wrapper circuit 3062 where glitch removal and waveform shaping is performed. At stage 3314 the output signal from the wrapper circuit 3062 is fed to the handshaking circuit 2510 (see FIG. 25) associated with the first CTI 3072. The handshaking circuit 2510 is operable to synchronise, where necessary, the signal received from the wrapper circuit with the CTI 3072. At stage 3316, before the handshake operation has finished, the CTI 3072 performs mapping of the trigger event signal to debug channel information. At stage 3318 a JTAG scan interface or software interface generates an application trigger by writing to an application trigger register (see FIG. 21) and the application trigger is combined with the debug channel information at stage 3320. Note that the channel information associated with the application trigger is generated directly (as in the arrangement of FIG. 25) without the need to map it to a channel event. At stage 3322 the debug channel information is supplied to the second mapping circuit 2822 of the first CTI 3072, where it is mapped into trigger event control signals. Next, at stage 3324, trigger control information for the other five processor cores 3042, 3044, 3046 and 3048 arrives at the wrapper circuit 2420 associated with the first processor core 3040 where the signal waveform is re-shaped and synchronised to the clock domain of the first processor core 3040. Then at stage 3626 the first data processing core 3040 receives the debug information in the form of trigger control signals.

Returning to stage 3320 and following the concurrent branch of the flow diagram, the combined debug channel information and application trigger is sent to one of the four channel output interfaces of the CTI 3072 and then at stage 3332 the CTI feeds the debug channel information to the CTM via the handshaking modules 2512 and 2514, which interface between the CTI 3072 and CTM 3052. At stage 3334, while the handshaking circuits are completing the transfer of the debug channel information, the routing circuit 2540 of the CTM 3052 routes the trigger event originating from the first processor core 3040 to the remaining three ports of the CTM 3052. At the next stage 3336 the five other CTIs of the system receive, via their respective handshaking circuits, the debug channel information indicating the occurrence of the trigger event on the first processor core. At stage 3338, while the handshaking unit is operating to complete the handshake, the debug channel information is remapped to a trigger control signal in the second mapping circuit 2322 of the associated CTI. Subsequently, at stage 3340, the trigger control information is received by the wrapper circuit 2420 of one or more of the five processor cores 3042, 3044, 3046, 3048 and 3050 where the received signal waveform is re-shaped and synchronised to the domain clock domain of the destination processor core. Finally, at stage 3342, each destination processor core receives the debug information.

Figure 34:
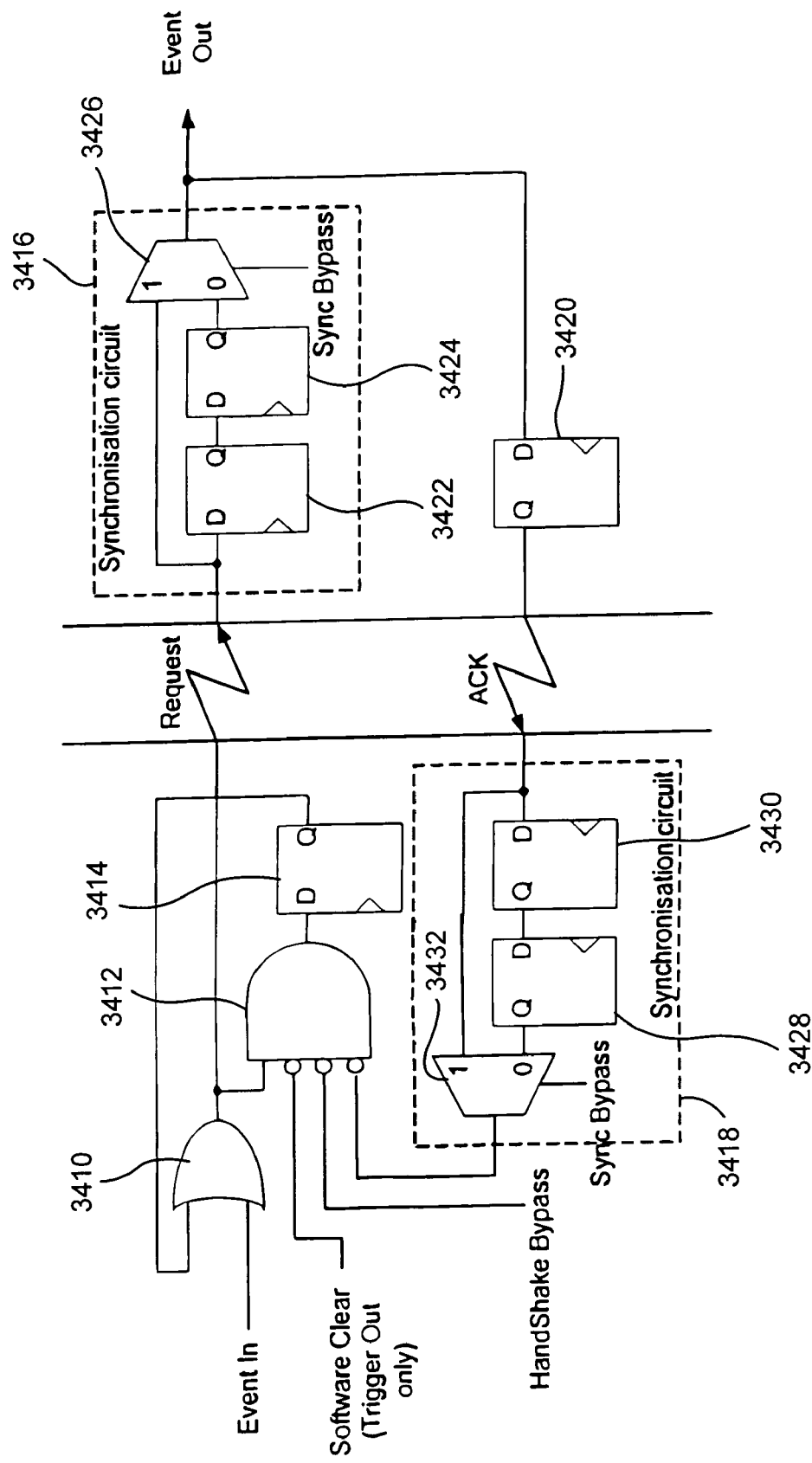
FIG. 34 schematically illustrates the internal structure of a handshaking circuit.

FIG. 34 schematically illustrates the internal structure of one of the handshaking circuits 2510, 2512, 2514. The handshaking circuit comprises an OR logic gate 3410, an AND logic gate 3412, a first (D-type) edge-triggered latch 3414, a first synchronisation circuit 3416 on the request receiving side, a second edge triggered latch 3420 and a second synchronisation circuit 3418 on the acknowledgement (ACK) receiving side of the circuit. The first synchronisation circuit 3416 comprises two edge-triggered latches 3422, 3424 and a multiplexer (mux) 3426. Similarly, the second synchronisation circuit 3418 comprises two edge-triggered latches 3428, 3430 and a mux 3432. The OR gate 3410 receives a first input corresponding to an event input. The AND gate receives three inverted inputs corresponding to a handshake bypass signal, a software clear signal (which applies only to the TRIGOUT signal) and the output from the second synchronisation circuit 3418. The AND gate 3412 also receives a fourth input, which is non-inverted, corresponding to the output of the OR gate 3410. The AND gate 3412 output signal is supplied to the edge-triggered latch 3414, whose output is in turn supplied to the OR gate 3410 as a second input. Since the output of the AND gate can be a logical '1' only when the received ACK signal is a logical zero, the second input to the OR gate 3410 has the effect of continuing to assert the request signal that is passed from the OR gate 3410 to the first synchronisation circuit 3416 if an ACK has not yet been received. Accordingly, the second input to the OR gate 3410 will be a logical '1' if the following four conditions are satisfied: the output of the second synchronisation signal is a logical '0' (indicating that the received ACK signal is a logical '0'); the handshake circuitry is not bypassed (handshake bypass=0); the software clear signal is a logical '0'; and the output of the OR gate is a logical '1'.

The output of the OR gate 3410, which corresponds to the request signal is supplied as input to the first synchronisation circuit 3416. In the first synchronisation circuit 3416, the output of the mux 3426 depends upon the value of a sync bypass select input. In particular, if sync bypass=0 then the request signal is subjected to delays by the two series-connected edge-triggered latches 3422, 3424. However, if sync bypass=1 then the incoming request signal passes straight through the synchronisation circuit 3416 without being delayed by the edge-triggered latches 3422, 3424. The output of the first synchronisation circuit 3416 is fed to the edge-triggered latch 3420, the output of which corresponds to the ACK signal that is transmitted to the second synchronisation circuit 3418. Similarly to the operation of the first synchronisation circuit 3416, the second synchronisation circuit 3418 directly outputs the received ACK signal if sync bypass=1 (selected via the mux 3432) but if on the other hand sync bypass=0 the ACK signal is output via two edge-triggered latches 3428, 3430. The output of the second synchronisation circuit 3418 is fed as an inverted input to the AND gate 3412. The handshake circuit 2510 corresponding to the trigger interface (CTI to core interface) operates according to the same mechanism as the handshake circuit 2512 corresponding to the channel interface (CTI to CTM interface). However, the channel interface handshake circuit 2512 does not have the software clear input to the AND gate 3412 that is shown in FIG. 34. The software clear input serves the purpose of facilitating a direct connection between a trigger output (TRIGOUT) and an interrupt controller. The interrupt controller does not generate an ACK signal.

FIG. 35A schematically illustrates an example signal sequence when the synchronisation circuit 3416 (sync bypass=0) of FIG. 34 is used. FIG. 35B illustrates a corresponding example signal sequence when the synchronisation circuit is not used (sync bypass=1). Each of these Figures shows an Event In signal, a Request signal, an ACK signal and an Event Out signal corresponding to the circuit of FIG. 34. In this case each signal has a duration of seven clock cycles. The Event In signal and Event Out signal correspond to different clock domains. By comparison of FIGS. 35A and 35B it can be seen that when the synchronisation circuit is used the Event Out signal is delayed by two clock cycles with respect to both the Event In and Request signals whereas, as shown in FIG. 35B, it is synchronous with these signals when synchronisation is bypassed. The ACK signal is delayed by a single clock cycle with respect to the Event Out signal. This single cycle delay is effected by the edge-triggered latch 3420.

Figure 35C:
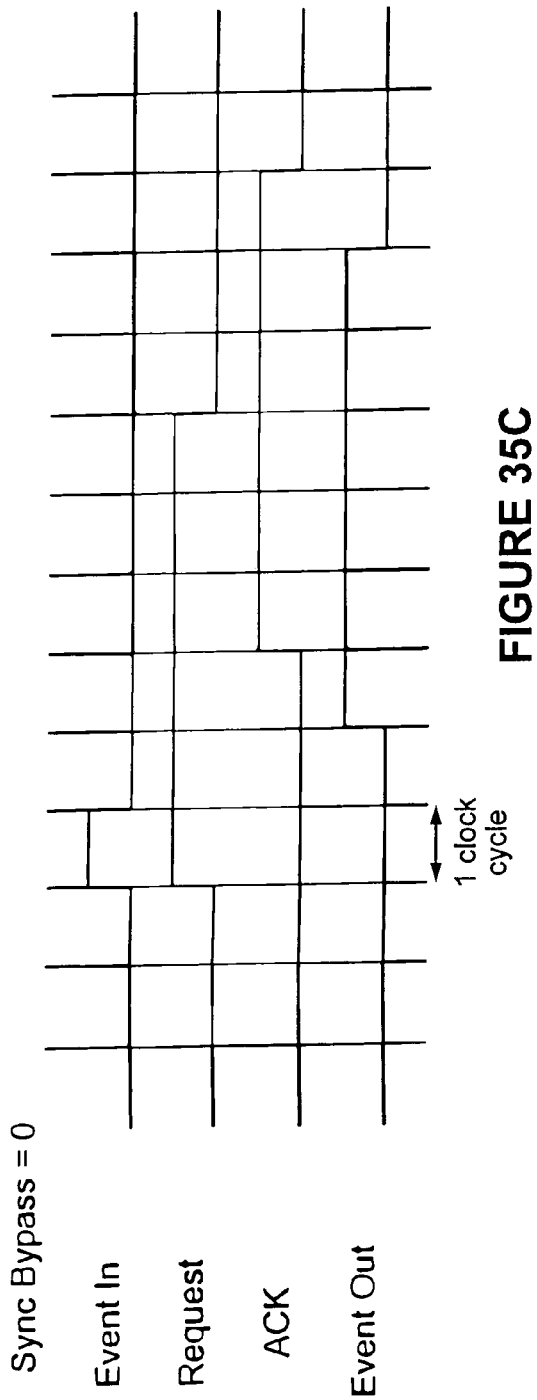
Figure 35D:
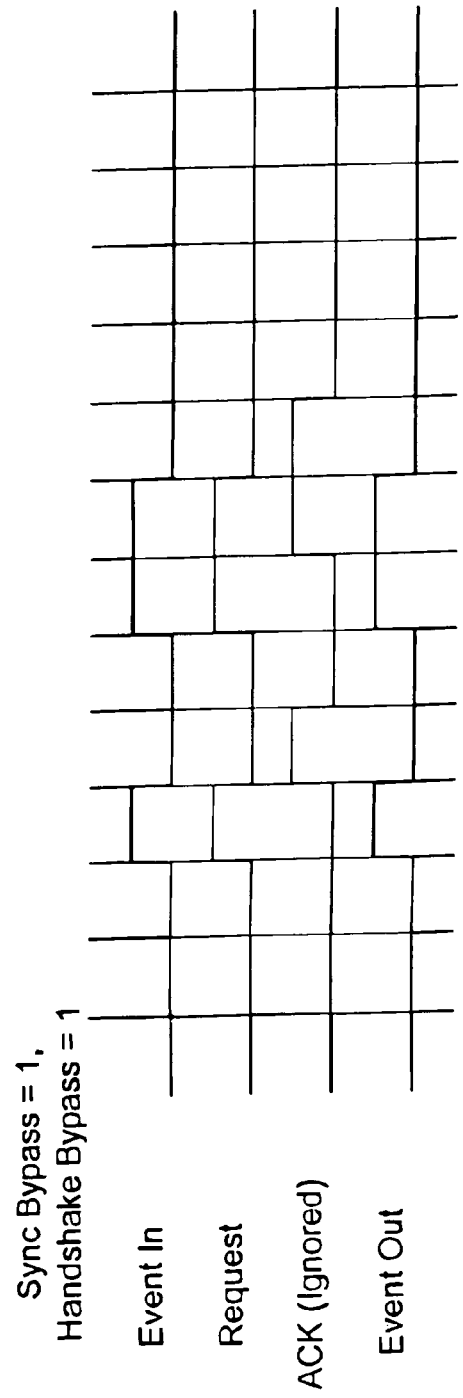

FIG. 35C schematically illustrates an example signal sequence for the handshaking circuit of FIG. 34 in the case that the Event In source is a single cycle signal. The other three signals are six cycle signals. In the example of FIG. 35A with sync bypass=0 (synchronisation circuit is used) the Event Out signal is delayed by two clock cycles with respect to the Event In signal (due to edge-triggered latches 3422, 3424) and again the ACK signal lags the Event Out by a single clock cycle. In this case the Request signal remains high for 6 cycles despite the fact that the Event In signal is of single cycle duration i.e. the Request signal persists for three clock cycles after the ACK has been received. This is due to the AND gate 3412 and edge triggered latches 3414, 3422, 3424. FIG. 35D schematically illustrates an example signals sequence in the case that sync bypass=1 (synchronisation circuit not used) and handshake bypass=1. Recall that the handshake bypass signal is an inverted input of the AND gate 3412. In this case, the edge-triggered latches 3422, 3424 are bypassed so the Event Out signal is synchronous with the Event In and Request Signals. The ACK signal is ignored since the output of the AND gate 3412 will be logical '0' (because handshake bypass=1).

Figure 36:
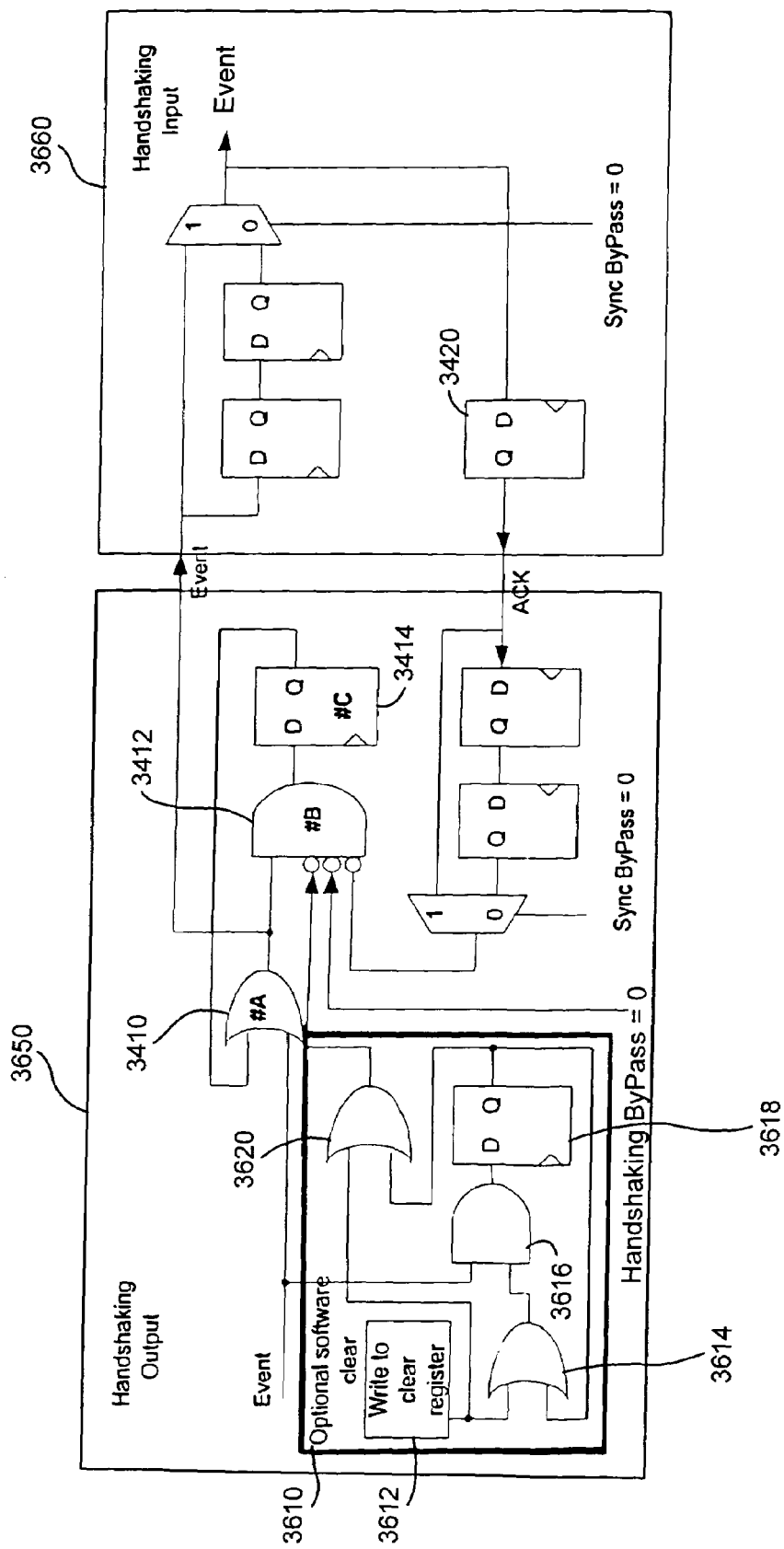
FIGS. 36 to 40 schematically illustrate five different handshaking modes of the circuit of FIG. 34.

The circuitry associated with the software clear signal of FIG. 34 is shown in detail in FIG. 36. The software clear circuitry comprises a write to clear register 3612, first and second OR gates 3614, 3620, and AND gate 3616 and an edge-triggered latch 3618. The output of the second OR gate 3620 is supplied as the software clear input of the AND gate 3412 (see circuit of FIG. 34). The first OR gate 3614 is connected in series to the AND gate 3616 and the edge-triggered latch 3618. The output of the edge-triggered latch 3618 is fed back to the first OR gate 3614 as an input and is also fed as an input to the second OR gate 3620. The AND gate 3616 receives the Event In signal as a second input. The output of the write to clear register 3612 is supplied as input to both the first and second OR gates 3614, 3620. Accordingly, the software clear signal (output of second OR gate 3620) will be a logical '1' if at least one of the output of the write to clear register or the output of the edge-triggered latch 3618 is a logical '1'.

It will be appreciated that the handshaking logic of FIG. 34 can be configured in a number of different ways using the sync bypass and handshake bypass signals that control muxes 3426 and 3428. FIGS. 36 to 40 schematically illustrate five different handshaking modes.

FIG. 36 schematically illustrates an asynchronous handshaking mode in which sync bypass and handshake bypass are both tied to zero so that the bypass logic is disabled. The circuit comprises a handshaking output circuit 3650 and a handshaking input circuit 3660. In the asynchronous mode an event output by the handshaking output circuit 3650 passes through the synchronisation registers in the handshaking input circuit and the signal is in turn propagated back to the handshaking input circuit 3650 via the D-type edge-triggered latch 3420. The ACK signal is then synchronised and used to negate the event in the holding logic (OR gate 3410, AND gate 3412 and edge-triggered latch 3414) of the handshake output circuit 3650. Setting the logic to asynchronous mode allows both input and output sides of the handshaking circuitry to pass information to each other despite operating in different clock domains. The handshaking circuitry can be used in asynchronous mode in a number of places within the cross-trigger debug system as listed in Table 1 below.

TABLE 1

| Uses for<br>Output Handshaking circuit 3650 | Uses for<br>Input Handshaking circuit 3660 |
| --- | --- |
| Wrapper circuit's trigger to CTI<br>(without optional software clear) | CTI's trigger input |
| CTI channel output<br>(without optional software clear) | CTM channel input |
| CTM channel output<br>(without optional software clear) | Another CTM channel input or CTI channel input |
| CTI trigger output<br>(with optional software clear) | Wrapper trigger from CTI processor |

Figure 37:
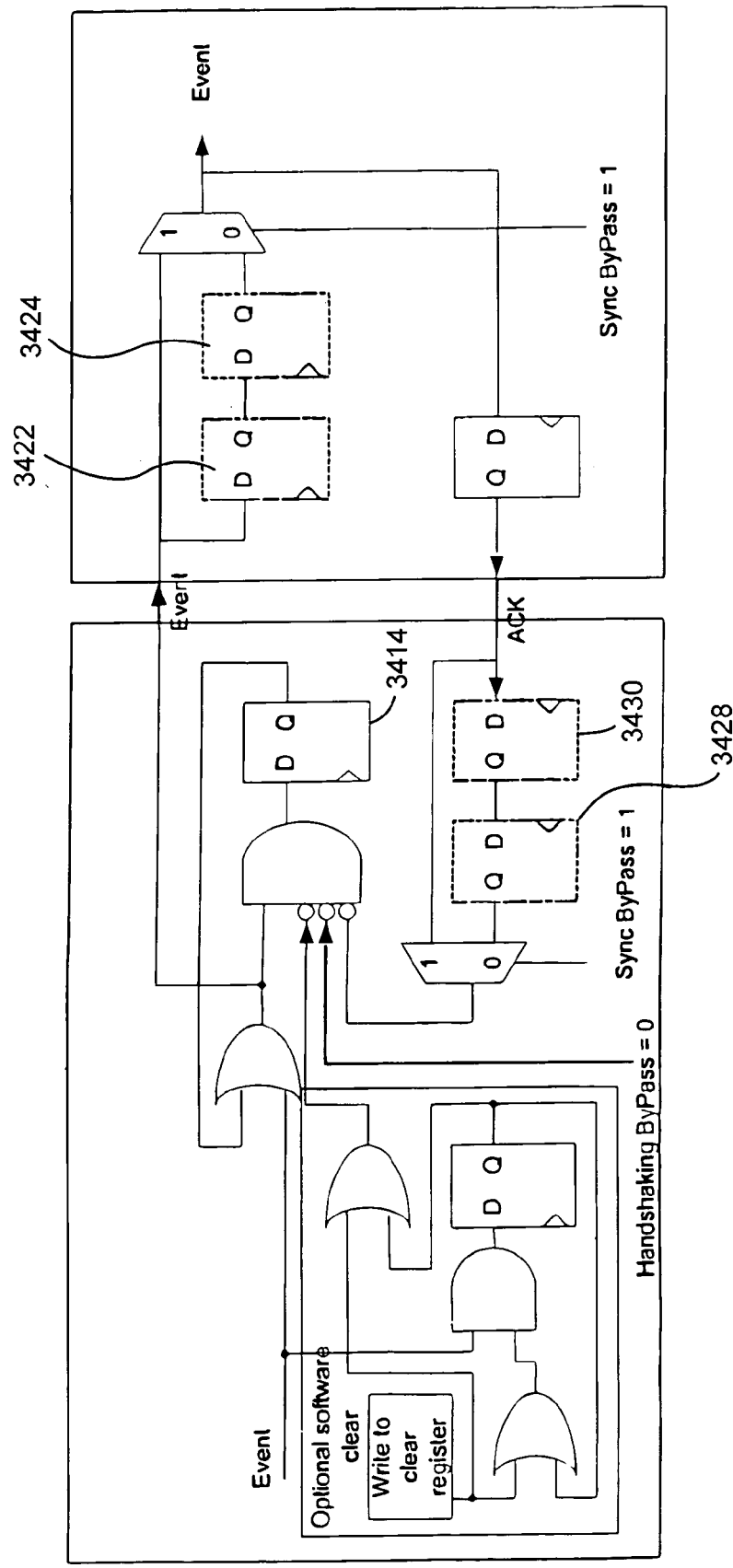

FIG. 37 schematically illustrates a synchronous mode of the handshaking circuit. In this mode the synchronisation circuitry is bypassed (sync bypass=1) but the handshaking circuitry is not (handshake bypass=0). Accordingly, as indicated by the dashed lines in FIG. 36, the signals bypass the four edge-triggered latches 3422, 3424, 3428 and 3430.

Figure 38:
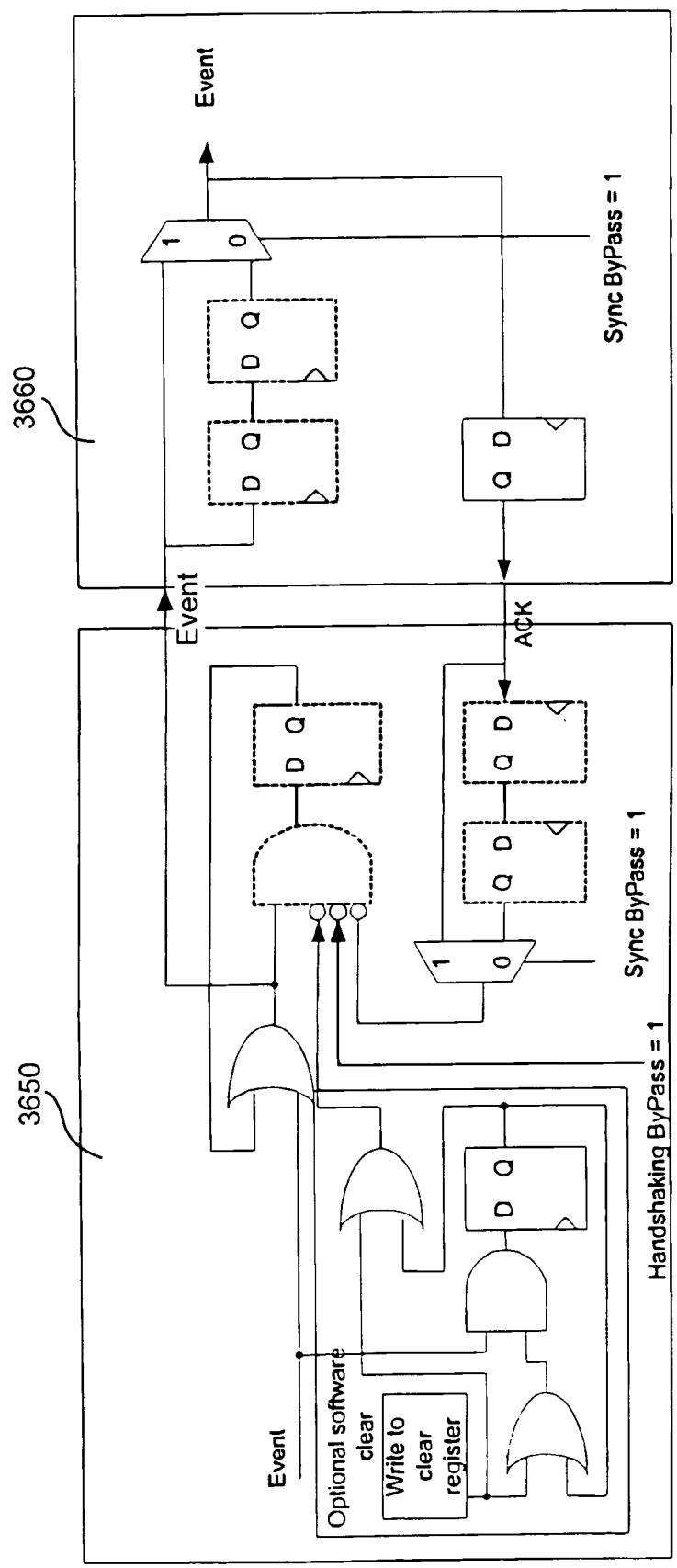

FIG. 38 schematically illustrates a high bandwidth mode of the handshaking circuit. In this case both the handshaking and the synchronisation circuitry are bypassed (sync bypass=1 and handshaking bypass=1). Accordingly, the signal bypasses the four edge-triggered latches 3422, 3424, 3428, 3430 of the synchronisation circuitry and since the output of the AND gate is a logical '0' (since handshaking bypass=0), the edge-triggered latch 3414 is also bypassed. Accordingly, the holding circuitry (3412, 3414, 3410) is effectively disabled and the event output (request signal) follows the event input so the ACK has no function. The high bandwidth mode may be used if the input handshaking circuit 3650 and the output handshaking circuit 3660 have the same clock and if the clock skew is zero (i.e. the clock signal arrives substantially simultaneously at the two circuits). This allows the cross-triggering arrangement to transfer one event per clock cycle, which is useful if a circuit connected to the cross-trigger block 2430 is to perform event counting or profiling.

Figure 39:
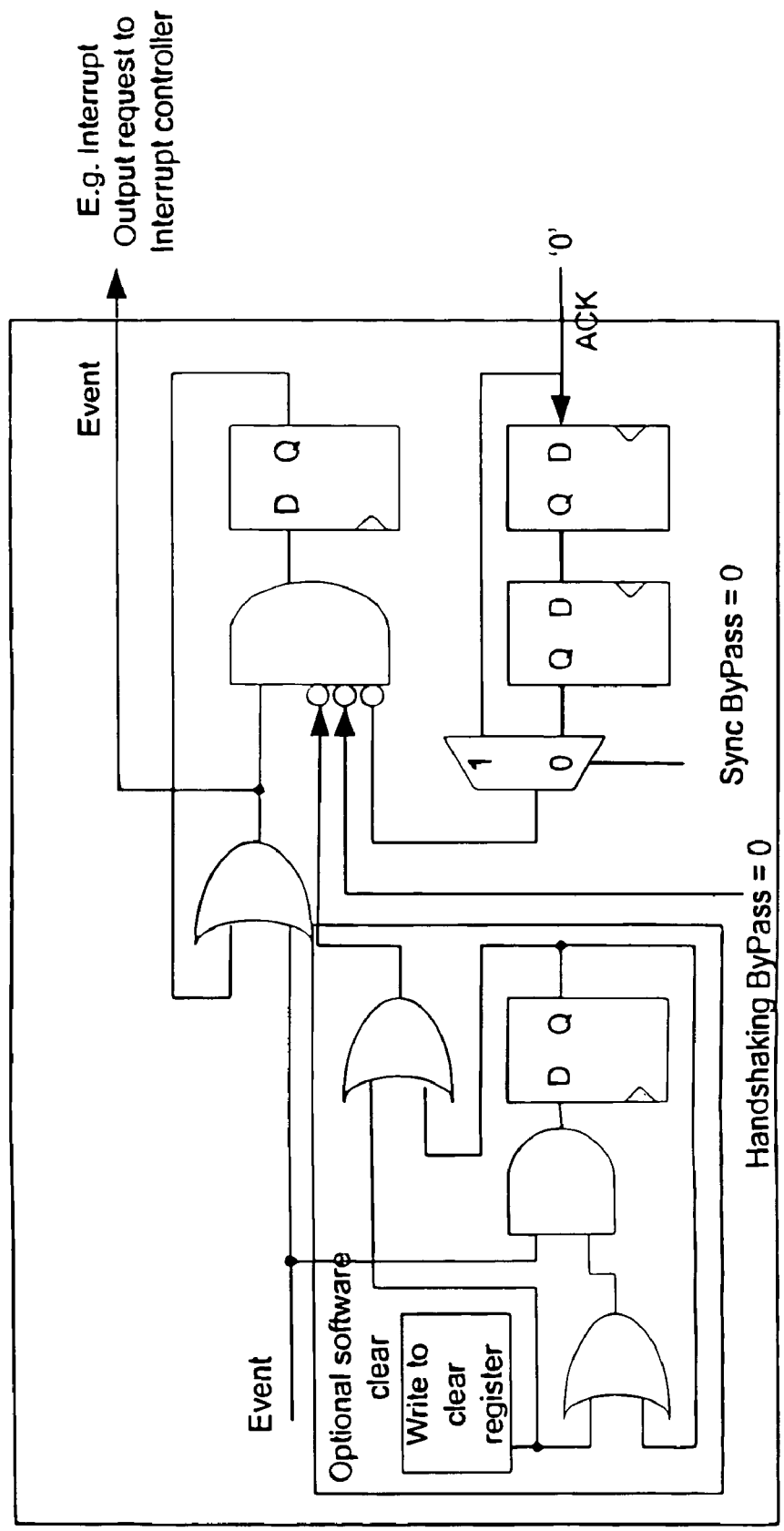

FIG. 39 schematically illustrates an interrupt mode of the handshaking circuit. In this case handshaking bypass=0 and sync bypass=0 as for the asynchronous mode of FIG. 36. Only the output handshaking circuit 3660 is shown. In the interrupt mode the OR gate 3410 of the output handshaking circuit 3660 is supplied to the interrupt controller as an interrupt output request. When the circuit generates output to the interrupt controller (TRIGOUT from CTI) then the software clear circuit is used to clear the event, rather than using hardware to clear the event.

Figure 40:
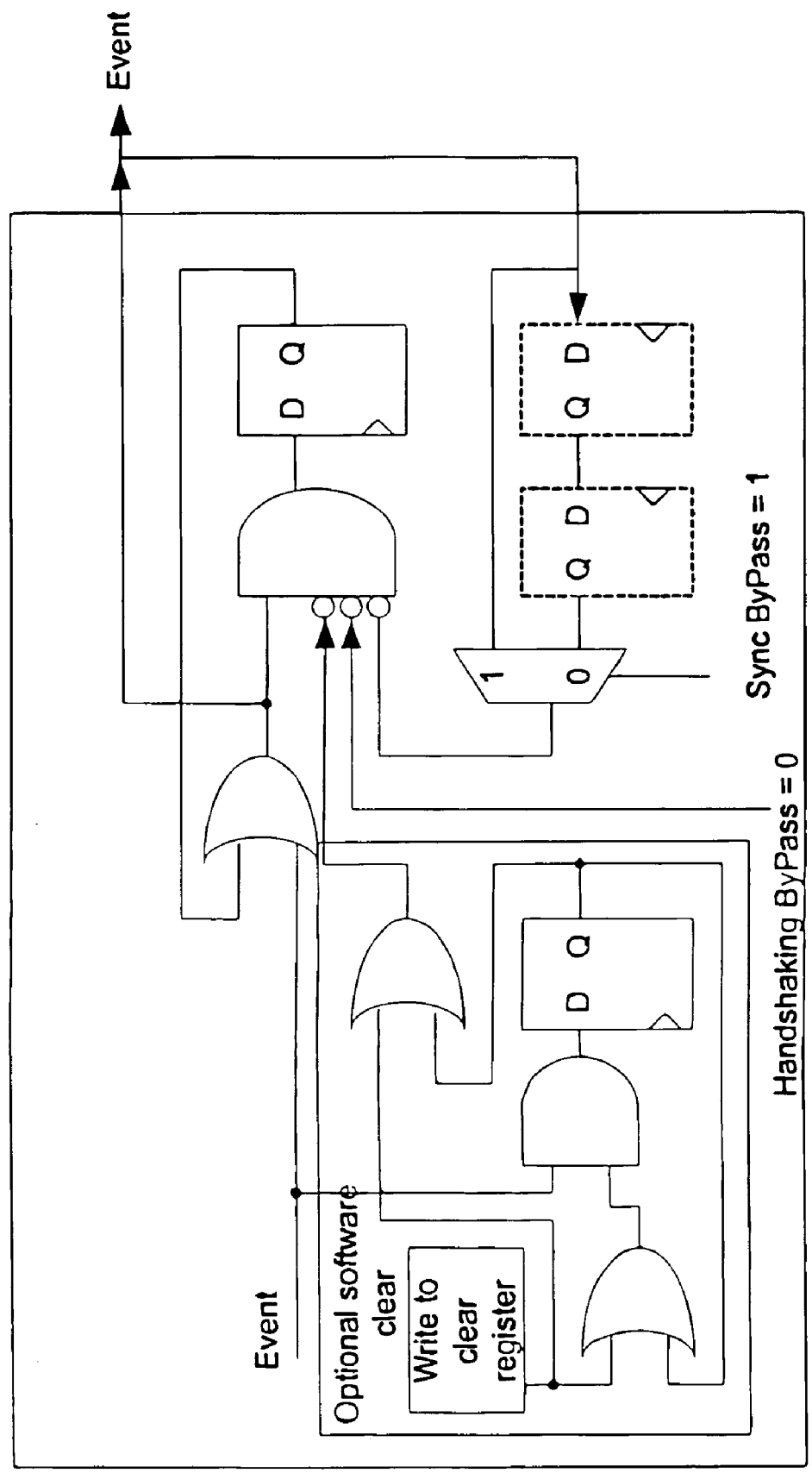

FIG. 40 schematically illustrates a pulse output mode of the handshaking circuit. In this case handshake bypass=0 but sync bypass=1 (as for the synchronous mode of FIG. 37). Again, only the output handshaking circuit 3660 is shown. Provided that the event source is a pulse, the circuit of FIG. 40 can produce a single cycle pulse as trigger output.

Figure 41:
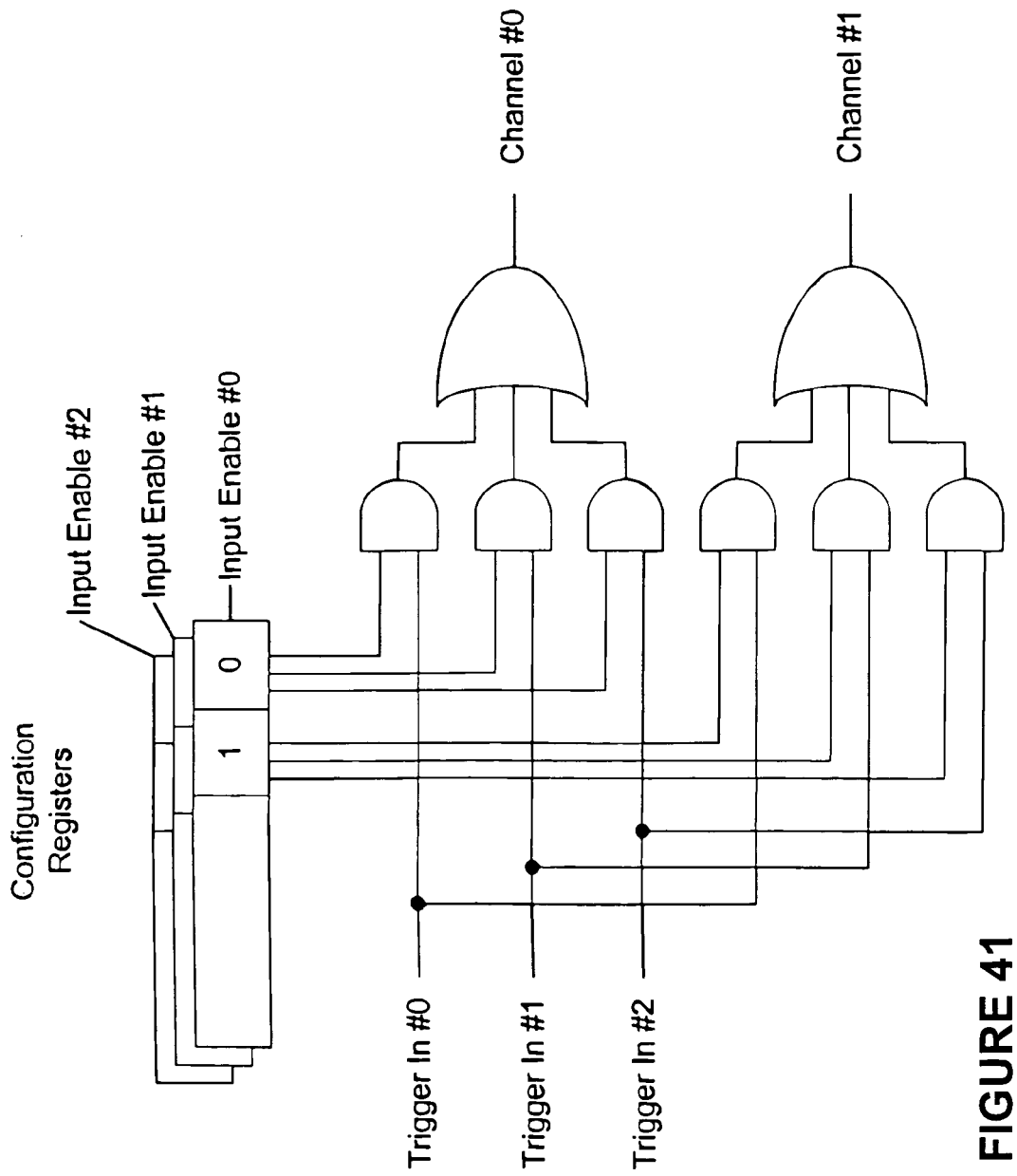
FIGS. 41 and 42 schematically illustrate the circuitry of the configuration registers of the arrangement of FIGS. 24 and 25.
Figure 42:
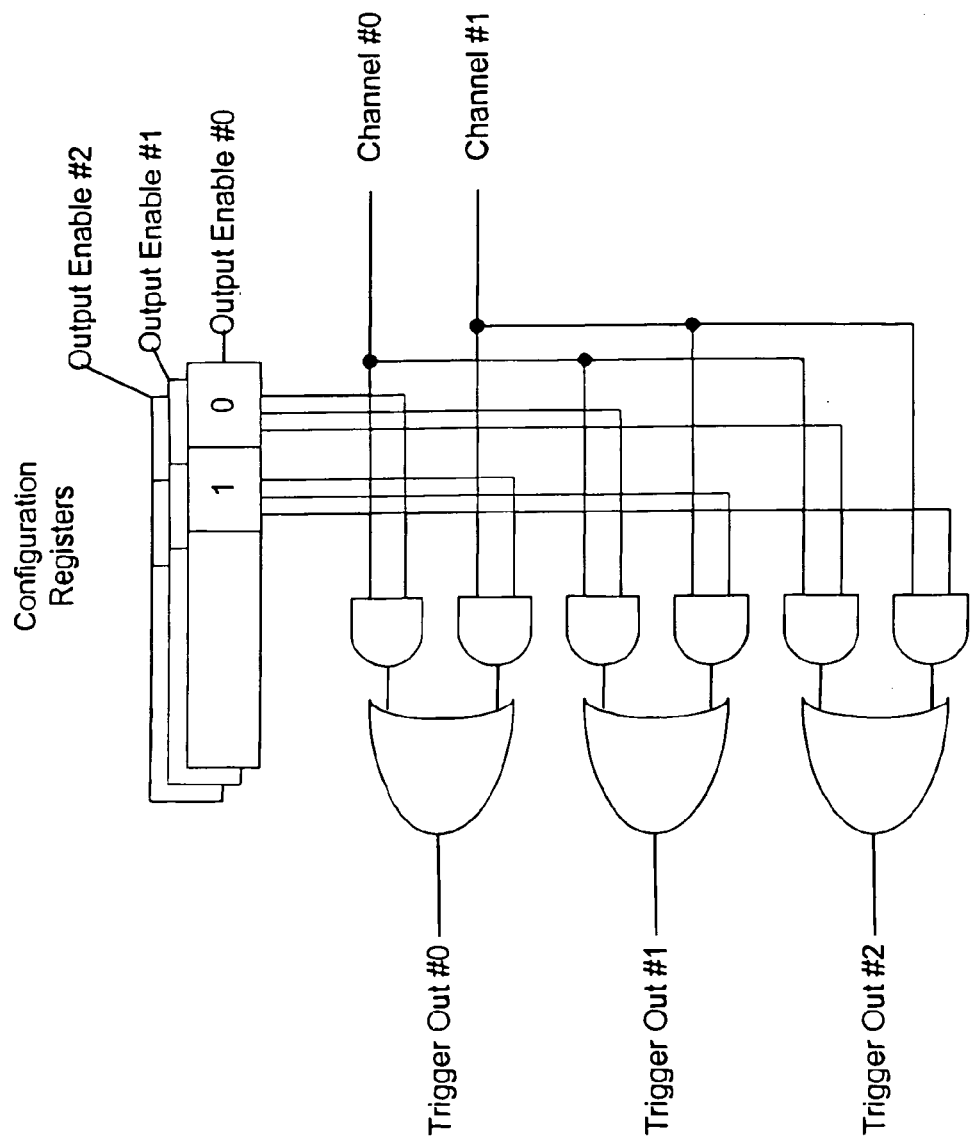

FIGS. 41 and 42 schematically illustrate the circuitry of the configuration registers of the embodiment of FIGS. 24 and 28. FIG. 41 shows the trigger to channel mapping logic whereas FIG. 42 shows the channel to trigger mapping logic. The logic is functionally the same as that of FIGS. 19 and 20 respectively although the signal names differ.

Preferred Register Format and Register Access

The following paragraphs shall specify in detail the preferred register format and register access for use with the system according to the present technique. The specifications are primarily designated to ARM cores but it is desirable that processor cores of other manufacturers also respect these specifications since it will allow the debug tools to drive any processor more easily.

To be able to specify the registers, the following limitations have been used:

Channels

The maximum number of channels supported by this specification is 8 channels. One register can be read to know how many registers are actually implemented (CTCHANNELSDEF).

If the number of supported channels is greater, these specifications should be respected for the 8 first channels.

Trigger Inputs

The following trigger inputs are supported by these specifications. One register can be read to know which of these inputs have been implemented (CTINPUTSDEF).

DBGACK: This input is driven high when the processor is in debug mode,

INTIN (up to 4 bits): Interrupt inputs.

ETMEXTOUT (Up to 4 bits): These inputs should be connected to the ETMEXTOUT outputs of an ETM. The behaviour of these outputs has to be programmed inside the ETM.

AppTrig: This trigger is actually a register bit that can be used to trigger an event.

All these inputs do not need to be implemented. Some parameters should be provided to help the user define the requirements.

Trigger Outputs

The following trigger outputs are supported by these specifications. One register can be read to know which of these outputs are actually implemented (CTOUTPUTS-DEF).

DBGRQ: This output is used to request that the processor enters debug mode.

INTOUT (Up to 4 bits): These outputs should be used as interrupt lines.

ETMEXTIN (Up to 4 bits): These outputs should be connected to the ETMEXTIN inputs of an ETM. The ETM needs to be programmed to define the behaviour when a trigger is received.

All these outputs do not need to be implemented. Some parameters should be provided to help the user define the requirements.

With regard to the access mechanism, it is recommended that the configuration registers of the cross-trigger interface should be accessed by two modes:

Memory mapped configuration,

Scan access.

First consider the memory-mapped configuration. The configuration registers should be accessed as a memory mapped AHB or APB slave depending on the system requirements.

It is recommended that an APB peripheral is used to facilitate the register access. The configuration registers will be accessed (relatively) infrequently and if placed on the main system bus (AHB/ASB) the increased loading could degrade the maximum system bus frequency.

However an AHB slave can be chosen in some cases, e.g. if HPROT needs to be used to select privileged accesses, or if this is preferable in the specific system.

With regard to security, as the cross-trigger system can be used to generate intrusive debug events, it is important that the cross-trigger matrix is only used for product development, and that its use (either inadvertently or maliciously) in a production system is prevented.

The following two mechanisms should both be implemented to prevent unwanted accesses to the configuration registers:

Debug enable: the DBGEN signal should be used to disable the cross-trigger interface for the processor (No event can be received nor raised), Access key: A sequence of data writes is required to enable accesses to the configuration registers. The complexity of this sequence can be modified if required.

All the registers must be accessed as words and so are compatible with little and big endian memory systems.

With regard to the scan configuration, it is a requirement for ARM cores that are connected to an Embedded Trace Macrocell (ETM) that the registers can be accessed using scan mode. This allows for non-intrusive configuration setup.

As the cross-trigger interface is attached to a particular core, it makes sense for the configuration registers to be directly connected to the core, using another scan chain, instead of implementing a new TAP controller. In this case, the Multi-ICE would detect a single TAP controller for ARM core and cross-trigger interface, with the ETM if there were one.

This is even more important when the number of cores and cross-trigger interfaces increases, as it would double the number of TAP controller, hence the time needed to scan an instruction.

A 7-bit address field.

A read/write bit.

Figure 44:
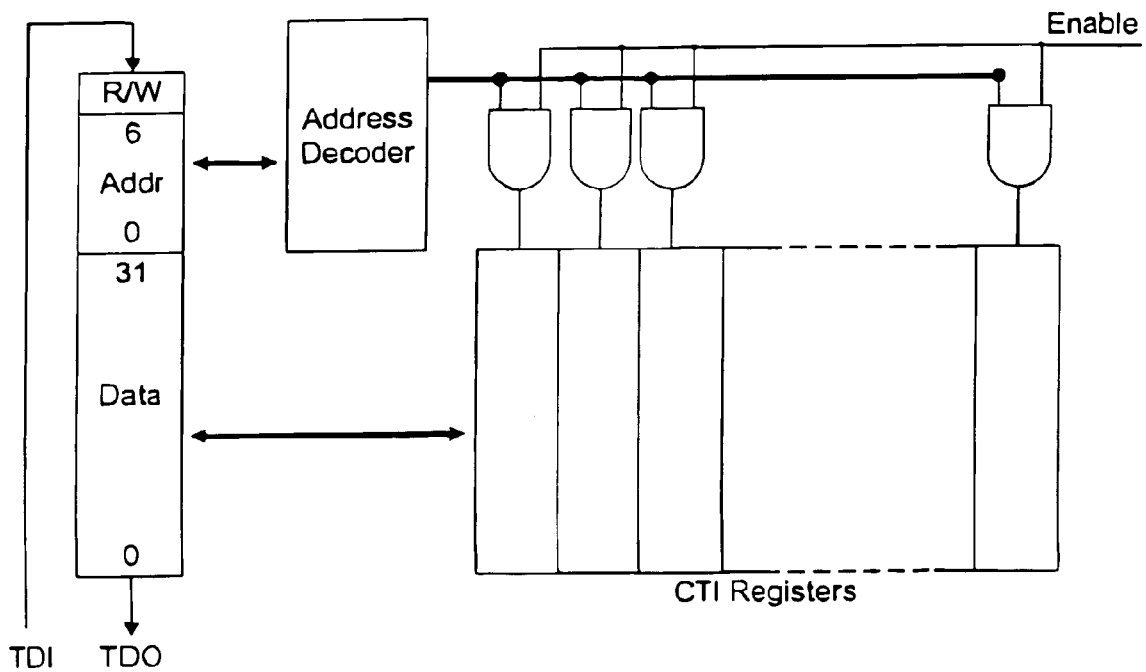
FIG. 44 schematically illustrates a general arrangement for JTAG registers of the of the cross-trigger interface.

The general arrangement of the cross-trigger interface JTAG registers is illustrated in FIG. 44.

The data to be written is scanned into the 32-bit data field, the address of the register into the 7-bit field, and a 1 into the read/write bit.

A register is read by scanning its address into the address field and a 0 into the read/write bit. The 32-bit field is ignored. The value of the data field will be replaced by the value of the read data. This data can be accessed by scanning another 40-bit word in the scan chain register.

A read or write takes place when the TAP controller enters the UPDATE_DR state.

Now consider the register format. The generic structure of the memory map for the cross-trigger interface registers, conform to a generic PrimeXsys configuration: a global array of 4 kB (1024 32-bit registers) is reserved for this component, divided in two arrays:

(i) 128 32-bit registers that can be accessed in scan mode and via the memory interface, (ii) All the other registers that can be accessed only via the memory interface.

Figure 45A:
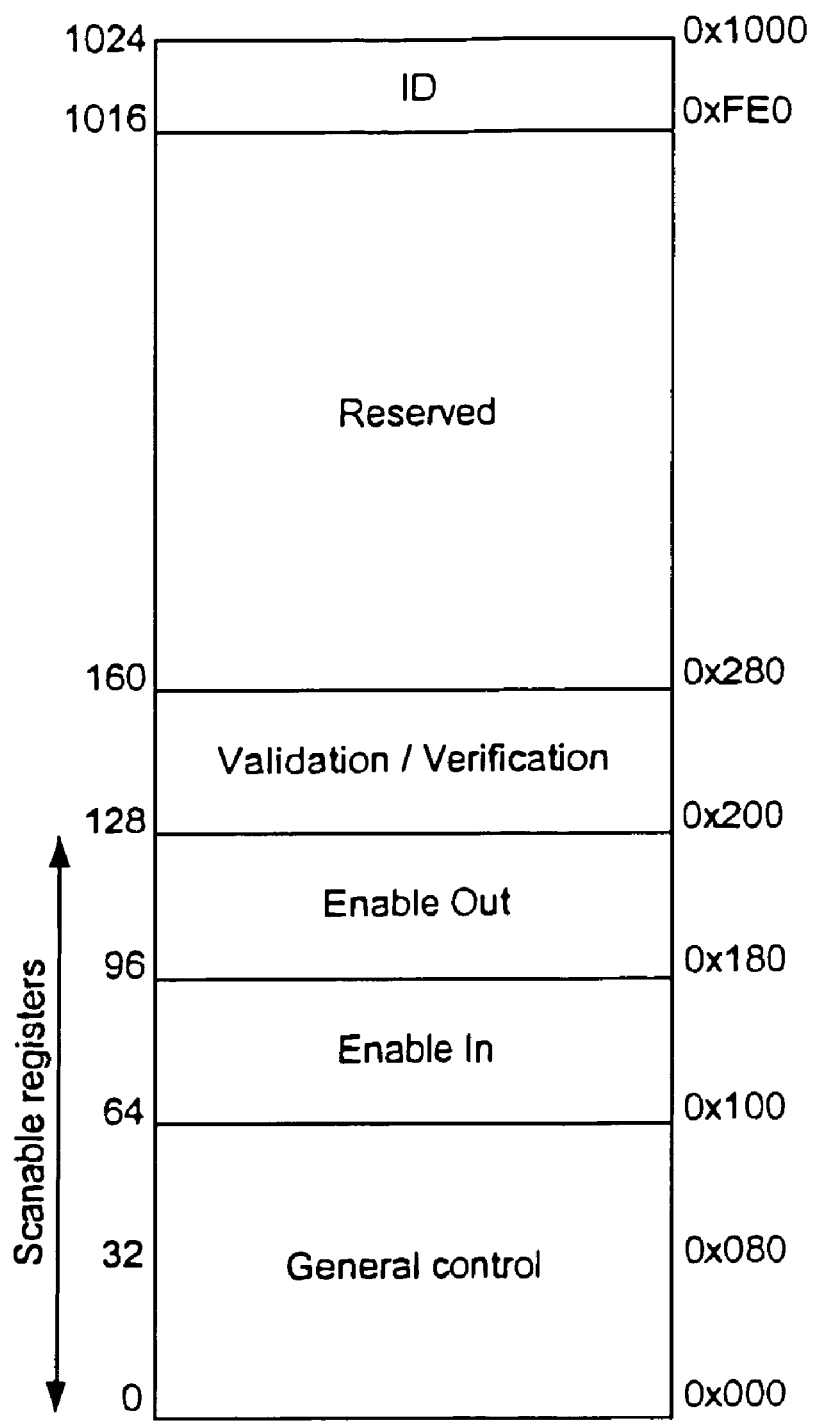
FIGS. 45A and B schematically illustrate memory mappings for the configuration registers.

FIG. 45A schematically illustrates the proposed memory mapping for the configuration registers. Most of the registers and register bits will be unused. In this case, a read access will return 0 for the unimplemented bits, and write accesses will be ignored.

Figure 43:
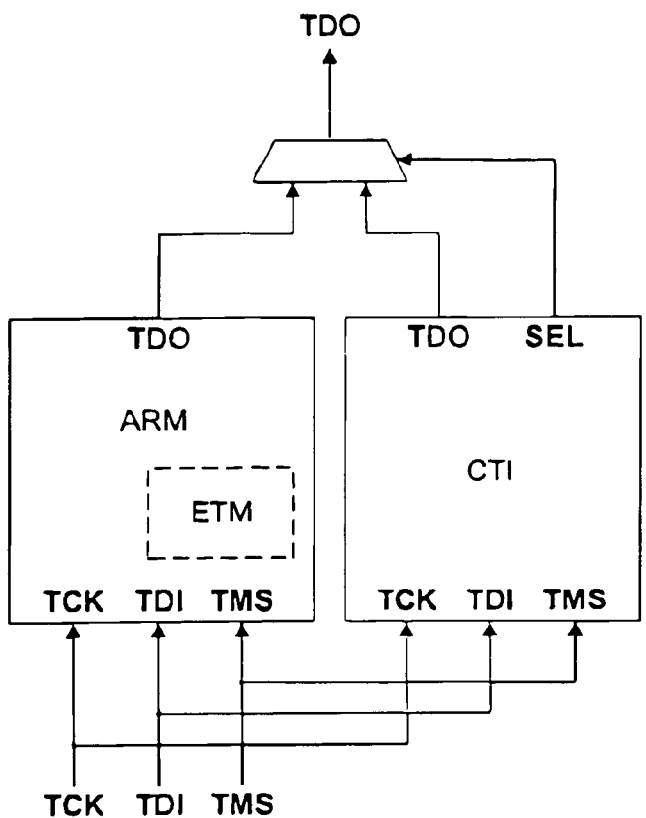
FIG. 43 schematically illustrates the recommended connectivity to an ARM core, which is already connected to an ETM.
Figure 45B:
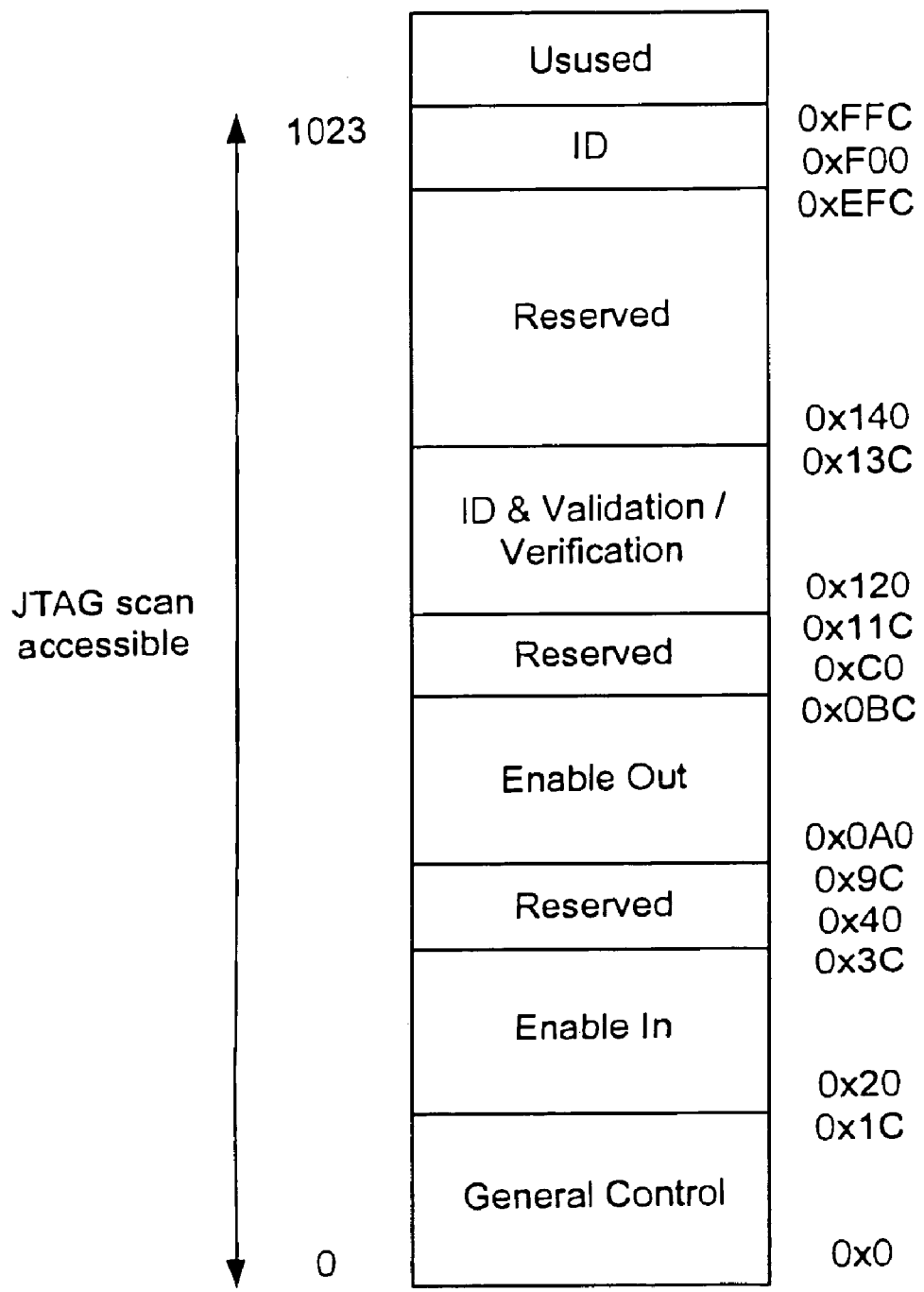

FIG. 45B schematically illustrates an alternative memory mapping for the configuration registers of FIGS. 41 and 42. This memory mapping is an alternative to the mapping illustrated in FIG. 25. In the memory mapping of FIG. 43 registers 0 through 1023 are JTAG scan accessible.

All the following addresses are relative to the address base of the CTI registers.

Some channels depend on the number of channels and inputs/outputs. The width in this table is the maximum width. The following section details the content of each register.

General Control (0x000 to 0x0FC)

These registers are reserved for compatibility reasons. Each register or bit that is not used should read '0' and not be used for another purpose.

The format of the CTGENCTL (0x000) R–R/W register is shown in FIG. 46.

GblEn: Controls and indicate the status of the CTI. If disabled, then all cross-triggering functionality is disabled for this processor. Disabled at power-on reset DbgEn: (Read only) Read the value of the DBGEN input.

IntEn: Global mask signal for the interrupt outputs. When 0, the interrupt output will not be changed, and the CTINTRAWSTATUS register will give the status of the interrupts. The CTINTOUTEN register controls which channels raise interrupts.

Locked: (Read only) Read '1' if the access to the registers is locked, '0' otherwise. The access can be unlocked by using the CTLOCK register SyncByPass: Read the value of the SYNCBYPASS input.

The format of the CTLOCK (0x004) R/W register is shown in FIG. 47.

Access Code: The access code (or a combination of codes) must be written to this register before any other register can be modified. To disable access, any other value must be written to the register. The Locked bit in the CTGENCTL register indicates the status of the lock.

The format of the CTINTRAWSTATUS (0x008) R is shown in FIG. 48.

Interrupts: This register is a read-only register, which reports which interrupt signals have been enabled, before masking by the IntEn bit. The number of implemented bits depends on the number of interrupt signals implemented.

The format of the CTINTSTATUS (0x00C)R is shown in FIG. 49.

Interrupts: This register is a read-only register, which reports interrupt signals have been enabled, after masking by the IntEn bit (CTGENCTL register). The values of the register bits correspond to the value of the interrupt outputs. The number of implemented bits depends on the number of interrupt signals implemented.

The format of the CTINTCLEAR (0x010) W register is shown in FIG. 50.

Interrupts: This register is a write-only register. Any bit written as a '1' will cause the interrupt output signal to be cleared. The number of implemented bits depends on the number of interrupt signals implemented.

The format of the CTAPPTRIG (0x080) R/W register is shown in FIG. 51.

AppTrig: Changing the value of this bit from 0 to 1 will cause an application trigger event to be generated for the channels that have been enabled The format of the CTPERIPHID (0x0E0) R register is shown in FIG. 52.

Configuration: Defines the configuration of the peripheral

Revision: This is the revision number. The revision number starts from 0.

DesignerID: This is the identification of the designer. ARM Ltd. Is 0x41 (ASCII 'A')

Part Number: This is used to identify the peripheral.

The format of the CTCHANNELSDEF (0x0E4) R register is shown in FIG. 53.

ChannelsIn: Each implemented input channel will have the corresponding bit set to '1'

ChannelsOut: Each implemented output channel will have the corresponding bit set to '1'

The format of the CTINPUTSDEF (0xE8) R register is shown in FIG. 54.

Each bit of the register will read '1' if the corresponding signal has been implemented as an input trigger, '0' otherwise DbgAck: Indicates whether the DBGACK input is implemented Int: Indicates which interrupt input signals are implemented (up to 4)

EtmExtOut: Indicates which of the ETMEXTOUT[3:0] signals are implemented

AppTrig: Indicates whether the AppTrig register bit is implemented.

The format of the CTOUTPUTSDEF(0xEC)R register is shown in FIG. 55.

Each bit of the register will read '1' if the corresponding signal has been implemented as an output trigger, '0' otherwise.

DbgRq: '1' if the CTI can trigger the DBGRQ signal of the processor.

Int: Indicates which interrupt output signals are implemented as output triggers (Up to 4)

EtmExtIn: Indicates which bits of ETMEXTIN are implemented.

The format of the CTPCELLID (0x0F0)R register is shown in FIG. 56.

CellID: This is used to identify the peripheral.

Enable Register Format

The format of the Enable registers (0x100 to 0x1FC) will now be defined.

These registers are used to map a trigger to a channel or opposite:

Enable In: These registers are reserved to enable the input triggers (Coming from the core) to be propagated to a specific channel Enable Out: These registers are reserved to forward an event coming from a channel to a core signal.

This section reserves registers for signals that will generally be implemented for most of ARM cores.

When a register is not implemented because the signal is not needed, then the register should always read 0 and not be used for another purpose. The registers CTCHANNELSDEF, CTINPUTSDEF and CTOUTPUTSDEF must be filled correctly.

Note Non-ARM core should not implement these registers except if the functionality is the same. For example, it will be accepted that the interrupt registers are used to control interrupt line. It is also possible to use the CTDBGRQ register to control a signal, that has the same functionality than the ARM DBGRQ signal. In all the other case, different addresses should be used for compatibility reasons.

Figure 57:
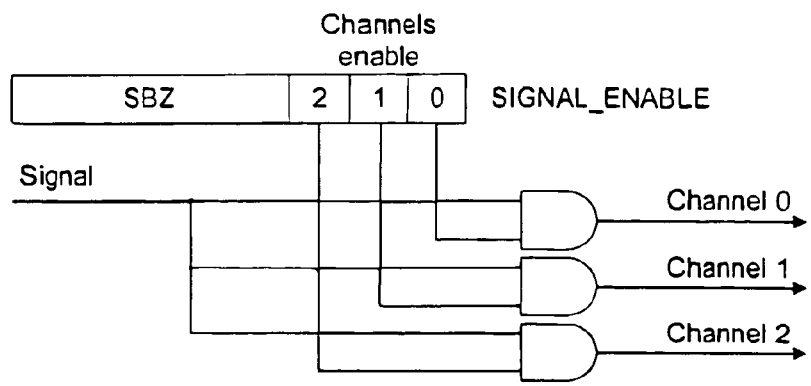
FIG. 57 schematically illustrates a global register format that should be used for enable registers.

The global register format that should be used is the following, as schematically illustrated in FIG. 57:

Each signal is assigned one register.

Each bit drives the signal to one channel when set to '1'.

When the signal is a bus of maximum 4 bits and the number of channels does not exceed 8, then the register should be divided in 4 8-bit registers, each one as described previously. The first 8-bit part of the register will be used for bit 0 of the signal, the second part for bit 1, etc.

Figure 58:
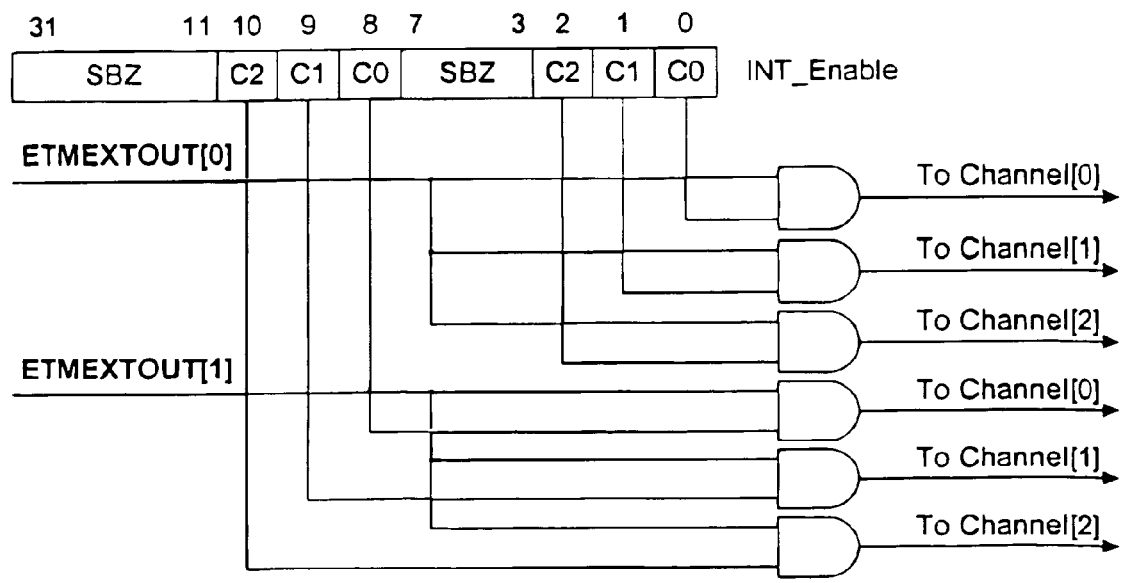
FIG. 58 schematically illustrates an example of two ETMEXTOUT signals used as triggers, where the number of input channels is 3.
Figure 71:
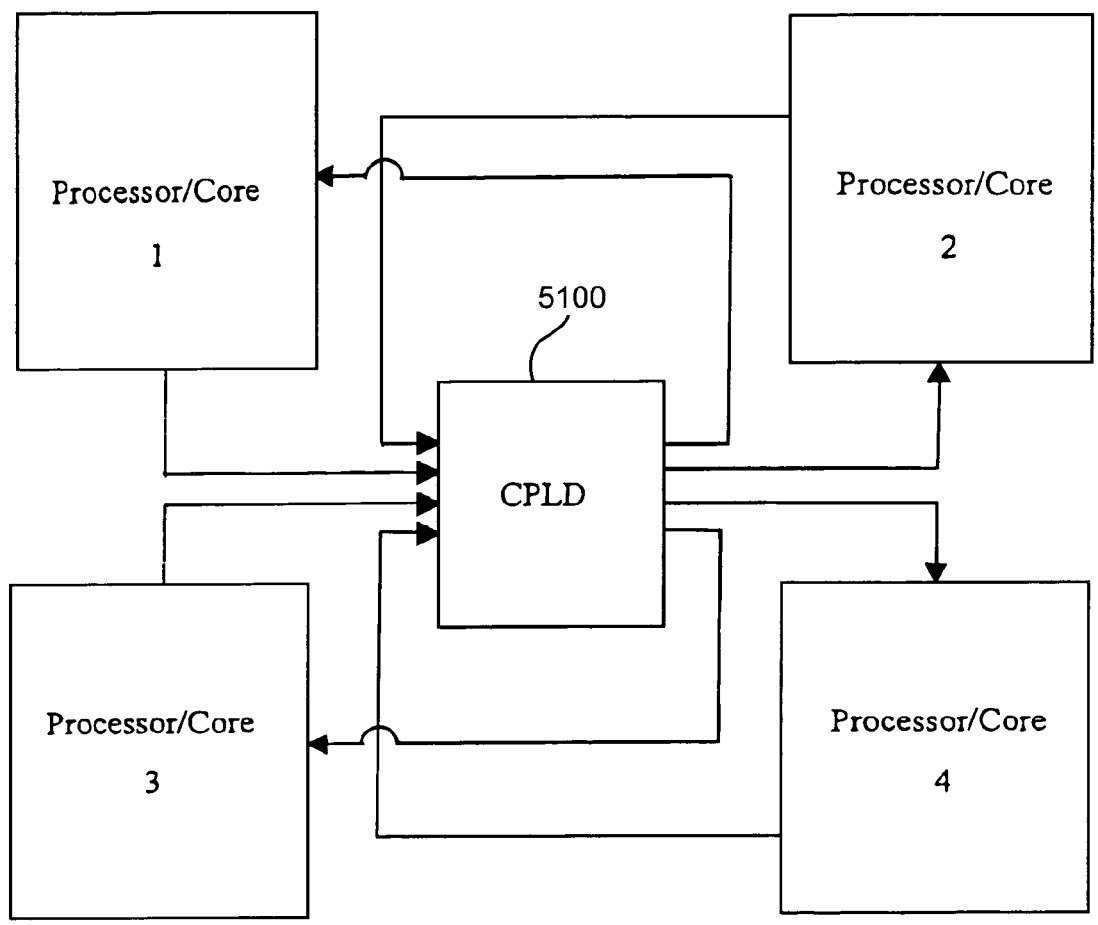
FIG. 71 schematically illustrates how four processor cores are connected according to a known cross-trigger control mechanism.
Figure 72:
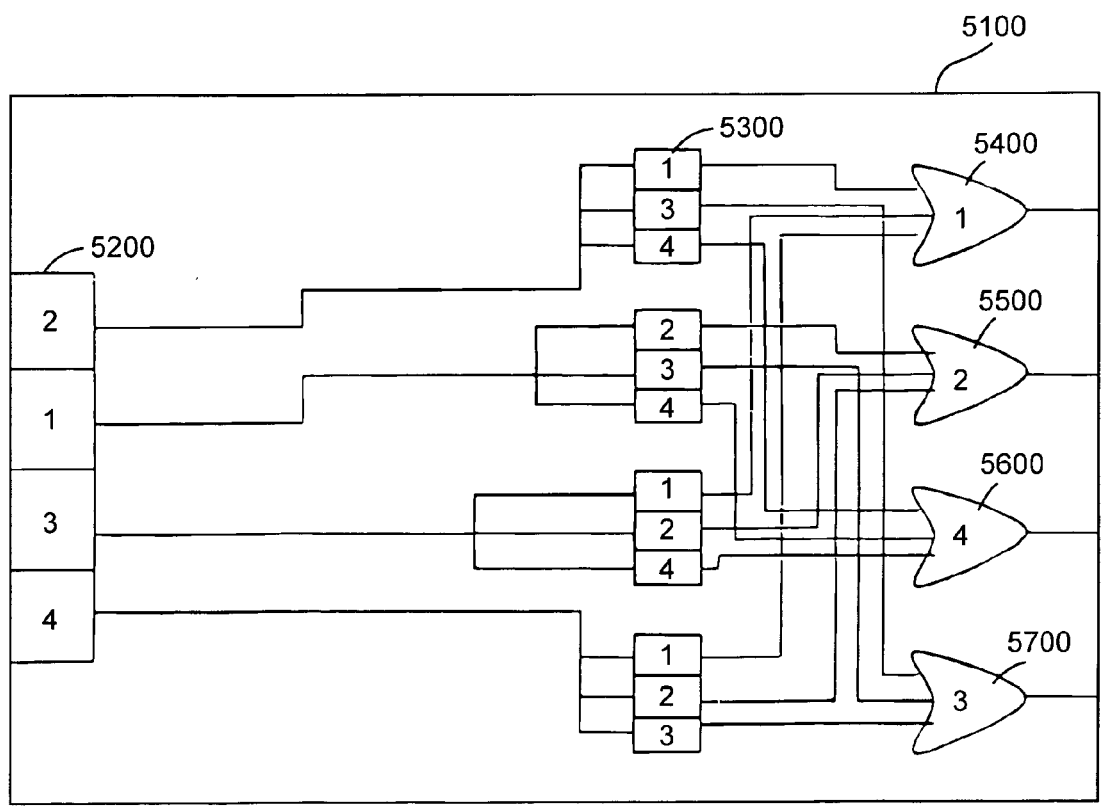
FIG. 72 schematically illustrates the structure of the complex programmable logic device of FIG. 71.

FIG. 58 schematically illustrates an example of two ETMEXTOUT signals used as triggers, where the number of input channels is 3. Bit 0 to 3 are used to drive ETMEXTOUT[0] to the channels, while bits 8 to 10 are use to drive ETMEXTOUT[1] to the channels.

The format of the Enable In registers (0x100 to 0x17C) will now be specified.

The following registers are reserved for compatibility reasons. If a register is not implemented, it should not be used for another purpose:

The format of the CTDBGACKEN (0x100)R/W register is shown in FIG. 59.

Channels: raise a cross-trigger event to the corresponding channel when the core enters debug state The format of the CTINTINEN (0x104) R/W register is shown in FIG. 60.

Channels: raise a cross-trigger event to the corresponding channel when an interrupt input (IRQ or FIQ) is activated. If more than one interrupt line is connected, see note above.

The format of the CTETMEXTOUTEN (0x108) R/W register is shown in FIG. 61.

Channels: raise a cross-trigger event to the corresponding channel when the ETMEXTOUT is signalled. See note above if more than one signal is implemented The format of the CTAPPTRIGEN (0x110) R/W register is shown in FIG. 62.

Channels: raise a cross-trigger event to the corresponding channel when the application trigger AppTrig is activated.

The format of the Enable out registers (0x180 to 0x1FC) will now be specified.

These registers are used to forward the trigger coming from one channel to an output signal, which is connected to the core. The same recommendations apply.

The following registers are reserved for compatibility reasons. If not implemented, these registers should not be used for another purpose:

The format of the CTDBGRQEN (0x180) R/W register is shown in FIG. 63.

Channels: Enable DBGRQ upon cross-trigger channel event on the corresponding channel The format of the CTINTOUTEN (0x184) R/W register is shown in FIG. 64.

Channels: Enable an interrupt request (IRQ or FIQ) upon cross-trigger channel event on the corresponding channel. The global IntEn (CTDBGEN register) bit is used to enable the outputs. The interrupt status can be read using the CTINTSTATUS register, and cleared using the CTINTCLEAR register. More than one interrupt line can be implemented (See above)

The format of the CTETMEXTINEN(0x188) R/W register is shown in FIG. 65. Channels: Enable an ETMEXTIN request upon cross-trigger channel event on the corresponding channel. More than one signal can be implemented (See above)

Integration Register Format

The format of Integration registers (0x200 to 0x280) will now be specified.

These 32 registers are used to perform integration test in the system, to verify that the correct core signals are connected to the correct trigger inputs and outputs.

These registers are not accessible via the JTAG scan interface.

The following registers should be implemented:

The format of an CTITCR (0x200) R/W register is shown in FIG. 66.

ITEN: Enable integration and validation test registers

The format of an CTITIP1 (0x204) R/W register is shown in FIG. 67.

The format of an CTITIP2 (0x208) R/W register is shown in FIG. 68.

The format of an CTITOP1 (0x20C) R/W register is shown in FIG. 69.

The format of an CTITOP2 (0x210) R/W register is shown in FIG. 70.

Write access: If the enable bit is active in the CTITCR register, defines the value to be written on each signal Read access: Read the value of the signals at the output of the test multiplexor. If the enable bit is active, returns the value that was written into the register.

The ID registers (0xFE0 to 0xFFC) are 8-bit registers, that span the address location 0xFE0—0xFEC and 0xFF0—0xFFC. They are copies of the 32-bit registers at addresses 0x0E0 and 0x0F0. These registers are used as Peripheral Identification Register and PrimeCell Identification Register. If not implemented, these registers should read 0.

In the above description of arrangements according to the present technique, the functionality of the cross-trigger matrix (routing module) has been distinguished from the functionality of the cross-trigger interface module. However, it will be appreciated that any functional feature specified in relation to one of these modules could be alternatively provided by the other module or indeed a single module could be used to provide all of the described functionality.

We claim:

1. A data processing apparatus for controlling cross-triggering of diagnostic processes on a plurality of processing devices, said data processing apparatus comprising:

a routing module comprising a plurality of broadcast channels, one or more of said broadcast channels being operable to indicate the occurrence of a diagnostic event on one or more of said plurality of processing devices and having at least one router input port for receiving channel-mapped data indicating the occurrence of diagnostic events and at least one router output port for broadcasting channelised information indicating the occurrence of diagnostic events;

a mapping module having:

an event mapping input port operable to receive a diagnostic event signal indicating the occurrence of a diagnostic event on an associated processing device, said associated processing device being one of said plurality of processing devices;

a first mapping unit operable to programmably assert said diagnostic event signal to one or more of said plurality of broadcast channels of said routing module and to supply said diagnostic event signal to said at least one router input port;

a channel mapping input port operable to receive from said router output port said channelised information; and a second mapping unit operable to receive said channelised information from said at least one router output port and to programmably retrieve from said channelised information, diagnostic event data from selected ones of said plurality of broadcast channels and to supply said retrieved diagnostic event data to said associated processing device to facilitate triggering of a diagnostic process on said associated processing device in dependence upon said retrieved diagnostic event data.

2. An apparatus as claimed in claim 1, wherein said routing module comprises combining logic for said one or more of said plurality of broadcast channels, said combining logic being operable to combine a plurality of diagnostic event signals from different ones of said plurality of processing devices asserted to a respective broadcast channel.

3. An apparatus as claimed in claim 2, wherein said combining logic comprises an OR logic gate.

4. An apparatus as claimed in claim 1, wherein at least one of said router module and said mapping module comprises synchronisation logic operable to synchronise a received signal to a local clock domain.

5. An apparatus as claimed in claim 4, wherein said synchronisation logic has a bypass mode.

6. An apparatus as claimed in claim 1, wherein at least one of said routing module and said mapping module belong to a transmitting device and destination device pair and comprises handshaking logic operable to hold assertion of a signal transmitted by said transmitting device pending receipt of an acknowledgement by said destination device.

7. An apparatus as claimed in claim 6, wherein said handshaking logic has a bypass mode.

8. An apparatus as claimed in claim 1, wherein said plurality of processing devices, and said data processing apparatus are components of a single microchip.

9. An apparatus as claimed in claim 1, wherein said mapping module and said associated processing device are situated on a different chip from said routing module.

10. An apparatus as claimed in claim 1, comprising a routing module synchroniser interface operable to monitor both a first handshake signal sequence comprising receipt and acknowledgement of said channelised information and a second handshake signal sequence comprising receipt and acknowledgement of said diagnostic event signal, said routing module synchroniser interface being further operable to output a single off-chip signal representing said first handshake signal sequence and a single off-chip signal representing said second handshake signal sequence.

11. An apparatus as claimed in claim 1, wherein said mapping module comprises glitch-removal logic operable to register receipt of said diagnostic event signal prior to supplying said diagnostic event signal to said routing module thereby preventing said routing module from falsely signalling occurrence of a diagnostic event.

12. An apparatus as claimed in claim 11, wherein a first subset of said configuration registers are programmable using JTAG scan access as well as memory mapped access and a second subset of said configuration registers are programmable using memory mapped access.

13. An apparatus as claimed in claim 1, wherein at least one of said first mapping module and said second mapping module comprises a plurality of configuration registers operable to effect said progammable assertion of said diagnostic event signal to said plurality of said broadcast channels and/or to effect said progammable retrieval of said diagnostic event data from selected ones of said plurality of broadcast channels.

14. An apparatus as claimed in claim 13, wherein said configuration registers are
programmable using memory mapped access.

15. An apparatus as claimed in claim 13, wherein said configuration registers are programmable using JTAG scan access.

16. An apparatus as claimed in claim 13, comprising an application trigger generator operable to generate an application trigger signal simulating the occurrence of a diagnostic event on at least one of said broadcast channels.

17. An apparatus as claimed in claim 16 comprising an application trigger register operable to programmably assert said application trigger signal to one or more of said broadcast channels.

18. An apparatus as claimed in claim 16, in which said application trigger signal comprises channel mapping information.

19. An apparatus as claimed in claim 1, wherein at least one of said plurality of processing devices is a processor core.

20. An apparatus as claimed in claim 1, wherein at least one of said plurality of processing devices is a co-processor.

21. An apparatus as claimed in claim 1, wherein at least one of said plurality of processing devices is a digital signal processor.

22. An apparatus as claimed in claim 1, wherein said routing module is operable to be connected to a further routing module by connecting said at least one router output port of said router module to a router input port of said further routing module and connecting said at least one router input port of said routing module to a router output port of said further routing module.

23. An apparatus as claimed in claim 1, in which said routing module and said mapping module are components of an integrated device.

24. An apparatus as claimed in claim 1 comprising a further mapping module connected to said routing module to form a cross-trigger block unit, the routing module having at least one expansion port operable to connect said cross-trigger block unit to a further respective cross-trigger block unit.

25. A data processing method for controlling cross-triggering of diagnostic processes on a plurality of processing devices, said method comprising the steps of:
broadcasting data indicating the occurance of diagnostic events via a router output port of a routing module comprising a plurality of broadcast channels, one or more of said broadcast channels being operable to indicate the occurance of a diagnostic event on one or more of said plurality of processing devices;
receiving at a router input port of said routina module, channel-mapped data indicating the occurrence of diagnostic events;
broadcasting from at least one router output port of said routing module, channelised information indicating the occurrence of diagnostic events on processing devices of said plurality of processing devices;
receiving via an event mapping input port of a mapping module a diagnostic event signal indicating the occurrence of a diagnostic event on an associated processing device, said associated processing device being one of said plurality of processing devices;
performing a first mapping operation involving programmably asserting said diagnostic event signal to one or more of said plurality of broadcast channels using said router input port;
receiving at a channel mapping input port of said mapping module a channelised information from said router port;
performing a second mapping operation by programmably retrieving from said channelised information, diagnostic event data from selected ones of said plurality of broadcast channels; and
supplying said retrieved diagnostic event data to said associated processing device to facilitate triggering of a diagnostic process on said associated processing device in dependence upon said retrieved diagnostic event data.

26. A method as claimed in claim 25, comprising the step of combining a plurality of diagnostic event signals from different ones of said plurality of processing devices asserted to a respective broadcast channel.

27. A method as claimed in claim 26, wherein said combining step comprises a logical OR operation.

28. An apparatus as claimed in claim 27, wherein in said step of performing a first mapping operation and said step of performing a second mapping operation a first subset of said configuration registers are programmable using JTAG scan access as well as memory mapped access and a second subset of said configuration registers are programmable using memory mapped access.

29. A method as claimed in claim 25 comprising the step of synchronising at least one of said received diagnostic event signal and said received channelised information to a local clock domain.

30. A method as claimed in claim 25, wherein assertion of said received diagnostic event signal is held pending acknowledgment of its receipt.

31. A method claim 25, comprising the step of acknowledging receipt of said diagnostic event signal to said associated processing device.

32. A method as claimed in claim 25, comprising the step of registering acknowledgement of receipt of said channelised information.

33. An method as claimed in claim 25, comprising the step of monitoring both a first handshake signal sequence comprising receipt and acknowledgement of said channelised information and a second handshake signal sequence comprising receipt and acknowledgement of said diagnostic event signal and also outputting a single off-chip signal representing said first handshake signal sequence and a single off-chip signal representing said second handshake signal sequence.

34. A method as claimed in claim 25, comprising the step of performing glitch-removal by registering receipt of said diagnostic event signal prior to supplying said diagnostic event signal as input to said first mapping operation thereby preventing false signalling of the occurrence of a diagnostic event.

35. A method as claimed in claim 25, comprising the step of synchronising a signal received from said router output port to a clock domain of said associated processing device prior to supplying said retrieved diagnostic event data to said associated processing device.

36. A method as claimed in claim 25, wherein said first mapping operation and said second mapping operation are performed using a plurality of configuration registers operable to effect said programmable assertion of said diagnostic event signal to said plurality of said broadcast channels and/or to effect said progammable retrieval of said diagnostic event data from selected ones of said plurality of broadcast channels.

37. An apparatus as claimed in claim 36, wherein in said step of performing a first mapping operation and said step of performing a second mapping operation, said configuration registers are programmed using memory mapped access.

38. An apparatus as claimed in claim 36, wherein in said step of performing a first mapping operation and said step of performing a second mapping operation, said configuration registers are said configuration registers are programmed using JTAG scan access.

39. A method as claimed in claim 25, comprising the step of generating an application trigger signal simulating the occurrence of a diagnostic event on at least one of said broadcast channels.

40. A method as claimed in claim 25, comprising the step of programmably asserting said application trigger to one or more of said broadcast channels.

41. A method as claimed in claim 25, in which said generated application trigger signal includes channel mapping information.

42. A method as claimed in claim 25, wherein at least one of said plurality of processing devices is a processor core.

43. A method as claimed in claim 25, wherein at least one of said plurality of processing devices is a co-processor.

44. A method as claimed in claim 25, wherein at least one of said plurality of processing devices is a digital signal processor.

* * * * *